(12) United States Patent
Waesche

(10) Patent No.: US 12,534,289 B1
(45) Date of Patent: Jan. 27, 2026

(54) TANK, TANK COMPONENTS, AND SYSTEM FOR USE, TRANSPORT, PROCESSING, AND/OR STORAGE OF LIQUIDS THEREIN AND METHODS OF USE THEREOF

(71) Applicant: Luke Waesche, Hagerstown, MD (US)

(72) Inventor: Luke Waesche, Hagerstown, MD (US)

( * ) Notice: Subject to any disclaimer, the term of this patent is extended or adjusted under 35 U.S.C. 154(b) by 0 days.

(21) Appl. No.: 18/393,591

(22) Filed: Dec. 21, 2023

Related U.S. Application Data

(60) Provisional application No. 63/435,166, filed on Dec. 23, 2022.

(51) Int. Cl.
| | | |
|---|---|---|
| *B65D 90/62* | (2006.01) | |
| *B65D 88/02* | (2006.01) | |
| *B65D 90/08* | (2006.01) | |
| *B65D 90/12* | (2006.01) | |
| *B65F 1/02* | (2006.01) | |
| *B65F 1/16* | (2006.01) | |

(52) U.S. Cl.
CPC ......... *B65D 90/623* (2013.01); *B65D 88/022* (2013.01); *B65D 90/08* (2013.01); *B65D 90/12* (2013.01); *B65F 1/02* (2013.01); *B65F 1/1646* (2013.01); *B65F 2240/152* (2013.01)

(58) Field of Classification Search
CPC .... B60K 15/07; B65D 90/623; B65D 88/022; B65D 90/08; B65D 90/12; B65D 88/128; B65D 88/748; B65D 90/505; B65D 43/162; B65F 1/02; B65F 1/1646; B65F 2240/152
See application file for complete search history.

(56) References Cited

U.S. PATENT DOCUMENTS

| | | | | |
|---|---|---|---|---|
| 4,036,361 A | * | 7/1977 | Jacobson | B65D 88/20 220/6 |
| 4,955,497 A | * | 9/1990 | Winden | E05C 19/06 D34/1 |
| 5,285,954 A | * | 2/1994 | Goglio | B65D 51/20 206/524.8 |
| 9,868,569 B2 | * | 1/2018 | Wu | B65D 51/00 |
| 11,891,217 B2 | * | 2/2024 | Georgiadis | B65D 43/161 |
| 2003/0102309 A1 | * | 6/2003 | Hartwall | B65D 77/061 220/6 |
| 2012/0074158 A1 | * | 3/2012 | Lafleur | B65D 43/164 220/810 |
| 2013/0292383 A1 | * | 11/2013 | Mullaney | H05K 5/062 277/654 |
| 2013/0306644 A1 | * | 11/2013 | Howell | B60K 15/073 29/428 |
| 2016/0113437 A1 | * | 4/2016 | Büttiker | A47J 31/462 220/212.5 |

* cited by examiner

*Primary Examiner* — Kareen K Thomas
(74) *Attorney, Agent, or Firm* — GARCIA-ZAMOR INTELLECTUAL PROPERTY LAW, LLC; Ruy Garcia-Zamor

(57) ABSTRACT

A liquid tank configured to receive and store liquids, namely waste cooking oil. A tank configured to receive and store used cooking oil which preferably greatly enhances the ease and reduces the work required to dispose of undesired liquid. A tank configured to receive and store used cooking oil which may be entirely manually powered, manually powered and free of all motors and electrical components, may be operated by a powered device, may include a motor, or may be operated manually with a powered assist.

17 Claims, 43 Drawing Sheets

TANK, TANK COMPONENTS, AND SYSTEM FOR USE, TRANSPORT, PROCESSING, AND/OR STORAGE OF LIQUIDS THEREIN AND METHODS OF USE THEREOF

CROSS REFERENCE TO RELATED APPLICATIONS

This application claims priority to and benefit of U.S. Provisional Patent No. 63/435,166, filed Dec. 23, 2022, which is hereby incorporated by reference in its entirety as if fully set forth herein.

BACKGROUND

The preferred embodiments of the present invention relate generally to waste receptacles. More specifically, the preferred embodiment of the present invention relates to liquid waste receptacles. More specifically still, one preferred embodiment of the present invention relates to a waste oil tank with at least one security mechanism and level indicator.

Typically, the disposal of waste kitchen oil in commercial setting requires either storing the waste kitchen oil in a nearby dumpster or hiring a professional waste removal service to come into the restaurant and collect the oil. However, waste oil is valuable, and storing waste kitchen oil in a traditional dumpster invites potential thieves to take the waste oil. In order to efficiently dispose of waste oil, restaurants and other commercial kitchens must employ the service of expensive waste oil disposal companies. However, much of the convenience is lost when the kitchens are forced to pay the hefty fees charged by waste oil disposal companies as well as work around a third party's schedule for coming to pick up and transport away waste oil.

It may be advantageous to provide a liquid tank which may preferably, but not necessarily, include at least one of: an aesthetically pleasing design; an interlocking security mechanism; a level indicator; a configuration to store waste oil for later disposal; be manually operated without the use of motors or electrical components; which may incorporate a lift assist such that the dumping of waste cooking oil into the tank is easier and requires less work by the user; be easy to clean; be visually attractive; be difficult to open without authorization; avoid the use of screening between the tank mouth and the chamber in which liquid is stored; be suitable for use by commercial kitchens, restaurants, food factories, and/or other settings where large amounts of waste oil from cooking is produced; be sturdy enough for commercial use; be efficient for manufacture; allow for the transportation of waste oil without spillage or overflow; be useful for use by people with limited strength or of advanced age; and/or be easy to use.

SUMMARY

Briefly speaking, one embodiment of the present invention is directed to a tank configured for liquid storage. The tank may comprise a tank body having a top, a front, a back, a bottom, and two sides. The tank may define a chamber therein. The top may define an opening therein. The tank may further comprise a lid configured to cover the opening in the top of the tank body. The lid may be movable between an open position and a closed position. The tank may further comprise a removable plate positioned within the tank and located vertically under the lid when the lid is in the closed position. The tank may also comprise a porous plate positioned generally vertically proximate to a back side of the opening opposite the front of the tank. The porous plate may have a plurality of holes therein. The removable plate may be positioned such that liquid poured into the bin flows over the removable plate, through the plurality of holes in the porous plate, and into the chamber of the tank body. The removable plate may be removed from covering the opening such that the liquid contained within the chamber may be accessed.

In a separate aspect, the present invention is related to a waste oil storage tank. The tank may comprise a removable plate. The removeable plate may positionable within the tank body at a sloped angle to facilitate flow of liquid thereover.

In a separate aspect, the present invention is related to a waste oil storage tank. The tank may comprise an opening. The opening on the top of the bin may extend entirely from a first side of the two sides of the tank to a second side of the two sides of the tank.

In a separate aspect, the present invention is related to a liquid tank configured to store liquid. The liquid to be poured into and stored within the chamber of the tank may be waste cooking oil.

In a separate aspect, the present invention is related to a liquid tank. The tank may comprise a transverse member extending downward into the chamber from a central edge of the opening. The transverse member may have a plurality of fangs extending downwardly therefrom. The plurality of fangs may be configured to engage with a plurality of slots in a removable plate such that the removable plate may be locked into position when inserted into the tank body.

In a separate aspect, the present invention is related to liquid tank. The liquid tank may comprise a transverse member extending downward into the chamber from a central edge of the opening. The transverse member may have a plurality of slits extending horizontally across the bottom portion of the transverse member. A plurality of tabs on a lower end of the removable plate may be configured to engage with the plurality of slits such that the removable plate may be locked into position when inserted into the tank body.

In a separate aspect, the interlocking mechanism (i.e., the plurality of fangs with the plurality of slots or the plurality of slits with the plurality of tabs) more broadly may consist of male and female interlocking geometry such that the parts interlock and may be easily taken apart. The interlock may also consist of bent edges formed such that there is a male and female interlocking feature. In another embodiment, the interlocking male and female features may also change places such that the male parts do not have to be on the transverse member and the female on the removable plate.

In a separate aspect, the present invention is related to a liquid tank. The tank may comprise a lockable bar positioned horizontally across an upper end of the removable plate. The tank may also comprise a first engagement lip located in a first side top edge of a first side of the two sides of the tank body and a second engagement lip located in a second side top edge of a second side of the two sides of the tank body. The second engagement lip may be positioned horizontally across from the first engagement lip. When the removable plate may be positioned inside the tank body, a first end of the lockable bar may be engaged with the first engagement lip and a second end of the lockable bar may be engaged with second engagement lip to lock the removable plate into place. The first end and the second end of the lockable bar may each have a hole therethrough configured to receive a padlock. The first and the second sides of the tank body may each have a shield outwardly around the first and the second engagement lips such that access to the holes of the lockable bar is restricted.

In a separate aspect, the present invention is related to a liquid tank. The tank may comprise a lockable bar positioned across the removable plate. The tank may also comprise a first engagement lip located in a first side top edge of a first side of the two sides of the tank body and a second engagement lip located in a second side top edge of a second side of the two sides of the tank body. The second engagement lip may be positioned horizontally across from the first engagement lip. When the removable plate may be positioned inside the tank body, a first end of the lockable bar may be engaged with the first engagement lip and a second end of the lockable bar may be engaged with second engagement lip to lock the removable plate into place. The lockable bar may have an internal carbide layer.

In a separate aspect, the present invention is related to a liquid tank. The tank may comprise a porous plate. The porous plate may be positioned within the tank equal to or between forty-five degrees (45°) and ninety degrees (90°) from horizontal.

In a separate aspect, the present invention is related to a liquid tank. The tank may comprise four first connecting brackets located along a top perimeter edge of the tank body. The tank may also comprise four feet positioned on the bottom of the tank body. Each of the four feet may have a second connecting bracket thereon. Each one of the first connecting brackets on the tank may be configured to engage with and lock into one of the second connecting brackets on a second tank which may be configured identically to the tank thereby allowing the second tank to stack onto the tank.

In a separate aspect, the present invention is related to a liquid tank. The tank may comprise a lid covering an opening. The lid may be connected to the tank body by a pair of hinges. Each of the pair of hinges may have a curved track configured to accommodate a pin located on each of the two sides.

In a separate aspect, the present invention is related to a liquid tank. The tank may comprise a mounting module located on the front of the tank body. The mounting module may be configured to connect to a liquid carrier such that a person dumping liquid into the tank via the liquid carrier may be assisted.

In a separate aspect, the present invention is related to a liquid tank. The tank may comprise an interior gauge located on an inside of at least one of the two sides on the tank body. The interior gauge may indicate an amount of the liquid stored inside the chamber.

In a separate aspect, the present invention is related to a liquid tank. The tank may comprise a porous plate. The porous plate may have a plurality of holes. The plurality of holes in the porous plate may hexagonal.

In a separate aspect, the present invention is related to a liquid tank. The tank may comprise a tank body. The tank body may be made of metal and may be welded into one solid piece.

In a separate embodiment, the present invention is related to a tank configured for liquid storage. The tank may comprise a tank body having a top, a front, a back, a bottom, and two sides. The tank body may define a chamber therein. The top may have an opening therein. The tank may further comprise a lid configured to cover the opening in the top of the tank body. The lid may be movable between an open position and a closed position. The tank may further comprise a plate positioned within the tank and located vertically under the lid when the lid is in the closed position. The plate may comprise a lockable bar positioned horizontally across an upper end of the plate. The tank may also comprise a first engagement lip located in a first side top edge of a first side of the two sides of the tank body and a second engagement lip located in a second side top edge of a second side of the two sides of the tank body. The second engagement lip may be positioned horizontally across from the first engagement lip. When the plate may positioned inside the tank body, a first end of the lockable bar may be engaged with the first engagement lip and a second end of the lockable bar may be engaged with second engagement lip to lock the plate into place. The plate may be positioned within the tank body such that liquid poured into the bin flows over the plate.

In a separate aspect, the present invention is related to a tank configured for liquid storage. The tank may comprise a lockable bar and plate. The lockable bar may be disengageable from the first and second engagements lips. The plate may be removable from the tank body.

In a separate embodiment, the present invention is related to a tank configured for liquid storage. The tank may comprise a tank body having a top, a front, a back, a bottom, and two sides. The tank may define a chamber therein. The top may define an opening therein. The tank may further comprise a lid configured to cover the opening in the top of the tank body. The lid may be movable between an open position and a closed position. The tank may further comprise a plate positioned within the tank and located vertically under the lid when the lid is in the closed position. The plate may comprise a lockable bar positioned horizontally across an upper end of the plate. The lockable bar may have a first end and a second end. The first end and the second end of the lockable bar may each have a hole therethrough configured to receive a padlock. The first and the second sides of the tank body may each have a shield outwardly extending around the holes of the lockable bar. The plate may be positioned within the tank body such that liquid poured into the bin flows over the plate.

In a separate embodiment, the present invention is related to a tank configured to receive and store used cooking oil. The tank may comprise a tank body. The tank body may define a chamber therein configured to receive used cooking oil. The tank body may comprise a base panel, a top panel, and a sidewall extending between the base panel and the top panel. Portions of the sidewall may form a front tank surface, a first lateral tank surface, and a second lateral tank surface. The top panel may define an opening therein proximate to the front tank surface. The tank body may define a second chamber located between the opening and the first chamber. The second chamber may comprise a second chamber base panel formed by a removeable plate and a transverse member extending between the first lateral tank surface and the second lateral tank surface. The removeable plate may generally extend between the front tank surface, the first lateral tank surface, the second lateral tank surface, and the transverse member to provide a surface onto which used cooking oil may flows during transport to the first chamber. The removeable plate may be detachably removeable from the tank. A lid may be pivotally attached to the top panel such that the lid may be moveable between a first, closed position in which the lid, in combination with the top panel block the opening to prevent the flow of used cooking oil into the tank and a second, open position in which used cooking oil can flow into the tank.

In a separate aspect, the present invention is related to a tank configured to receive and store used cooking oil. The tank may comprise a porous plate positioned generally vertically in the first chamber and located proximate to a back side of the opening opposite the front tank surface. The porous plate may have a plurality of hexagonal holes therein. The removeable plate may be positioned on a sloped angle such that used cooking oil poured into the bin flows over the removable plate, through the plurality of holes in the porous plate, and into the first chamber of the tank. The removable plate may be removed from covering the opening such that the liquid contained within the chamber may be accessed.

In a separate aspect, the present invention is related to a tank configured to receive and store used cooking oil. The tank may comprise a tank body and a lid. The tank body and the lid may be metallic. The tank body may be welded to form a one piece body.

In a separate aspect, the present invention is related to a tank configured to receive and store used cooking oil. The tank may comprise a removable plate. The removeable plate may be interlockable with the transverse member. A lockable bar may be positioned on the removeable plate. The lockable bar may be configured to receive a lock therein to secure the removeable plate to the tank body. The removeable plate may be secured in position by both the lockable bar and the interlocking of the removeable plate with the transverse member such that the removeable plate underlies the porous plate.

In a separate aspect, the present invention is related to a tank configured to receive and store used cooking oil. The tank may comprise an opening in the top panel extending entirely from the first lateral surface to the second lateral surface of the tank body.

In a separate aspect, the present invention is related to a tank configured to receive and store used cooking oil. The tank may comprise a transverse member. The transverse member may comprise a plurality of fangs extending downwardly therefrom to form a shoulder configured to engage the removeable plate. The removeable plate may define a plurality of slots therein such that the fangs can be positioned therethrough and then the removable plate positioned so as to abut and be supported on the shoulder.

In a separate aspect, the present invention is related to a tank configured to receive and store used cooking oil. The tank may comprise a first engagement lip and a second engagement lip located on the first lateral surface and the second lateral surface, respectively. When the removable plate may be positioned inside the tank body, a first end of the lockable bar may be secured to the first engagement lip and a second end of the lockable bar may be secured to the second engagement lip to lock the removable plate in position.

In a separate aspect, the present invention is related to a tank configured to receive and store used cooking oil. The tank may comprise a first lock and a second lock. The first lock may be configured to secure the first engagement lip to the first end of the lockable bar. The second lock may be configured to secure the second engagement lip to the second end of the lockable bar.

In a separate aspect, the present invention is related to a tank configured to receive and store used cooking oil. The tank may comprise a first lateral tank surface and a second lateral tank surface. The first lateral tank surface and the second lateral tank surface may each have a shield thereon which may be configured to prevent cutting of a hasp of the first lock and cutting of a hasp of the second lock.

In a separate aspect, the present invention is related to a tank configured to receive and store used cooking oil. The tank may comprise a first lock and a second lock. The first lock may be configured to secure the first engagement lip to the first end of the lockable bar. The second lock may be configured to secure the second engagement lip to the second end of the lockable bar. A portion of the lockable bar may have an internal carbide layer.

In a separate aspect, the present invention is related to a tank configured to receive and store used cooking oil. The tank may comprise a porous plate. The porous plate may be at least equal to and between forty-five degrees (45°) and ninety degrees (90°) from horizontal.

In a separate aspect, the present invention is related to a tank configured to receive and store used cooking oil. The tank may comprise four first connecting brackets located along a top perimeter edge of the tank body. The tank may also comprise four feet positioned on the base of the tank body. Each of the four feet may have a second connecting bracket thereon. Each one of the first connecting brackets on the tank may be configured to engage with and lock into one of the second connecting brackets on a second tank which may be configured identically to the tank thereby allowing the second tank to stack onto the tank.

In a separate aspect, the present invention is related to a tank configured to receive and store used cooking oil. The tank may comprise handles located the front tank surface. The handles may be movable between a first, extended position and a second, folded position.

In a separate aspect, the present invention is related to a tank configured to receive and store used cooking oil. The tank may comprise a lid. The lid may be connected to the tank body by a pair of hinges. Each of the pair of hinges may have a curved track configured to accommodate a pin located on each of the first lateral tank surface and the second lateral tank surface.

In a separate aspect, the present invention is related to a tank configured to receive and store used cooking oil. The tank may comprise a mounting module located on the front tank surface. The mounting module may be configured to connect to a liquid carrier such that a person dumping liquid into the tank via the liquid carrier may be assisted.

In a separate aspect, the present invention is related to a tank configured to receive and store used cooking oil. The tank may comprise an interior gauge located on an inside of at least one of the first lateral tank surface and the second lateral tank surface. The interior gauge may indicate an amount of the liquid stored inside the chamber.

In a separate embodiment, the present invention is related to a tank configured to receive and store used cooking oil. The tank may comprise a tank body. The tank body may define a chamber therein configured to receive used cooking oil. The tank body may comprise a base panel, a top panel, and a sidewall extending between the base panel and the top panel. Portions of the sidewall may form a front tank surface, a first lateral tank surface, and a second lateral tank surface. The top panel may define an opening therein proximate to the front tank surface. The opening may extend between the first lateral tank surface and the second lateral tank surface. The tank may also comprise a lid. The lid may be pivotally attached to the top panel such that the lid is moveable between a first, closed position in which the lid, in combination with the top panel block the opening to prevent the flow of used cooking oil into the tank and a second, open position in which used cooking oil can flow into the tank.

In a separate aspect, the present invention is related to a tank configured to receive and store used cooking oil. The tank may comprise a tank body and a lid. The tank body and the lid may be metallic formed by a first material. The tank body may be welded to form a one piece body. At least a portion of the tank body may include a second layer formed by a second material. The second layer may have an increased hardness such that the at least a portion of the tank body may be more difficult to cut through.

In a separate embodiment, the present invention is related to a tank configured to receive and store used cooking oil. The tank may comprise a tank body. The tank body may define a chamber therein configured to receive used cooking oil. The tank body may comprise a base panel, a top panel, and a sidewall extending between the base panel and the top panel. Portions of the sidewall may form a front tank surface, a first lateral tank surface, and a second lateral tank surface. The top panel may define an opening therein proximate to the front tank surface. The opening may extend between the first lateral tank surface and the second lateral tank surface. The tank may also comprise a lid. The lid may be pivotally attached to the top panel such that the lid is moveable between a first, closed position in which the lid, in combination with the top panel block the opening to prevent the flow of used cooking oil into the tank and a second, open position in which used cooking oil can flow into the tank. The tank body and the lid may be metallic formed by a first material. The tank body may be welded to form a one piece body. At least a portion of the tank body may include a second layer formed by a second material. The second layer may have an increased hardness such that the at least a portion of the tank body may be more difficult to cut through.

In a separate aspect, the present invention is related to a tank configured to receive and store used cooking oil. The tank may comprise a first material and a second material. The second material may be carbide.

In a separate embodiment, the present invention is related to a tank configured to receive and store liquid. The tank may have four sides, a top, and a bottom. The tank may also comprise a lid. The lid may be opened so that liquid may be poured into the tank or taken out of the tank.

BRIEF DESCRIPTION OF THE DRAWINGS

The foregoing summary, as well as the following detailed description of the preferred embodiments of the present invention will be better understood when read in conjunction with the appended drawings. For the purpose of illustrating the invention, there are shown in the drawings embodiments which are presently preferred. At least one of the embodiments of the present invention is accurately represented by this application's drawings which are relied on to illustrate such embodiment(s) to scale and the drawings are relied on to illustrate the relative size, proportions, and positioning of the individual components of the present invention accurately relative to each other and relative to the overall embodiment(s). Those of ordinary skill in the art will appreciate from this disclosure that the present invention is not limited to the scaled drawings and that the illustrated proportions, scale, and relative positioning can be varied without departing from the scope of the present invention as set forth in the broadest descriptions set forth in any portion of the originally filed specification and/or drawings. It is understood, however, that the invention is not limited to the precise arrangements and instrumentalities shown. In the drawings.

DETAILED DESCRIPTION OF THE PREFERRED EMBODIMENT

Figure 1:
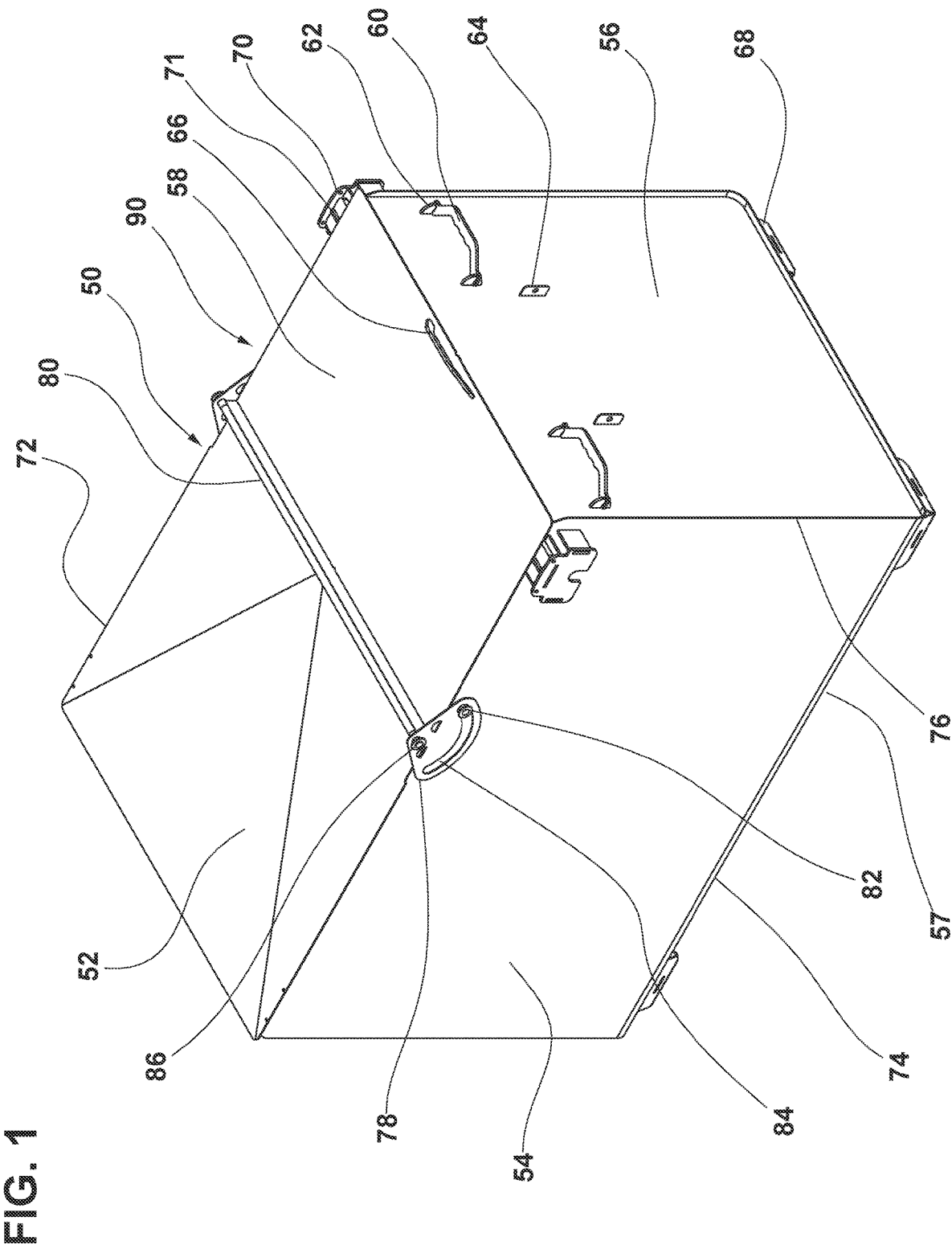
FIG. 1 is a front perspective view of a liquid tank 50 in the preferred embodiment. This figure shows the tank 50 may comprise a top 52, a first side 54, a front 56, a lid 58, and a bottom 57. The front 56 may be configured to have a tank handle 60 connected by a tank handle connector 62. The front 56 may also comprise a transit mount bracket 64 for attaching a transit mount 250. The tank 50 may have a top edge 72 connecting the top 52 to the first side 54. The tank 50 may also have a bottom edge 74 connecting the bottom 57 to the first side 54. The tank may further comprise a corner 76 connecting the front 56 to the first side 54. The lid 58 may comprise a lid handle 66 to allow the user to more easily open the lid 58. The lid 58 may be shown in the first, closed position 90. The bottom 57 may also comprise feet 68 for supporting the tank 50 on a surface. The lid 58 may further comprise a hinge mechanism 78 that may be in the shape of a smiley face. The hinge mechanism 78 may comprise a track, or channel, 84. The top 52 of the tank 50 may be configured with a hinge rotation bar 80 which may extend through the hinge mechanism 78 and be held in place by the hinge rotation bar ends 86. A hinge pin 82 may be located on the first side 54 of the tank 50 and extend into the channel 84. The hinge mechanism 78 may allow the lid 58 to move from the first, close position 90.
Figure 2:
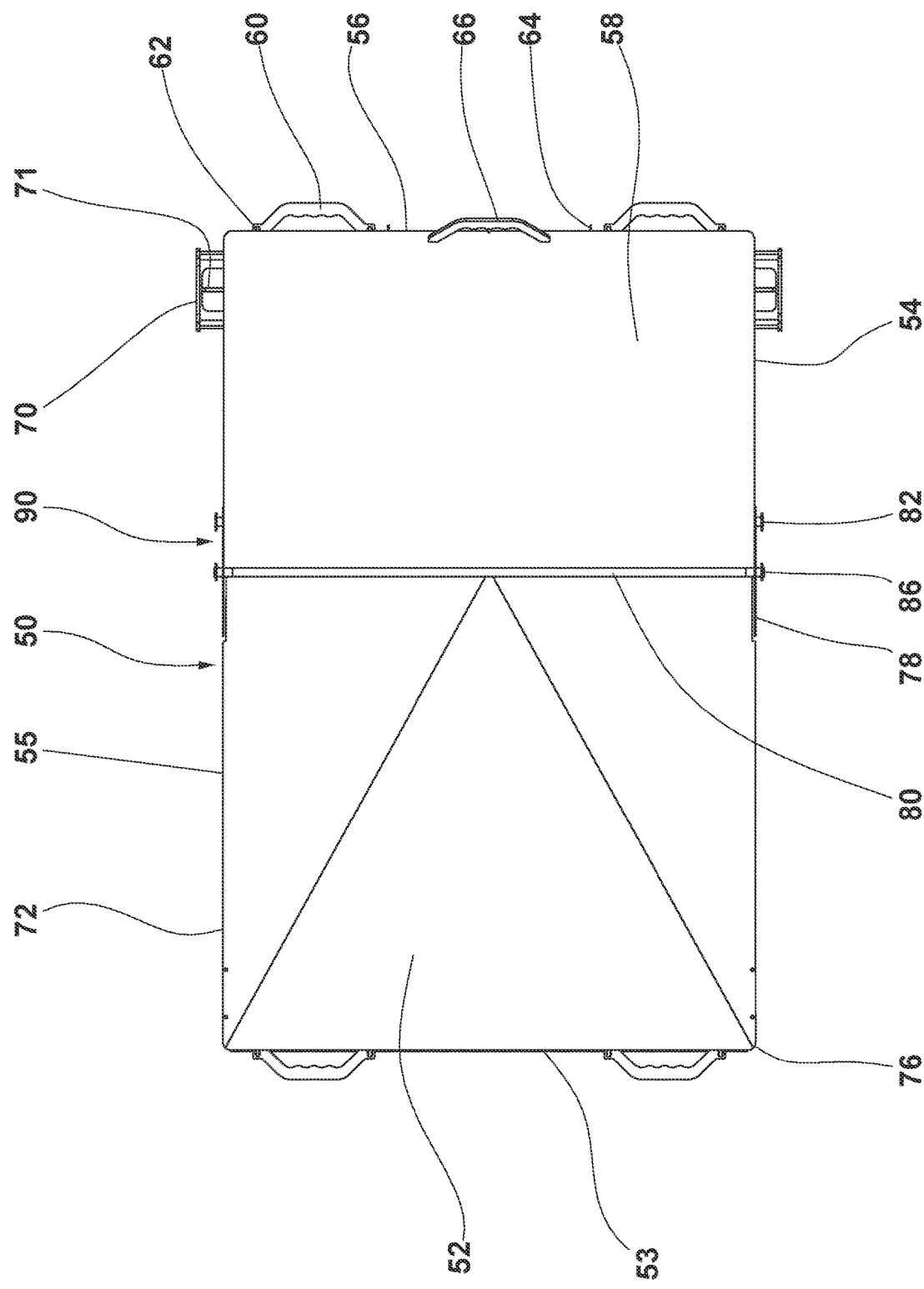
FIG. 2 is a top view of a liquid tank 50 in the preferred embodiment. Here, it may be seen that the lid 58 is coplanar with the top 52 when the lid 58 is in the first, close position 90. The tank 50 may also comprise a second side 55 opposite the first side 54. The first side 54 and the second side 55 may have shields 70 extending therefrom toward the front 56. The shield 70 may surround a locking bar 71 extending thereinto. The tank 50 may also comprise a back 53 opposite the front 56. There may be tank handles 60 extending from the back 53 opposite the tank handles 60 extending from the front 56.

Certain terminology is used in the following description for convenience only and is not limiting. The words "right," "left," "up," and "down" designate the directions as they would be understood by a person facing in the viewing direction unless specified otherwise. At least one of the embodiments of the present invention is accurately represented by this application's drawings which are relied on to illustrate such embodiment(s) to scale and the drawings are relied on to illustrate the relative size, proportions, and positioning of the individual components of the present invention accurately relative to each other and relative to the overall embodiment(s). Those of ordinary skill in the art will appreciate from this disclosure that the present invention is not limited to the scaled drawings and that the illustrated proportions, scale, and relative positioning can be varied without departing from the scope of the present invention as set forth in the broadest descriptions set forth in any portion of the originally filed specification and/or drawings. The words "outer" and "inner" refer to directions away from and toward, respectively, the geometric center of the specified element, or, if no part is specified, the geometric center of the liquid tank 50. The terms "downward" and "upward" refers to directions above (or away from) and below (or toward) the bottom 57 during operation, respectively, unless specified otherwise. The terms "forward" and "front" refer to a direction in front of the liquid tank 50, and the term "rear" and back refers to a direction behind the liquid tank 50. The terms "axial" and "radial" refer to directions along the axis of rotation A and/or B and around the axis of rotation A and/or B, respectively. The terms "touching," "abutting," "against," and "contacting" when used in connection with two surfaces is defined as meaning "being positioned anywhere between actual touching of two surfaces to being in facing orientation and within 1 inch (or 2.54 centimeters) apart." Those of ordinary skill in the art will appreciate from this disclosure that when a range is provided such as (for example) an angle/distance/number/weight/volume/spacing being between one (1 of the appropriate unit) and ten (10 of the appropriate units) that specific support is provided by the specification to identify any number within the range as being disclosed for use with a preferred embodiment. For example, the recitation of a percentage of copper between one percent (1%) and twenty percent (20%) provides specific support for a preferred embodiment having two point three percent (2.3%) copper even if not separately listed herein and thus provides support for claiming a preferred embodiment having two point three percent (2.3%) copper. By way of an additional example, a recitation in the claims and/or in portions of an element moving along an arcuate path by at least twenty (20°) degrees, provides specific literal support for any angle greater than twenty (20°) degrees, such as twenty-three (23°) degrees, thirty (30°) degrees, thirty-three-point five (33.5°) degrees, forty-five (45°) degrees, fifty-two (52°) degrees, or the like and thus provides support for claiming a preferred embodiment with the element moving along the arcuate path thirty-three-point five (33.5°) degrees. The language "at least one of 'A', 'B', and 'C'," as used in the claims and in corresponding portions of the specification, means "any group having at least one 'A'; or any group having at least one 'B'; or any group having at least one 'C'; -- and does require that a group have at least one of each of 'A', 'B', and 'C'." More specifically, the language 'at least two/three of the following list' (the list itemizing items '1', '2', '3', '4', etc.), as used in the claims, means at least two/three total items selected from the list and does not mean two/three of each item in the list. The term "interior", as used in the claims and corresponding portions of the specification means the area proximate to the center of the invention. The term "exterior" similarly defines the area not in proximity to the center of the invention. Additionally, the words "a" and "one" are defined as including one or more of the referenced items unless specifically stated otherwise. The terminology includes the words specifically mentioned above, derivatives thereof, and words of similar import.

Referring generally to FIGS. 1-43, wherein like numerals indicate like elements throughout, a liquid tank 50 is disclosed in its preferred embodiment. One of ordinary skill in the art would appreciate from this disclosure that the present invention may be used to transport, hold, and store various waste materials and liquids, including waste cooking oil, without departing from the scope of the present invention. The device may be entirely manually/hand driven and be free of (and/or not use) any motors, hydraulics, electrical devices, or similar drive producing mechanisms.

Referring generally to FIGS. 1-4, a liquid tank, or tank, 50 of the present invention may be seen. The liquid tank 50 may comprise a top, or top panel, 52, a back 53, a first side 54, a second side 55, a front 56, and a bottom, a base panel, 57. The back 53, the first side 54, the second side 55, and the front 56 together may comprise a sidewall of the tank 50. The liquid tank 50 may be hollow. The sidewalls 53, 54, 55, 56 may delineate corner edges 76 therebetween. The sidewalls 53, 54, 55, 56 and the top 52 may also define a top edge 72 therebetween. The sidewalls 53, 54, 55, 56 and the bottom 57 may define a bottom edge 74 therebetween. Together, the sidewalls 53, 54, 55, 56, the top 52 and the bottom 57 may define a tank body. One of ordinary skill in the art will appreciate from this disclosure that the sidewalls 53, 54, 55, 56, the top 52, and the bottom 57 may be flat, curved, rounded, or any other shape desirous for constructing a container for storing waste cooking oil without departing from the scope of the present invention. Preferably, but not necessarily, the tank 50 is rectangular. However, the tank 50 may be square, cubed, oblong, pill-shaped, oval, hexagonal, octagonal, round, or triangular without departing from the scope of the present invention The tank 50 may further comprise a lid 58 for covering and/or revealing an opening 88 in the top 52. The lid 58 shown in FIGS. 1-4 may be in a first, closed position 90. The lid 58 may be in the first, closed position 90 when liquid waste, or waste oil, is being stored within the tank 50, but the liquid waste is otherwise not being pumped out or more liquid waste is not being added to the tank 50. The front 56 of the tank 50 may further comprise a tank handle 60 connected by a tank handle connector 62. The tank handle 60 may allow a user to more easily manipulate and move the tank 50 to a desired storage location. The front 56 of the tank 50 may also comprise transit mount brackets 64 for connecting a transit mount 250 to the tank 50. The transit mount 250 is shown more detail in FIGS. 23-27 and 43.

Referring still to FIGS. 1-4, the lid 58 may be connected to the tank 50 by a hinge mechanism 78. The hinge mechanism 78 may have a track, or channel, 84 extending therethrough in a curved manner. The first side 54 and the second side 55 of the tank 50 may have hinge pins 82 extending therefrom. The hinge pins 82 may be configured to extend within the track 84 of the hinge mechanism 78. The hinge mechanism 78 may also be connected to the tank 50 by a hinge rotation bar 80. Hinge rotation bar 80 may have hinge rotation bar ends 86 configured to prevent the hinge mechanism 78 from us aligning and slipping off the hinge rotation bar 80. The hinge rotation bar 80 may have an axis of rotation A by which the lid 58 may rotate from the first, closed position 90, as seen in the present figures, to a second, open position 92, as seen in later figures. The hinge rotation bar 80 may be directly welded to or otherwise connected to the top 52 of the tank 50 whereas the lid 58 may only be connected to the tank 50 by the hinge mechanism 78 engaged with the hinge rotation bar 80. The lid 58 may further comprise a lid handle 66 to allow user to more easily open and close the lid 58.

Figure 3:
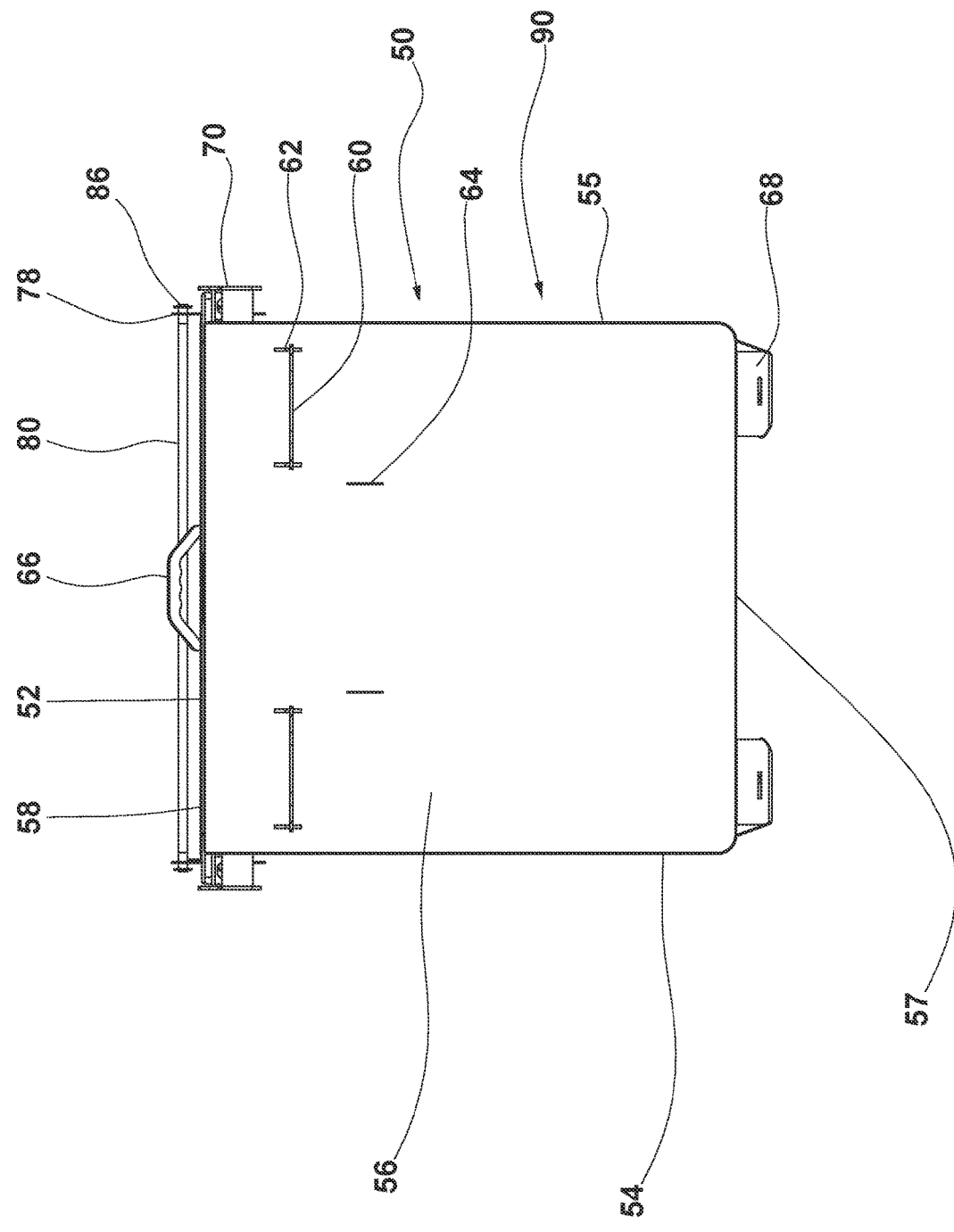
FIG. 3 is a front view of the liquid tank 50 in the preferred embodiment. Here, it may be seen that the hinge rotation bar 80 is above the surface of the top 52 and the lid 58 of the tank 50. The shields 70 may also be seen extending outwardly from the first side 54 and the second side 55. The foot 68 may be seen extending downwardly from the bottom 57.
Figure 4:
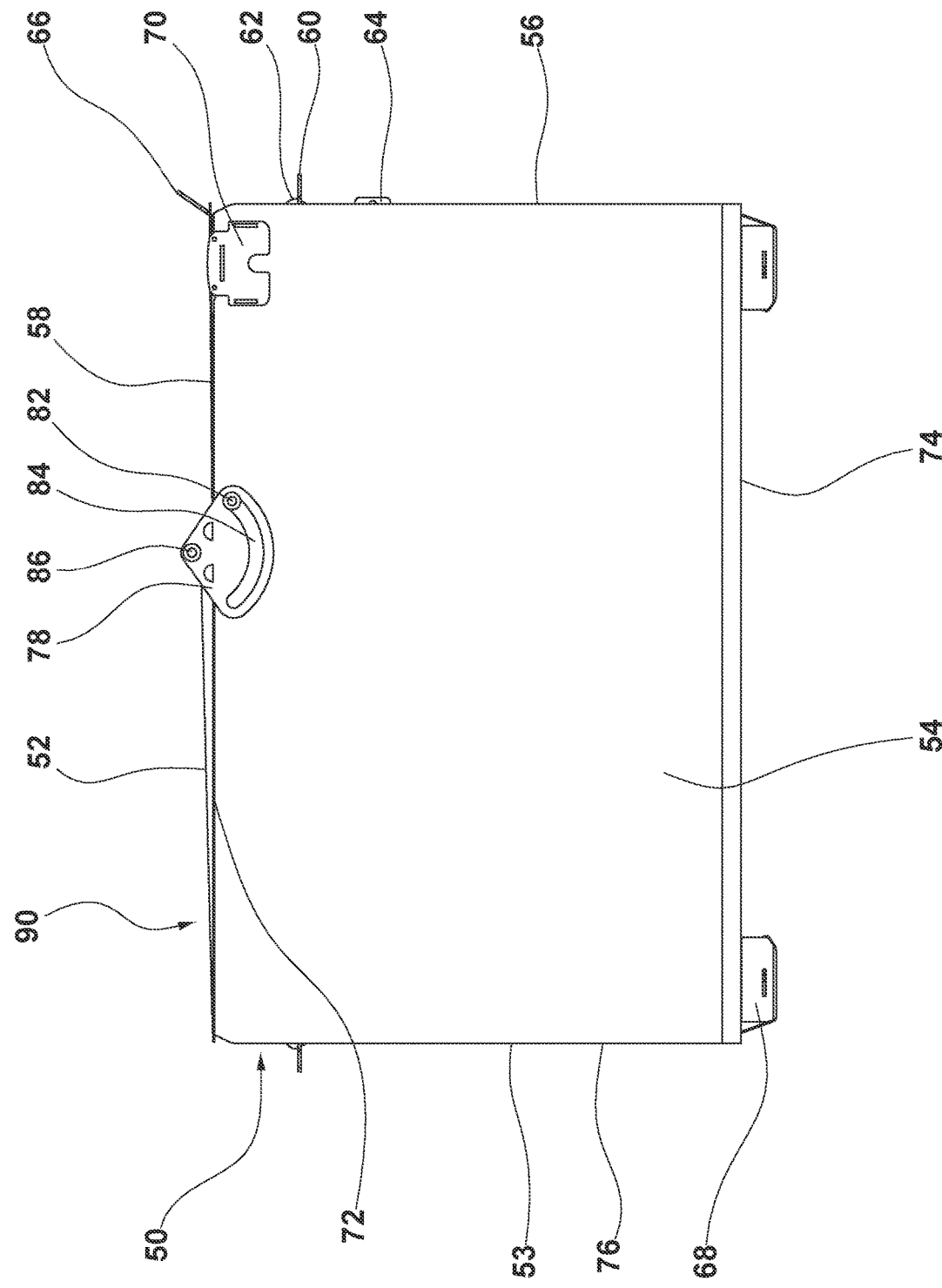
FIG. 4 is a side view of the tank 50 in the preferred embodiment. Here, it may be seen that the hinge pin 82 extends through the channel 84 of the hinge mechanism 78 at a point closer to the front 56 of the tank 50 when the lid 58 is in the first, close position 90. Also, the transit mount bracket 64 may be located on the front 56 of the tank 50 under the tank handle 60.

Referring still to FIGS. 1, 3, and 4, the tank 50 may further comprise feet 68 extending downwardly from the bottom 57. The feet 68 may contact a supporting surface, such as the ground, in order to support, and provide stability to, the tank 50. One of ordinary skill in the art will appreciate from this disclosure that the feet 68 may not be required and the bottom 57 of the tank 50 may contact the supporting surface without departing from the scope of the present invention.

Referring generally to FIGS. 1-4, the tank 50, excluding the lid 58, may be welded, or otherwise joined and produced, as one solid piece of metal, such as steel. The tank 50 may also comprise shields 70 extending outwardly from the first side 54 and the second side 55. The shields 70 may be configured to receive a locking bar 71, which may be seen in greater detail in later figures.

One of ordinary skill in the art will appreciate from this disclosure that the tank 50 may be rounded, hexagonal, tube-shaped, square, rectangular, or any other shape suitable to storing liquids without departing from the scope of the present invention.

Referring now generally to FIGS. 5-10, tank 50 is shown with the lid 58 in the second, open position 92. The lid 58 of the tank 50 may have been rotated about the axis of rotation A.

Here, the lid 58 may be generally perpendicular to the top 52 of the tank 50. "Generally perpendicular to the top 52 of the tank 50" preferably means that the lid 58 in the second, open position forms an angle with the top 52 of the tank of between sixty degrees (60°) and one-hundred twenty degrees (120°). More preferably, "generally perpendicular to the top 52 of the tank 50" means that the lid 58 in the second, open position forms an angle with the top 52 of the tank of between seventy-five degrees (75°) and one-hundred five degrees (105°). More preferably still, "generally perpendicular to the top 52 of the tank 50" means that the lid 58 in the second, open position forms an angle with the top 52 of the tank of between eighty-five degrees (85°) and ninety-five degrees (95°). Most preferably, "generally perpendicular to the top 52 of the tank 50" means that the lid 58 in the second, open position forms a ninety-degree (90°) angle with the top 52 of the tank 50.

Referring still to FIGS. 5-10, an opening 88 may be revealed when the lid 58 is in the second, open position 92. The top, or top panel, 52 may define the opening 88 therein proximate to the front, or front tank surface, 56. "Proximate to the front, or front tank surface, 56" preferably means that the opening 88 is positioned within six inches (6") of the front 56 of the tank 50. More preferably, "proximate to the front, or front tank surface, 56" means that the opening 88 is positioned within three inches (3") of the front 56 of the tank 50. More preferably still, "proximate to the front, or front tank surface, 56" means that the opening 88 is positioned within one inch (1") of the front 56 of the tank 50. Most preferably, "proximate to the front, or front tank surface, 56" means that the opening 88 is flush with an inner face the front 56 of the tank 50. The lid 58 may also comprise a lid underside 59. Within the opening 88, the first side 54 and the second side 55 may define first chamber inner faces 110.

Referring still to FIGS. 5-10, the tank 50 may comprise a removable plate 100. The removable plate 100 may be freely inserted into, or removed from, the tank 50 without departing from the scope of the present invention. The removable plate 100, when inserted into the tank 50, may be configured to allow a waste liquid, such as waste cooking oil, to flow thereover and into a first chamber 122 of the tank 50. The removable plate 100 may be positioned within the tank 50 at a sloped angle. "Positioned within the tank 50 at a sloped angle" preferably means that the removable plate 100 forms an angle with the top 52 of the tank 50 of between five degrees (5°) and forty-five degrees (45°). More preferably, "positioned within the tank 50 at a sloped angle" means that the removable plate 100 forms an angle with the top 52 of the tank 50 of between fifteen degrees (15°) and thirty-five degrees (35°). More preferably still, "positioned within the tank 50 at a sloped angle" means that the removable plate 100 forms an angle with the top 52 of the tank 50 of between twenty degrees (20°) and thirty degrees (30°). Most preferably, "positioned within the tank 50 at a sloped angle" means that the removable plate 100 forms an angle with the top 52 of the tank 50 of twenty-five degrees (25°).

The removable plate 100 is preferably, but not necessarily, free of any screening. It is also preferable that holes or slits through the removable plate 100 are equal to or between sixty percent (60%) and zero percent (0%) of the surface area of the removeable plate 100. It is more preferable that holes or slits through the removeable plate 100 are equal to or between forty percent (40%) and zero percent (0%) of the surface area of the removeable plate 100. It is more preferable still that holes or slits through the removeable plate 100 are equal to or between twenty percent (20%) and zero percent (0%) of the surface area of the removeable plate 100. It is still more preferable that holes or slits through the removeable plate 100 are equal to or between ten percent (10%) and zero percent (0%) of the surface area of the removeable plate 100. It is also preferable that holes or slits through the removeable plate 100 are equal to or between five percent (5%) and zero percent (0%) of the surface area of the removeable plate 100. It is also preferred, but not necessary, that the removeable plate 100 not be made of flexible material. The moveable plate is preferably formed of one or more metallic materials with an overall minimum thickness of one sixteenth of an inch (1/16 in.) The removeable plate 100 is more preferably formed of one or more metallic materials with an overall minimum thickness of one eighth of an inch (1/8 in.) The removeable plate 100 is more preferably still formed of one or more metallic materials with an overall minimum thickness of one quarter of an inch (1/4 in.).

Figure 5:
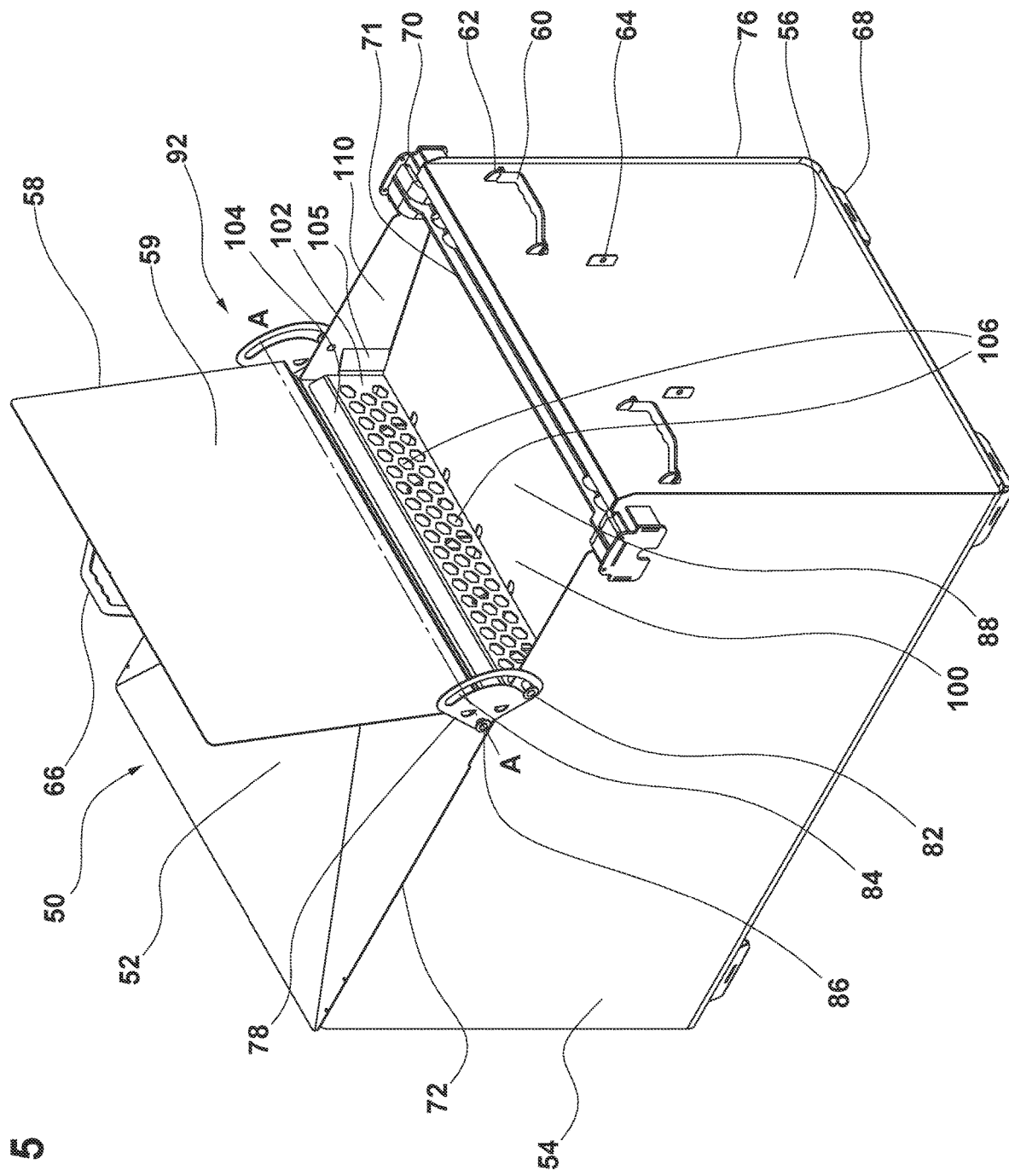
FIG. 5 is a front perspective view of the tank 50 in the preferred embodiment. Here, the lid 58 is shown in a second, open position 92. The lid 58 may comprise a lid underside 59. In the second, open position 92, the lid 58 may reveal an opening 88 in the top 52 of the tank 50. In the opening 88, the tank 50 may further comprise a removable plate 100. The removable plate 100 may be positioned within the opening 88 forming the bottom of a second chamber 114 delineated at the sides by a first chamber face 110. The second chamber 114 may further be defined toward the center of the tank 50 by a porous plate 102. The porous plate 102 may include a plurality of holes 106. The plurality of holes 106 may be hexagon shaped. The porous plate 102 may include a porous plate tab 104 extending upwardly therefrom. The removable plate 100 may also comprise side flanges 105 located at an end of the removable plate 100 proximate the porous plate 102.

Referring specifically to FIG. 5, the tank 50 may further comprise a porous plate 102 extending downwardly toward the lower end of the removable plate 100. The porous plate 102 may have a plurality of holes 106 configured to allow the waste liquid to run therethrough. One of ordinary skill in the art may appreciate from this disclosure that the plurality of holes may hexagonal, round, square, octagonal, or any other sufficiently open shape so as to allow waste to run through them as desired without departing from the scope of the present invention. The porous plate 102 may comprise a porous plate tab 104 extending upwardly and side flanges 105 extending outwardly to reinforce the porous plate 102 and prevent shifting and/or movement of the porous plate 102 when installed into the tank 50. The porous plate 102 may be positioned generally vertically proximate to a back side of the opening 88. "Positioned generally vertically proximate to a back side of the opening 88" preferably means that the porous plate 102 is positioned within six inches (6") of the edge of the top 52 of the tank 50 closest to the opening 88. More preferably, "positioned generally vertically proximate to a back side of the opening 88" means that the porous plate 102 is positioned within three inches (3") of the edge of the top 52 of the tank 50 closest to the opening 88. More preferably still, "positioned generally vertically proximate to a back side of the opening 88" means that the porous plate 102 is positioned within one inch (1") of the edge of the top 52 of the tank 50 closest to the opening 88. Most preferably, "positioned generally vertically proximate to a back side of the opening 88" means that the porous plate 102 is positioned with flush with the edge of the top 52 of the tank 50 closest to the opening 88.

The porous plate 102 may be positioned at the lower end of the inserted removable plate 100 such that liquid poured over the removable plate 100 flows through the plurality of holes 106. The liquid may flow through the lower holes 106 first before flowing through the upper holes 106. Due to the viscosity and clogging nature of the typical kinds of waste oils to be dumped into the tank 50, the lower holes 106 may become clogged and/or blocked by the residual oil and/or particulates. When this may occur, the waste liquids or oils may flow up and over the lower holes and through the upper holes 106 of the porous plate 102.

The porous plate 102 is preferably, but not necessarily, free of any screening. The porous plate 102 is more preferably not a screen. It is also preferable that the plurality of holes 106 through the porous plate 102 are equal to or greater than ten percent (10%) of the surface area of the porous plate 102. It is more preferable that the plurality of holes 106 through the porous plate 102 are equal to or greater than twenty percent (20%) of the surface area of the porous plate 102. It is more preferable still that the plurality of holes 106 through the porous plate 102 are equal to or greater than thirty percent (30%) of the surface area of the porous plate 102. It is still more preferable that the plurality of holes 106 through the porous plate 102 are equal to or greater than forty percent (40%) of the surface area of the porous plate 102. It is also preferable that the plurality of holes 106 through the porous plate 102 are equal to or greater than fifty percent (50%) of the surface area of the porous plate 102. It is also preferred, but not necessary, that the porous plate 102 not be made of flexible material. The porous plate 102 is preferably formed of one or more metallic materials with an overall minimum thickness of one sixteenth of an inch (1/16 in.) The porous plate 102 is more preferably formed of one or more metallic materials with an overall minimum thickness of one eighth of an inch (1/8 in.) The porous plate 102 is more preferably still formed of one or more metallic materials with an overall minimum thickness of one quarter of an inch (1/4 in.).

The porous plate 102 may preferably, but not necessarily, be free of any filters or filtering components. The porous plate 102 may preferably, but not necessarily, be not a filter. The porous plate 102 may allow waste liquids, such as waste cooking oil, to flow into the first chamber 122. However, the nature of the porous plate 102 being solid with holes therein may also prevent unauthorized individuals or thieves from accessing the first chamber 122 even though waste oil can still freely enter the first chamber 122. The porous plate 102 may preferably, but not necessarily, be free of any wire, twisted wire, or cabling. The porous plate 102 may preferably, but not necessarily, be free of any netting.

Figure 6:
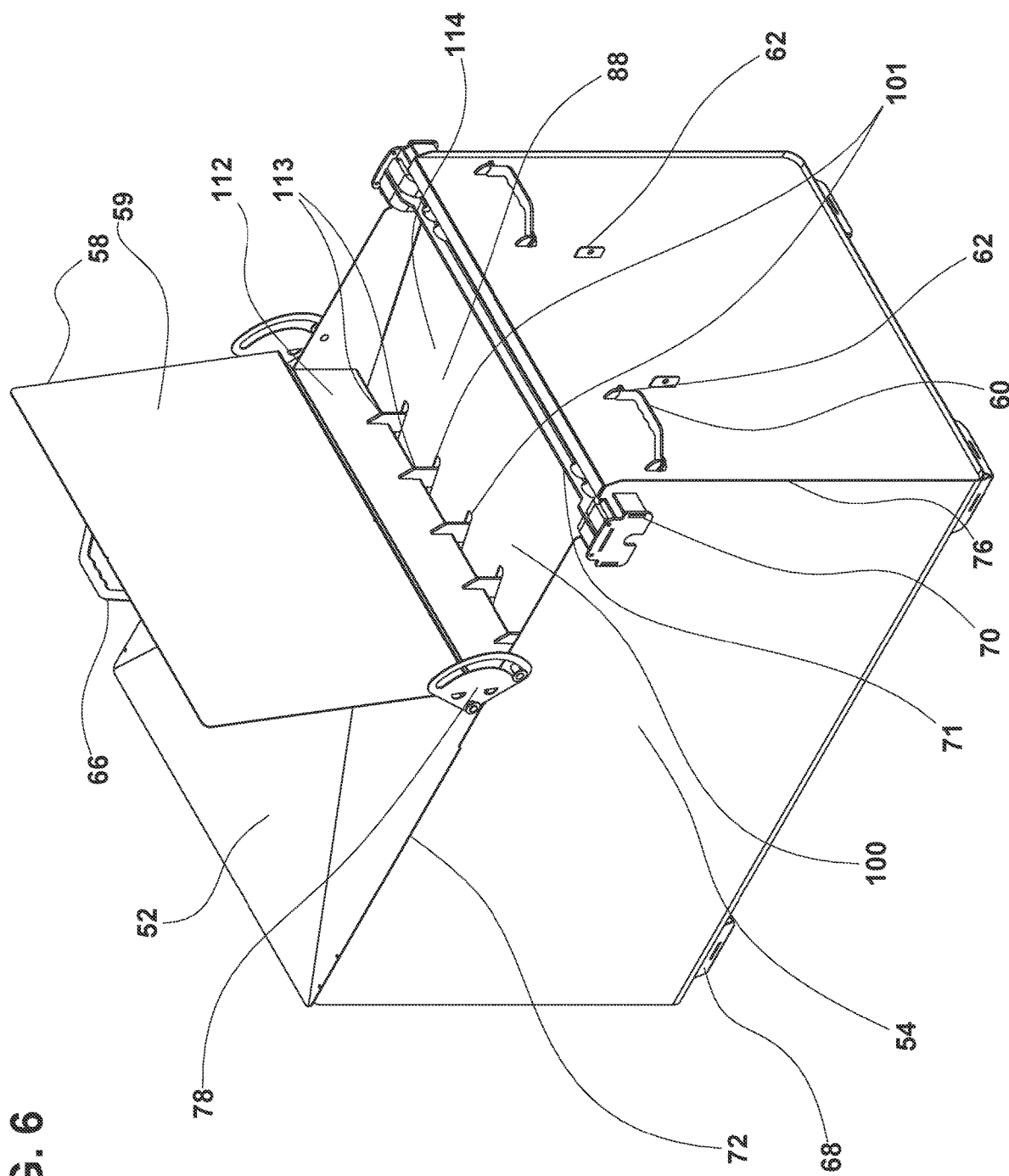
FIG. 6 is a front perspective view of the tank 50 in the preferred embodiment. Here, the porous plate 102 may have been removed. The removable plate 100 may comprise a plurality of slots 101 located at the lower end of the removable plate 100. The tank 150 may further comprise a transverse member 112 extending downwardly under the hinge rotation bar 80 and extending across the tank 50 from the first side 54 to the second side 55. The transverse number 112 may include a plurality of fangs 113. The plurality of fangs 113 may be evenly spaced at intervals corresponding to the even spacing of the plurality of slots 101 of the removal plate 100 such that the fangs 113 may extend therethrough.
Figure 7:
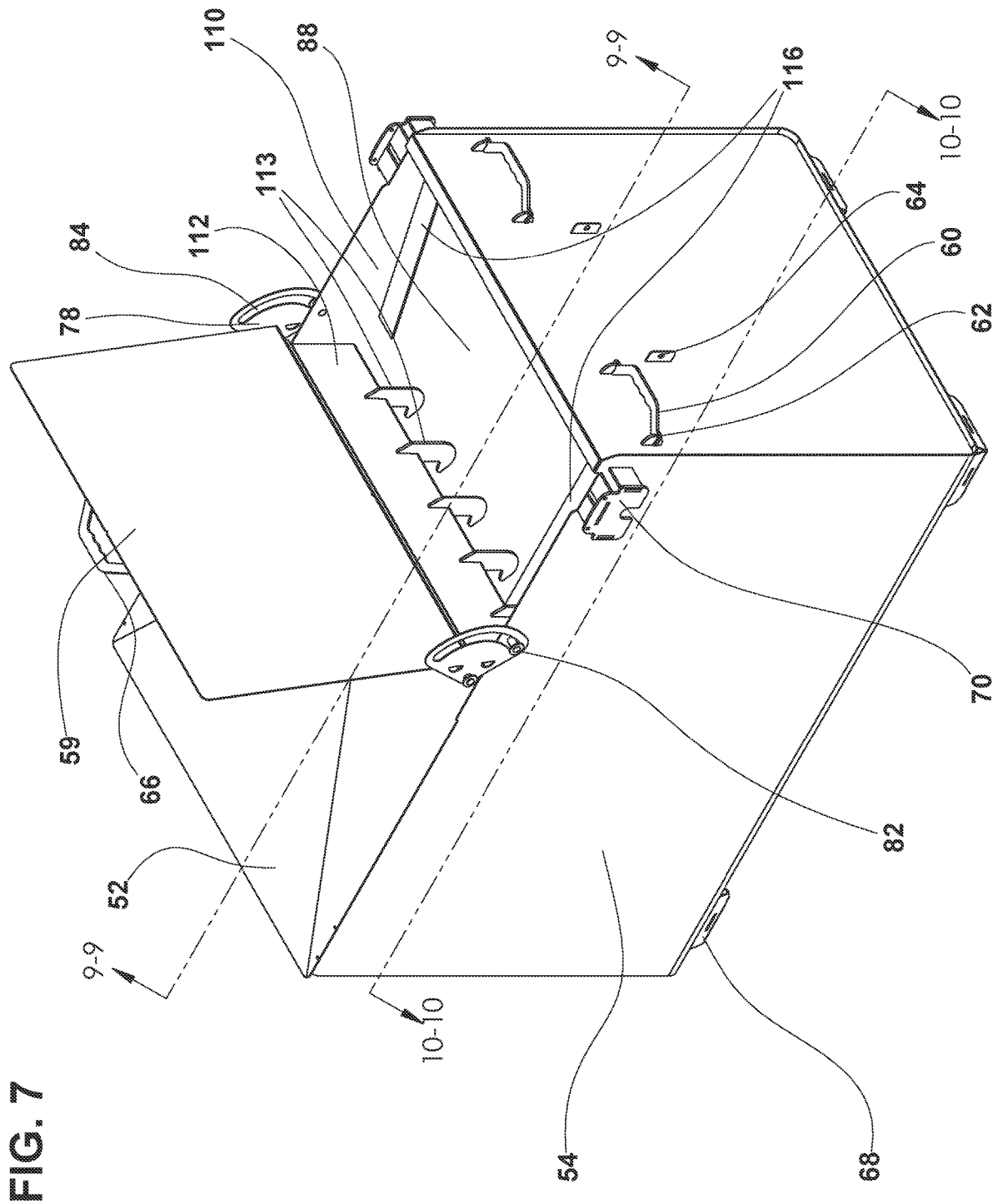
FIG. 7 is a front perspective view of the tank 50 in the preferred embodiment. Here, the removable plate 100 may have been removed. This figure shows more clearly how the fangs 113 may extend downwardly from the transverse number 112. This figure may also show side support panels 116 extending inwardly from the first chamber inner face 110. The side support panels 116 may provide further support for the removable plate when the removable plate 100 is inserted into the opening 88.

Referring specifically to FIG. 6, the tank 50 may be shown without the porous plate 102 inserted into the opening 88. The tank 50 may further comprise a transverse member 112 extending downwardly and between the first chamber inner faces 110. The transverse member 112 may comprise a plurality of fangs 113 configured to extend through a plurality of slots 101 in the removable plate 100. The plurality of fangs 113 may help with aligning the removable plate 100 and further supporting the removable plate 100. Transverse member 112 may be formed integrally with the rest of the tank 50. The removable plate 100, first chamber faces 110, and the transverse member 112 together may define the second chamber 114.

One of ordinary skill in the art will appreciate from this disclosure that the removable plate 100 may be positioned at a sloped angle, may be positioned flatly, may be positioned at angle between the sidewalls, may be comprised of multiple pieces, may be stepped with vertical or sloped surface joining horizontal surfaces, or may have an overall curved shape without departing from the scope of the present invention.

Referring generally now to FIGS. 7-10, the tank 50 is shown with the removable plate 100 removed from the tank 50. It may be desirous to remove to access the second chamber the tank 50 in order to access the first chamber 122 contained therein. Access to the first chamber 122 may be important for draining or otherwise pumping out the waste liquid from the tank 50. The first chamber inner faces 110 may have side support panels extending inwardly therefrom. The side support panels 116 may be configured to support and hold up the removable plate 100 when the removable plate 100 is inserted into the tank 50. It is preferred, but not necessary, that the only holes or slits in the removeable plate are to allow engagement between the removeable plate and the transverse member and/or the fangs of the transverse members.

Figure 8:
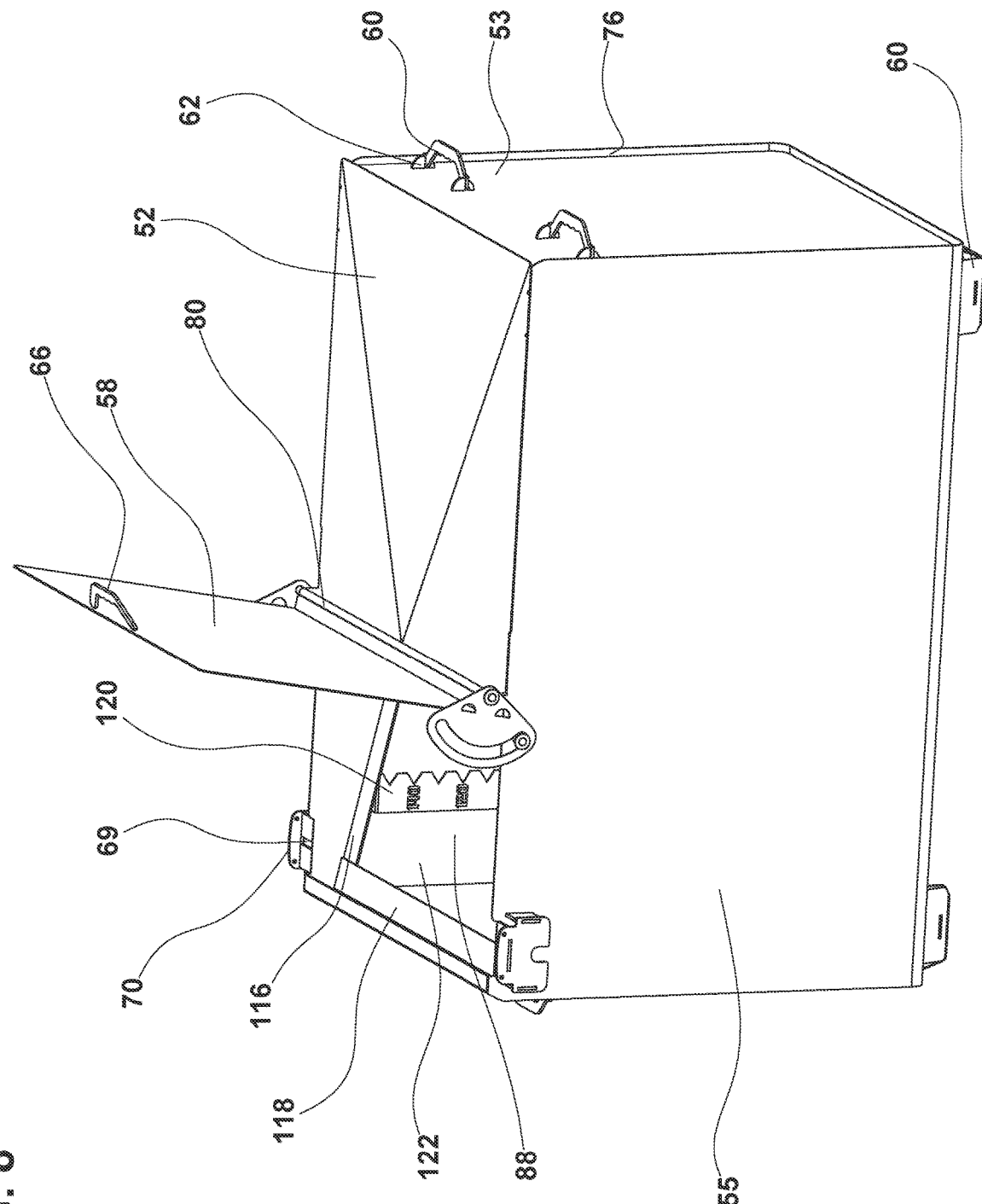
FIG. 8 is a side perspective view of the tank 50 in the preferred embodiment. Here, a front support panel 118 can be seen extending inwardly from the front 56 of the tank 50 and parallel to the side support panels 116. The fronts for panel 118 may provide further support, in addition to the side support panels 116, to the removable plate 100 when the removable plate 100 is inserted into the tank 50. This figure also illustrates an interior gauge 120 extending along the inside of the first side 54. The interior gauge 120 may allow a user the ability to quickly determine the volume of waste liquid contained within a first chamber 122 of the tank 50. The shield 70 may further comprise a locking bar slot 69 configured to receive the locking bar 71 when the removable plate 100 is inserted into the tank 50.
Figure 10:
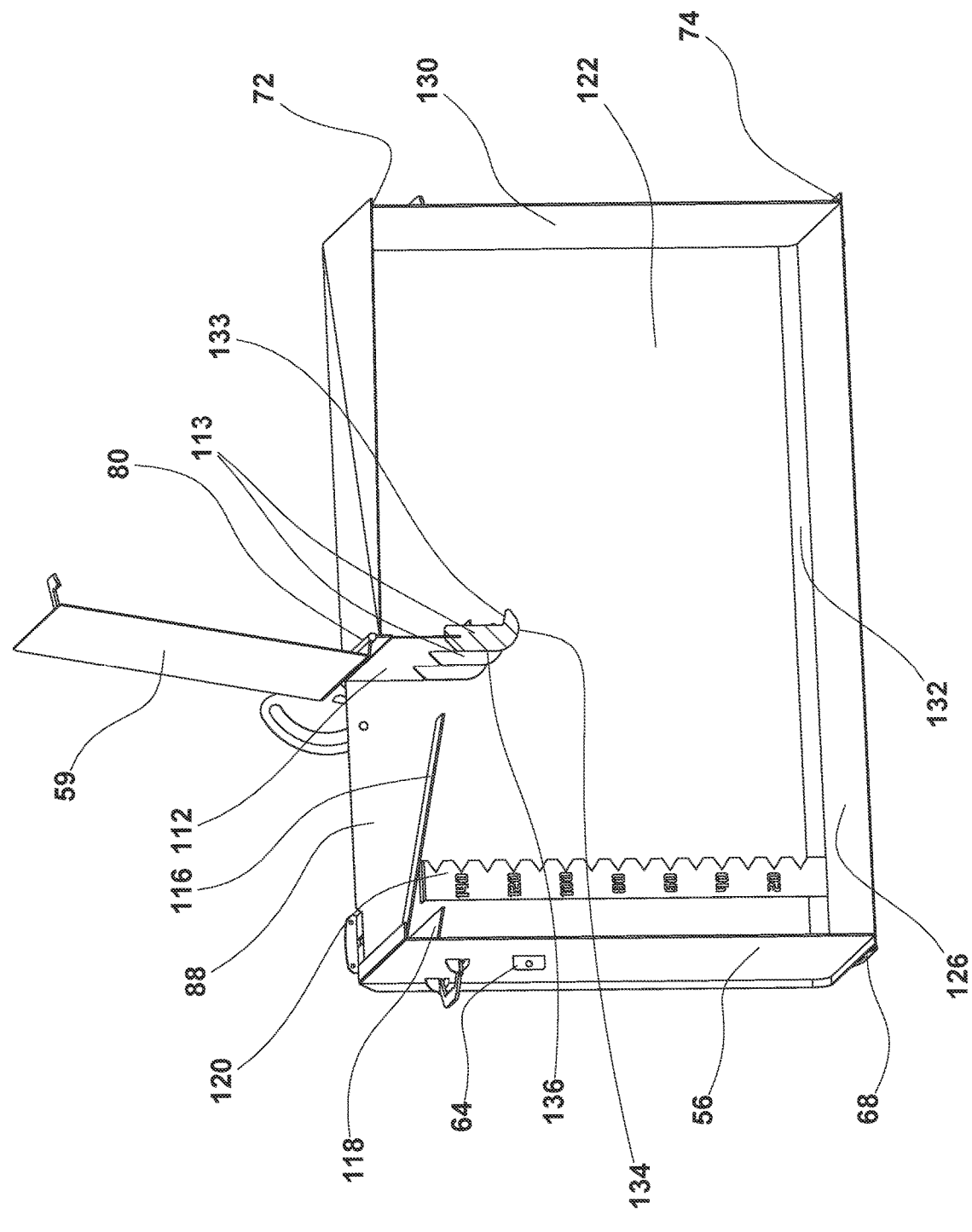
FIG. 10 is a side perspective, cross-sectional view of the tank 50 of the preferred embodiment taken along the line 10-10 of FIG. 7. Here, the fangs 113 of the transverse number 112 may be seen in greater detail. The fangs 113 may comprise a fang curved lower edge 134 connecting a fang supporting edge 132 and a fang front edge 136. The fang supporting edge 132 may be configured to help support the removable plate 100 by engaging with the slots 101.

Referring specifically to FIGS. 8 and 10, the tank 50 may comprise a first chamber 122 defined between the sidewalls 54, 55, 56, 57, the top 52, the bottom 57, the plane formed by the side support panels 116, and the transverse member 112. The first chamber 122 may be configured to store the waste liquid poured into the tank 50. An interior gauge 120 located along the inside of one, or both, of the first side 54 and the second side 55 may be utilized to quickly determine the how full the tank 50 is when waste liquid is contained therein. The interior gauge 120 may have a series of numbers indicating gallons or any other units of measurement for volume without departing from the scope of the present invention. The tank 50 may also comprise a front support panel 118 extending inwardly and coplanar with the side support panels 116. The front support panel 118, along with the side support panels 116, may provide support and alignment for the removable plate 100.

Figure 9:
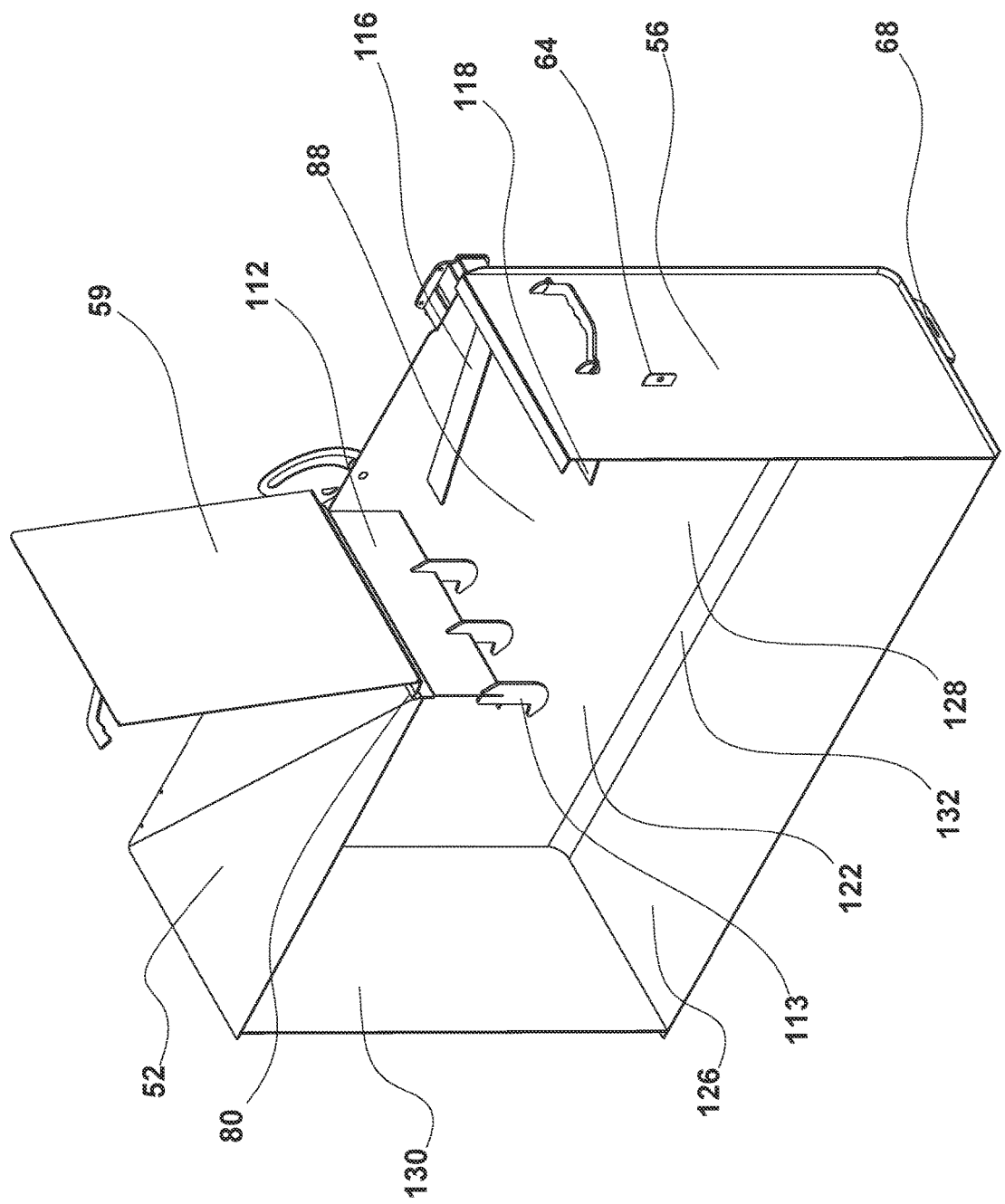
FIG. 9 is a front perspective, cross-sectional view of the tank 50 of the preferred embodiment taken along the line 9-9 of FIG. 7. Here, the details delineating the volume of the first chamber 122 may be seen. The back 53 of the tank 50 may have a back inner face 130 forming one side of the first chamber 122. The second side 55 of the tank 50 may have a second side inner face 128 from another side of the first chamber 122. The bottom 57 of the tank 50 may have bottom inner face 126. The bottom 57 may be connected to the second side 55 by a bent bottom edge 132.

Referring specifically to FIGS. 9 and 10, the bottom 57 of the tank 50 may have a bottom inner face 126. The second side 55 of the tank 50 may have a second side inner face 128. The back 53 of the tank 50 may have a back inner face 130. These inner faces 126, 128, 130 may be configured to be in contact with the fluid, liquid, and/or oil stored within the tank 50. A curved inner edge 132 may also join the first side wall 54 and the second side wall 55 to the bottom 57.

Referring specifically to FIG. 10, the plurality of fangs 113 may comprise a fang front edge 136 configured to prevent the removable plate 100 from sliding too far into the tank 50. The fangs 113 may also comprise a fang curved edge 134 that may define a fang supporting edge 133 thereon. The fang curved edge 134 may guide the removable plate 100 via the plurality of slots 101 down, around, and up onto the fang supporting edge 133. The fang supporting edges 133 may support the removable plate 100 when the plurality of slots 101 may engaged with the fang supporting edges 133 of the plurality of fangs 113.

One of ordinary skill in the art would appreciate from this disclosure that the first chamber 122 may have a capacity of at least 10 gallons without departing from the scope of the present invention.

Figure 11:
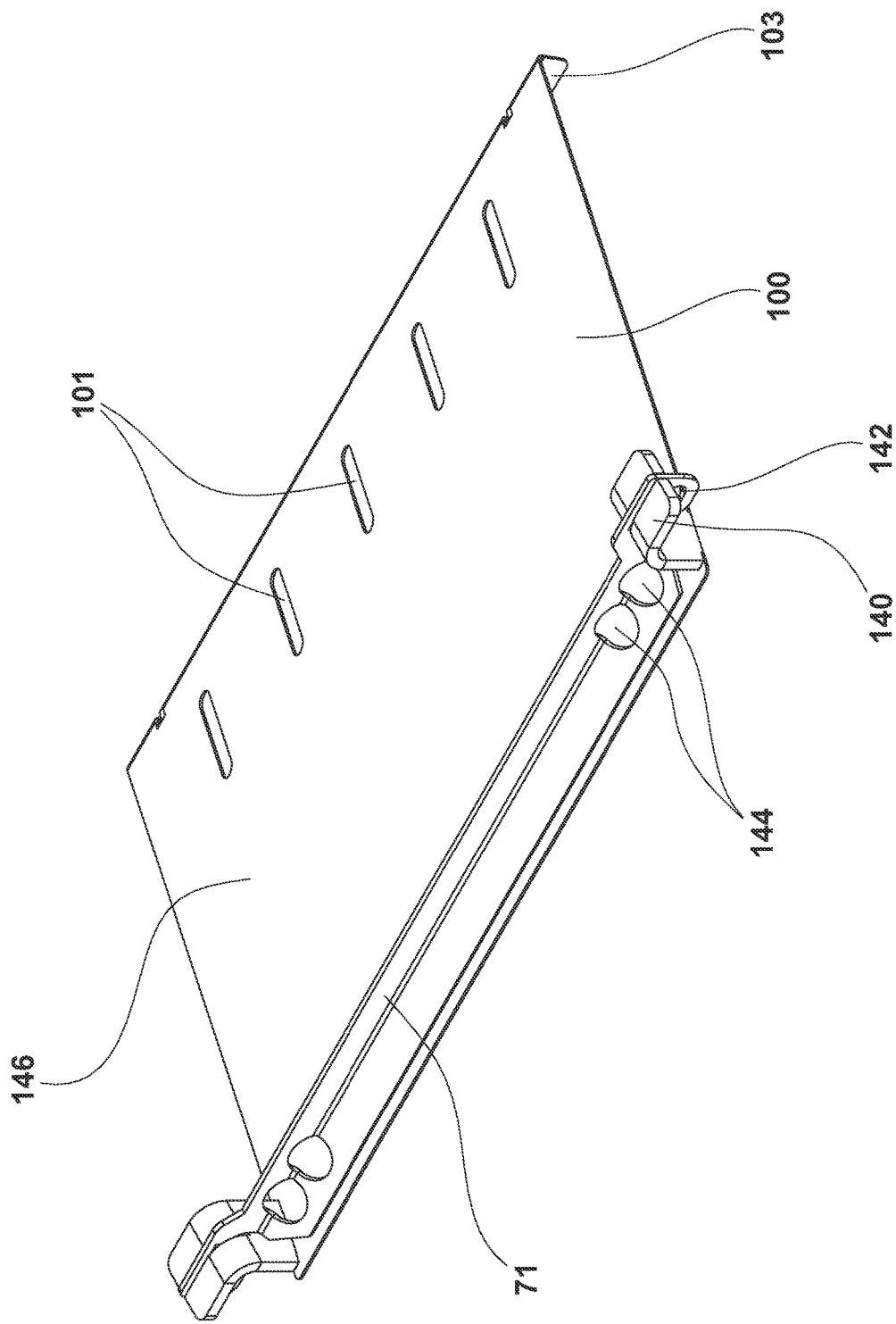
FIG. 11 is a top perspective view of the removable plate 100 in the preferred embodiment when disengaged with and removed from the tank 50. The removable plate 100 may comprise the locking bar 71. The locking bar 71 may comprise a locking bar reinforcement 140 extending at either end of the locking bar 71 to provide further rigidity. The locking bar reinforcement 140 may also be connected to and support a padlock hole 142. The padlock hole 142 may be configured to receive a traditional padlock or other type of lock in order to secure the locking bar 71, and the removable plate 100, to the tank 50. The locking bar 71 may also comprise a plurality of finger holes 144 for a user to engage with and more easily pull the removable plate 100 up and out of the opening 88 in the tank 50. The removable plate 100 may also have a removable plate upper surface 146 configured to accommodate a waste liquid or waste oil poured thereover.
Figure 12:
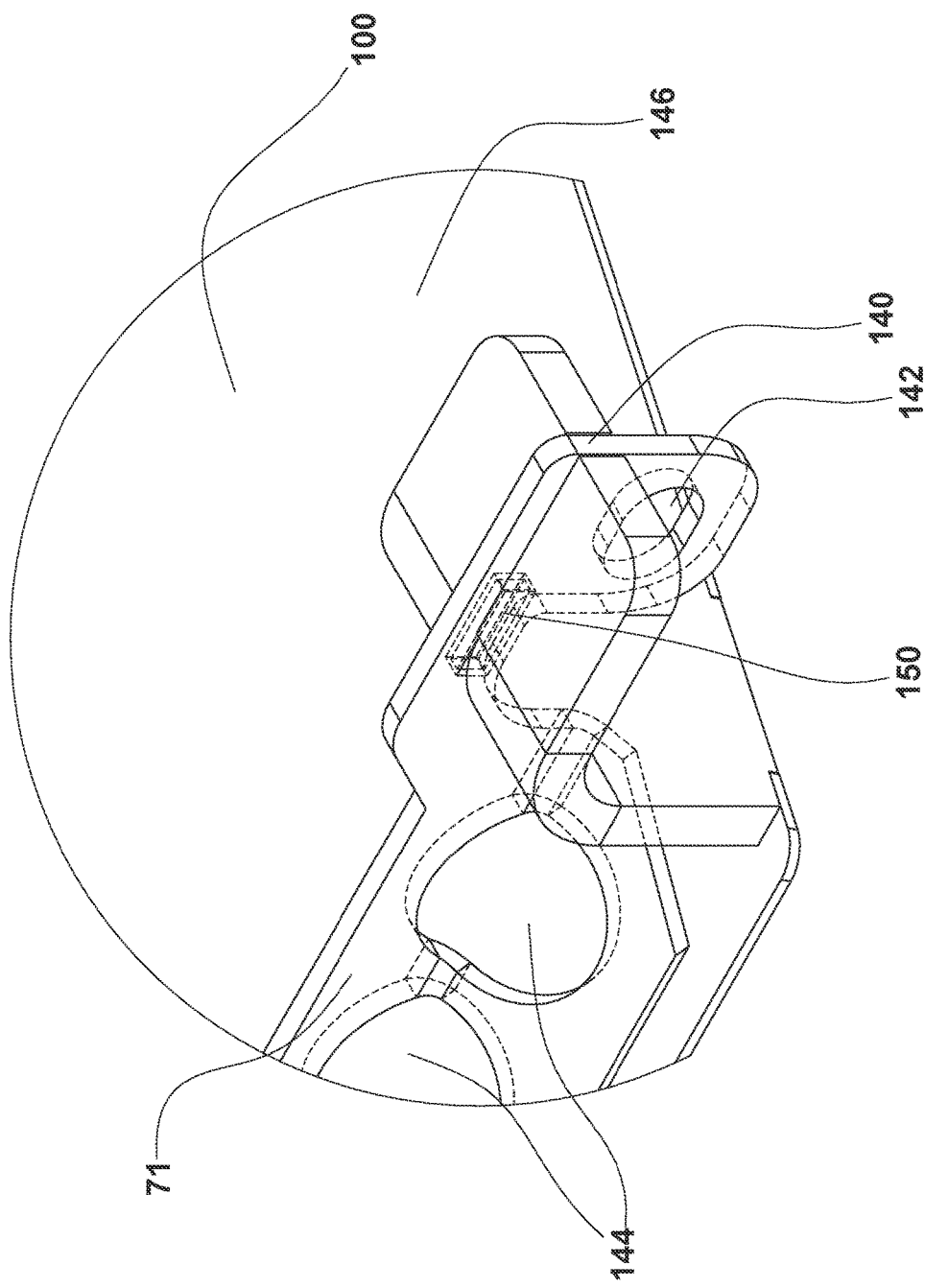
FIG. 12 is a close-up partial perspective view of the removable plate 100 in the preferred embodiment. This figure illustrates how the locking bar 71 may comprise an internal carbide layer 150. The carbide layer 150 may provide additional resistance to efforts to cut apart portions of the locking bar 71 and/or the padlock hole 142 as well as destroy saws and other cutting tools that may attempt to break the locking bar 71. The carbide layer 150 may provide added security to any potential unwarranted attempts to remove the removable plate 100.
Figure 13:
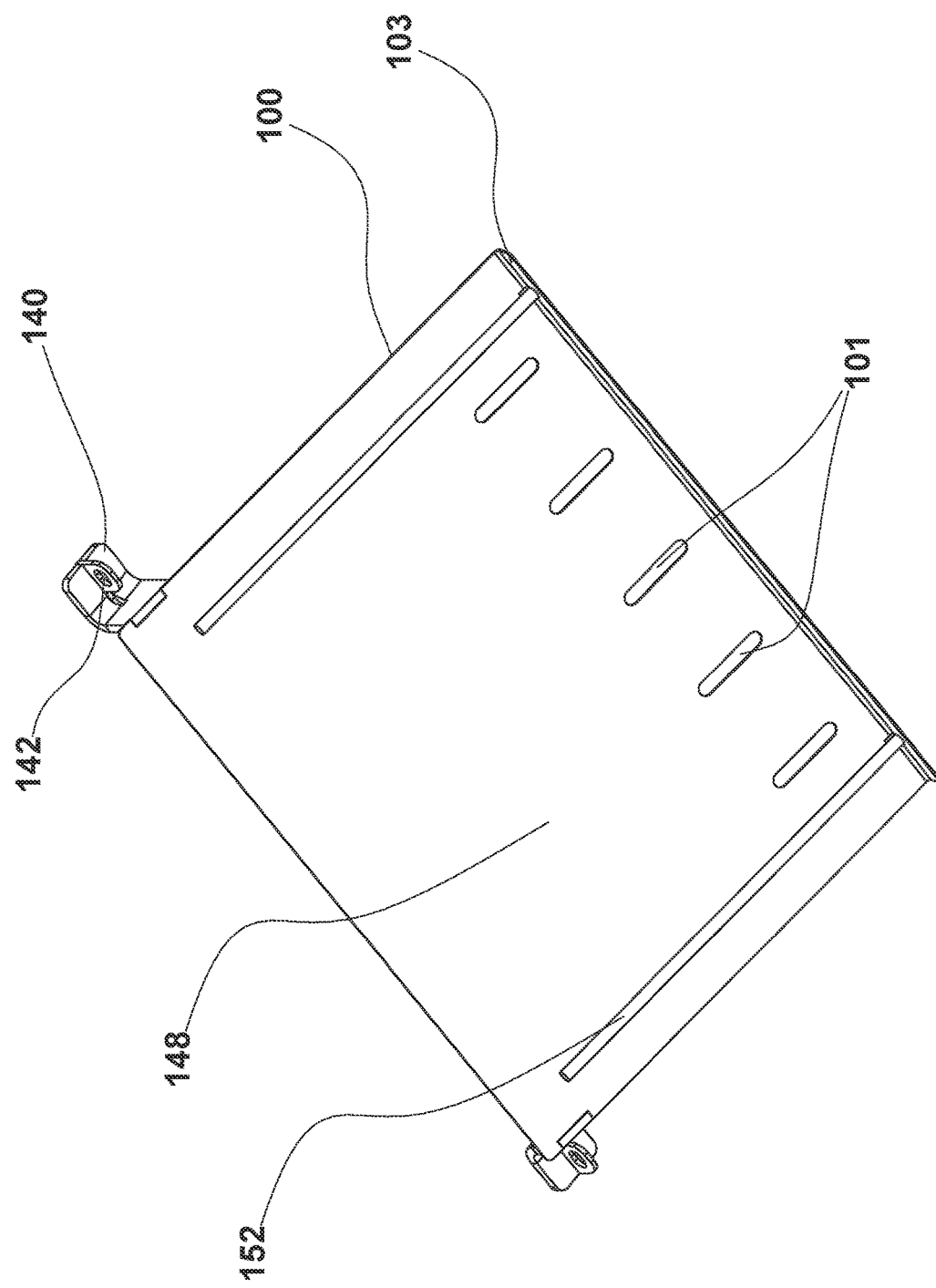
FIG. 13 is a bottom perspective view of the removable plate 100 in the preferred embodiment when disengaged with and removed from the tank 50. This figure illustrates a removable plate lower side 148 of the removable plate 100. The removable plate lower side 148 may comprise reinforcement bars 152 extending parallel to the removable plate lower side 148 from a downwardly extending removable plate flange 103. The reinforcement bars 152 and the removable plate flange 103 may provide further structural support to the removable plate 100.

Referring now generally to FIGS. 11-13, a preferred embodiment of the removable plate 100 may be seen when not engaged with the tank 50. The removable plate 100 may comprise a locking bar 71 spanning the width of the removable plate 100. Locking bar 71 may have locking bar reinforcements 140 located on either end of the locking bar 71. The locking bar reinforcements 140 may be configured to further shield and reinforce the locking bar 71 when engaged with the locking bar slots, or first and second engagement lips, 69 of the shields 70. The locking bar 71 may also comprise padlock holes 142 at either end. The padlock holes 142 may be configured to receive a padlock or other similar type of separate locking mechanism to lock the removable plate 100 into place within the tank 50. The locking bar 71 may also comprise a plurality of finger holes 144 configured to accommodate the user's hands and/or fingers when inserting the removable plate 100 into, or removing the removable plate 100 from, the tank 50.

Referring specifically to FIG. 11, a removable plate upper side 146 of the removable plate 100 may be seen. The removable plate upper side 146 may be configured to allow the waste liquid, or waste cooking oil, to flow thereover.

Referring specifically to FIG. 12, more details of the locking bar 71 may be seen. The locking bar 71 may preferably comprise a carbide layer 150 located integrally and internally. The carbide layer 150 may help to prevent and deter potential thieves of the waste liquid by damaging and destroying saws or other cutting devices that attempt to cut through the locking bar 71. One of ordinary skill in the art would appreciate from this disclosure that the carbide layer 150 may be replaced with any other suitable material that damages and/or breaks the blades of saws and other cutting devices without departing from the scope of the present invention. The shield 70 may also block or otherwise increase the difficulty of cutting the locking bar 71 or the padlock attached to the padlock hole 142.

Referring specifically to FIG. 13, a removable plate lower side 148 of the removable plate 100 may be seen. The removable plate lower side 148 may comprise reinforcement bars 152 configured to support and strengthen the removable plate 100. The removable plate 100 may also comprise a removable plate flange 103 to support to the removable plate 100 further structurally and may allow waste liquid to flow smoothly thereover.

Figure 14:
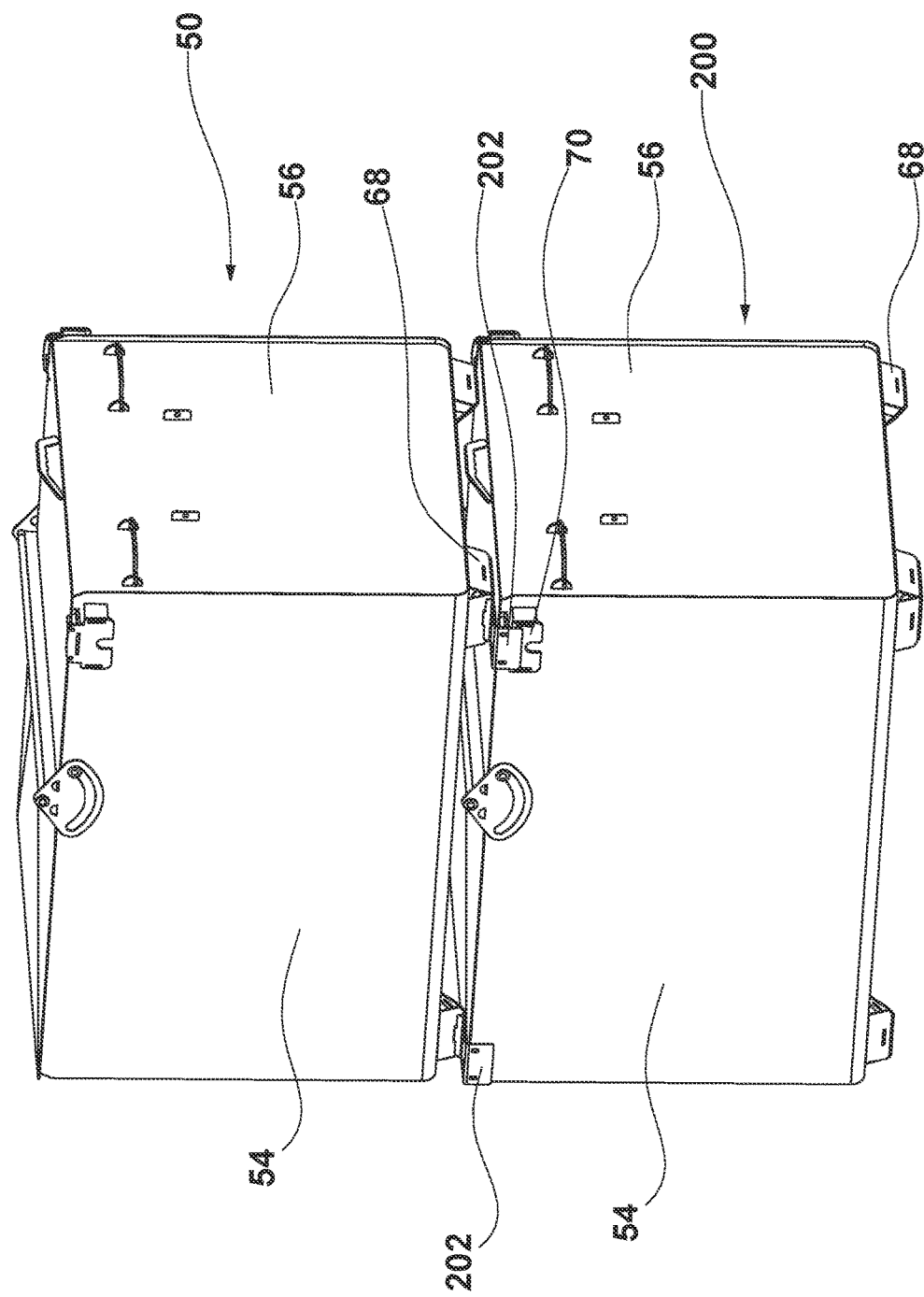
FIG. 14 is a front perspective view of a tank 50 stacked on a second tank 200 in the preferred embodiment. Preferably, the second tank 200 may be identical to the tank 50. The tank 50 may be stacked on the second tank 200 for shipping purposes and the tank 50 and the second tank 200 may be reversed (i.e., the second tank 200 may be stacked on the tank 50) without departing from the scope of the present invention. Preferably two tanks may be stacked, but three or more tanks may be stacked without departing from the scope of the present invention. The tank 50 may be detachably affixed to the second tank 200 by shipping brackets 202.
Figure 15:
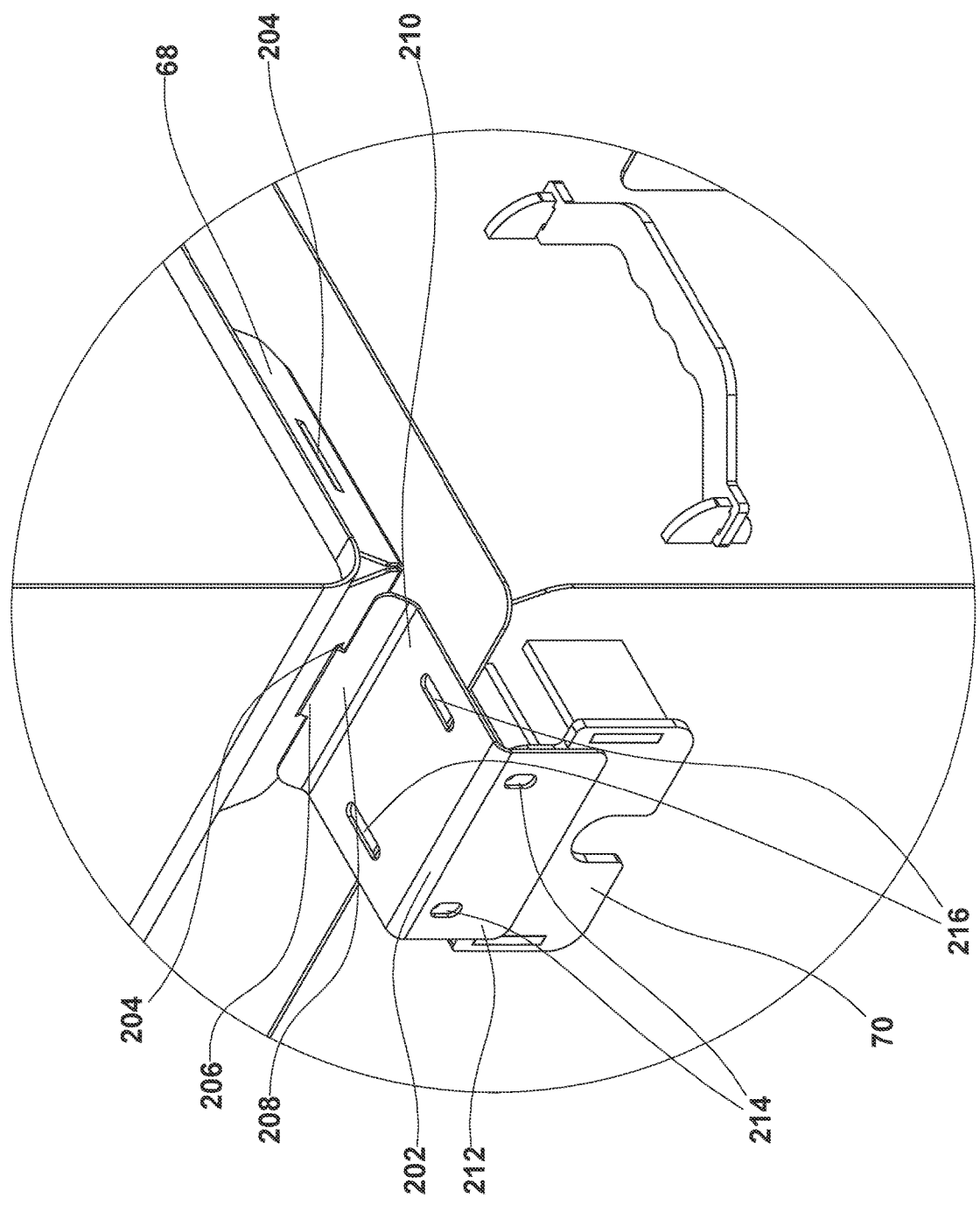
FIG. 15 is a partial, front perspective view of a tank 50 stacked on a second tank 200 in the preferred embodiment. The tank 50 may be connected to the second tank 200 by one or more shipping brackets 202. The shipping bracket 202 shown here may be located toward the front of the tanks. The shipping bracket 202 may comprise a connecting tab 206 to be inserted into a corresponding foot slot 204 on the foot 68. The connecting tab 206 may help to lock the tank 50 and place on top of the second tank 200. Shipping bracket 202 may further comprise a shipping bracket angled portion connecting the connecting tab 206 to the shipping bracket intermediary portion 210. The shipping bracket 202 may also comprise a shipping bracket lower portion 212 that has a plurality of bolt holes 214. The plurality of bolt holes 214 may be configured to be aligned with holes in the shields 70 of the second tank 200. In this way, the shipping bracket 202 can be directly bolted to the shield 70 of the second tank and locked into place.
Figure 16:
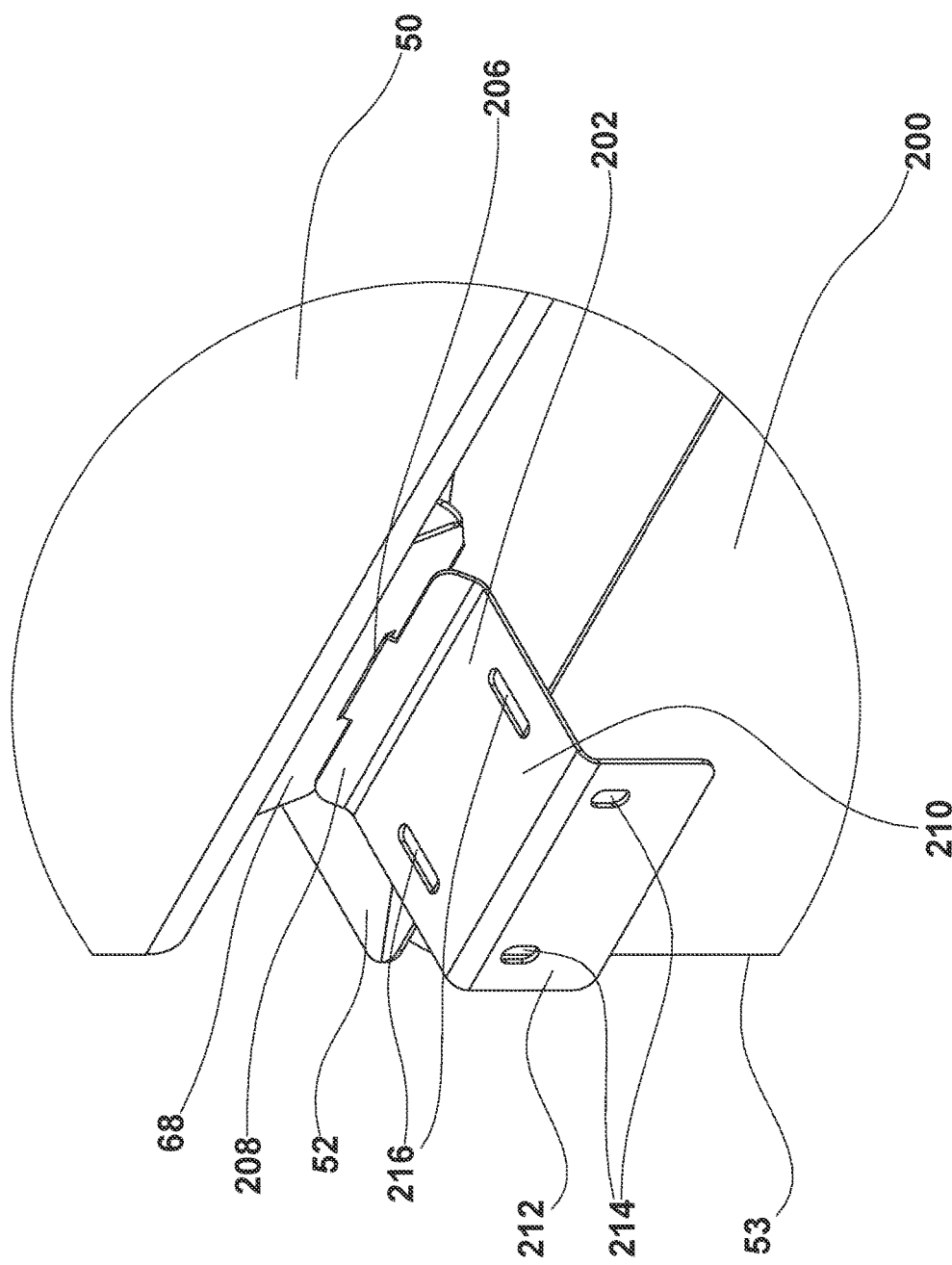
FIG. 16 is a partial, front perspective view of a tank 50 stacked on a second tank 200 in the preferred embodiment. The shipping bracket 202 depicted may be located toward the back of the tanks. Here, the shipping bracket 202 may be connected to the second tank 50 by at least one tank connecting slots 216 located in the shipping bracket intermediary portion 210. The plurality of bolt holes 214 may be configured to be aligned with holes in the top of the second tank 200. In this way, the shipping bracket 202 can be directly bolted to the top of the second tank and locked into place.

Referring generally now to FIGS. 14-16, the liquid tank 50 may be stacked on a second tank 200. The second tank 200 may be similar or identical to the liquid tank 50 in configuration, shape, style, and features without departing from the scope of the present invention. It may be desirable to stack the tank 50 and the second tank 200 for shipping or other transportation purposes. One of ordinary skill in the art would appreciate from this disclosure that two, three, four, or more tanks may be stacked one on top of the other without departing from the scope of the present invention. The tank 50 may be locked into place and connected to the second tank 200 via a shipping bracket 202.

Referring specifically to FIG. 15, a shipping bracket 202 may be seen in more detail when connecting the feet 68 of the tank 50 located near the front 56 to the second tank 200. The feet 68 may comprise a foot slot 204 located therein. The foot slot 204 may be configured to receive a connecting tab 206 located on the shipping bracket 202. The shipping bracket 202 may further comprise a shipping bracket angled portion 208, a shipping bracket intermediary portion 210, and a shipping bracket lower portion 212. The shipping bracket lower portion 212 may have a plurality of bolt holes 214 located there through. In this way, bolts, or any other suitable fasteners, may be used to detachably affix the shipping bracket 202 the shield 70 of the second tank 200. With the shipping brackets 202 bolted to the shields 70 of the second tank 200, the connecting tabs 206 of the shipping brackets 202 lock the front feet 68 of the tank 50 in place.

Referring specifically to FIG. 16, a shipping bracket 202 may be seen in more detail when connecting the feet 68 of the tank 50 located near the back 53 to the second tank 200. The shipping bracket 202 may include a plurality of tank connecting slots 216 located in the intermediary portion 210. Since there may be no shield 70 located near the back 53 of the second tank 200, bolts may be secured through the plurality of tank connecting slots 216 into the top 52 of the second tank 200. The connecting tabs 206 of the shipping brackets 202 may still be engaged with the foot slots 204 of the feet 68 thereby locking the two rear feet 68 of the tank 50 into place. With each of the at least four shipping brackets 202 bolted to the second tank 200 and engaged with the feet 68 of the tank 50, the tank 50 and the second tank 200 may be fully locked together.

Figure 17:
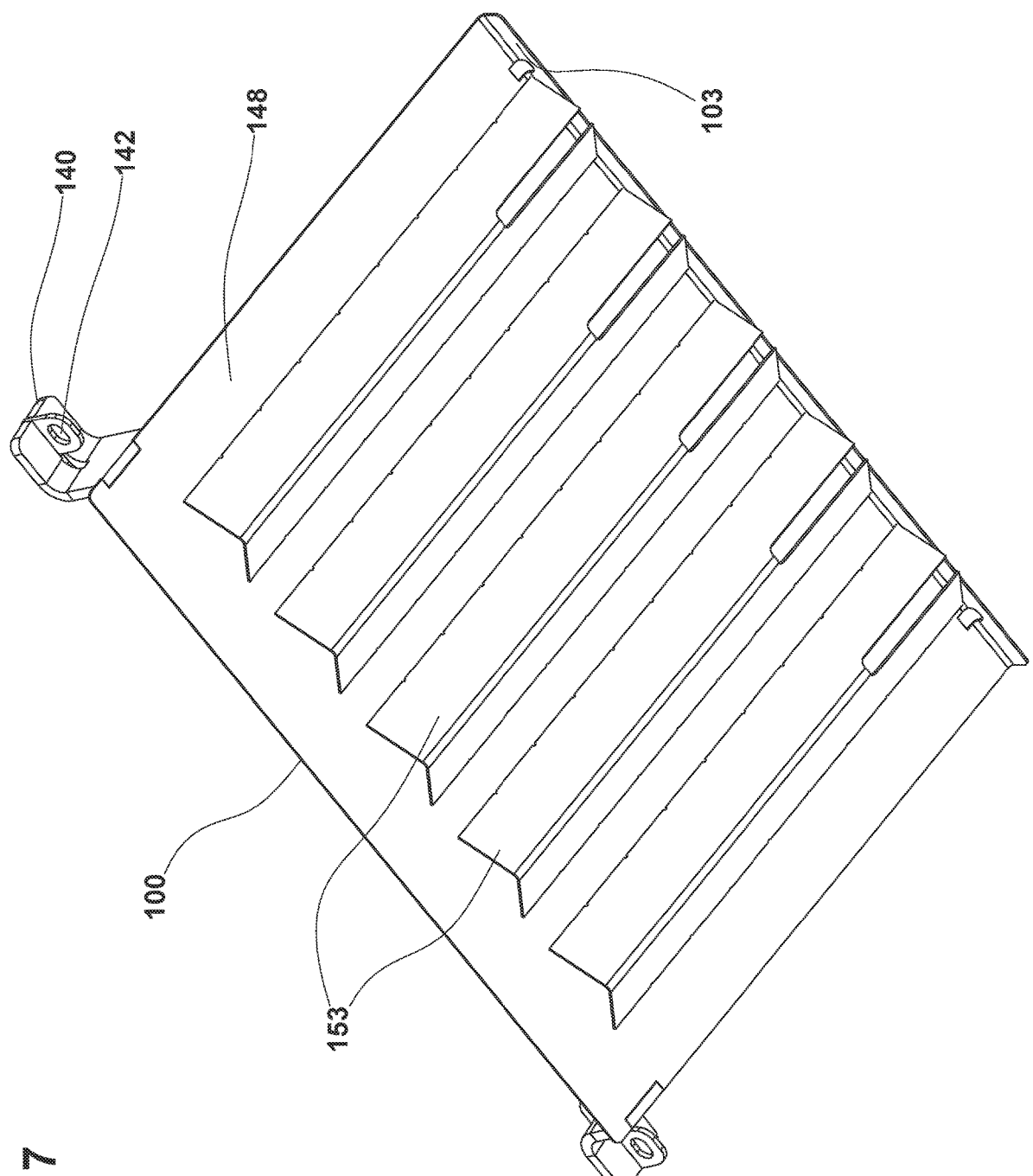
FIG. 17 is a bottom perspective view of the removable plate 100 in an alternative preferred embodiment when disengaged with and removed from the tank 50. Here, the reinforcement bars 152, as shown in FIG. 13, may be substituted with corrugated reinforcements 153.
Figure 39:
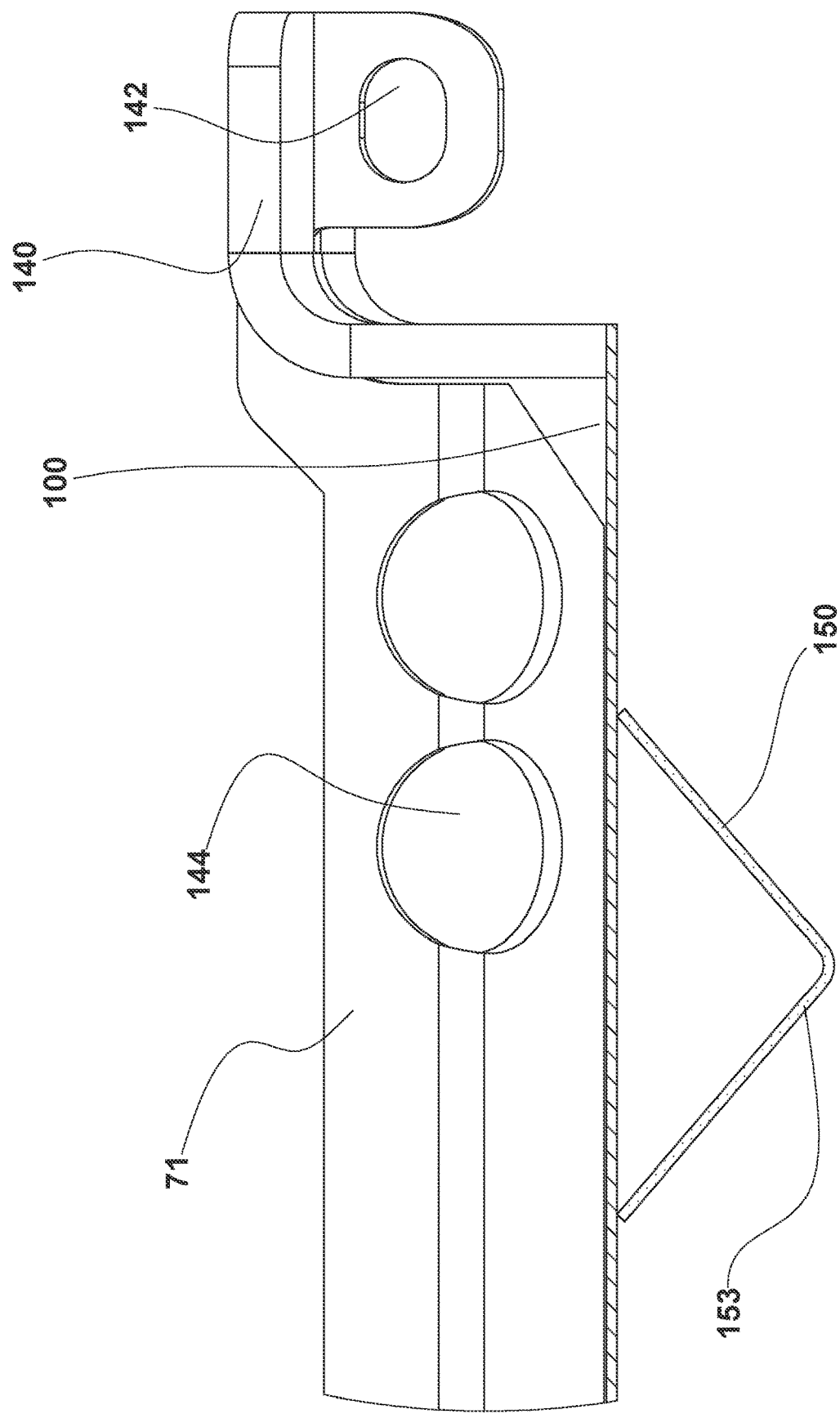
FIG. 39 is a front cross-sectional view of the removable plate 100 in the preferred embodiment. The removable plate 100 and the corrugated reinforcement 153 may be seen as being made of thin metal with the corrugated reinforcement 153 being hollow. This figure also illustrates how the corrugated reinforcement 153 may be formed of a different, harder material than the removable plate 100.

Referring now to FIGS. 17 and 39, an alternative preferred embodiment of the removable plate lower side 148 of the removable plate 100 may be seen. The removable plate lower side 148 may comprise corrugated reinforcements 153 configured to support and strengthen the removable plate 100. The corrugated reinforcements 153 may be used instead of or in conjunction with the reinforcement bars 152 without departing from the scope of the present invention.

Figure 18:
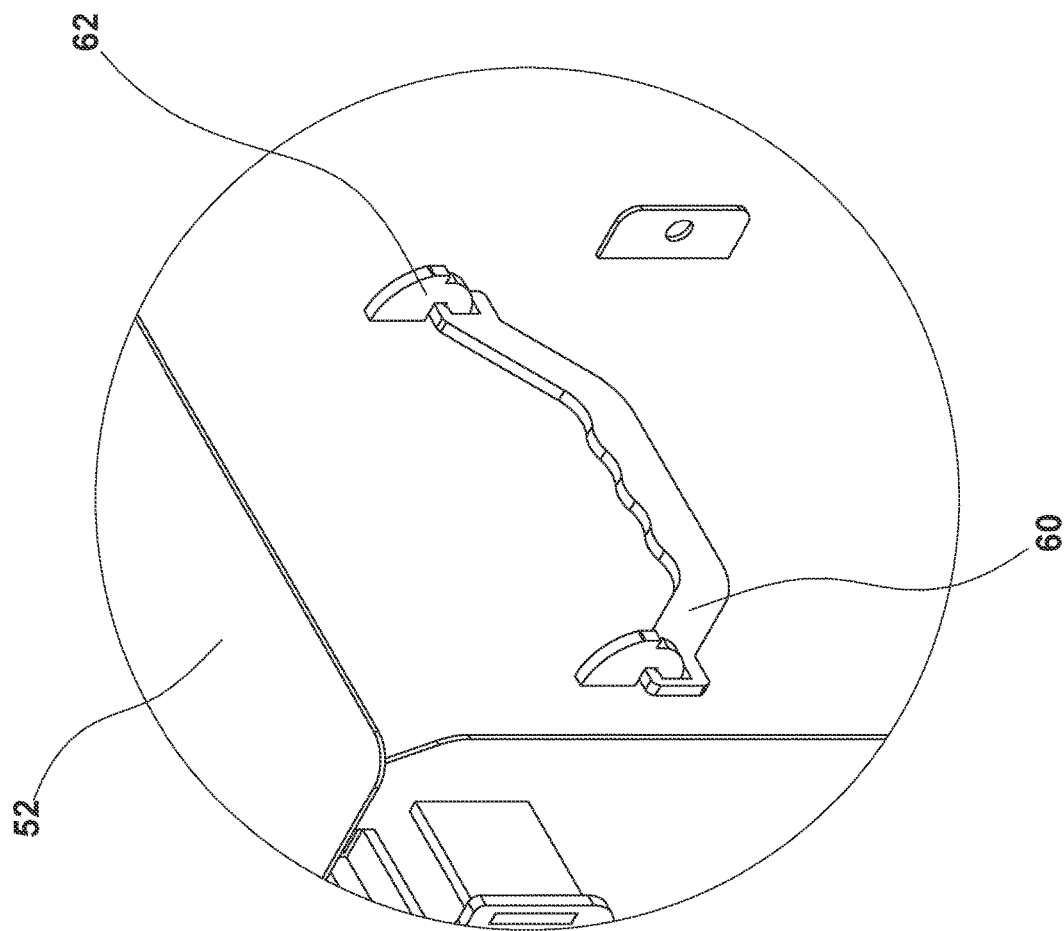
FIG. 18 is a partial front perspective view of the tank 50 in the preferred embodiment. Here, the tank handle 60 may be seen in a folded position. The tank handle 60 may be folded for shipping the tank 50 so that the profile of the front 56 and back 53 is thinner. The tank handle 60 may be flush with the front 56 of the tank 50.
Figure 19:
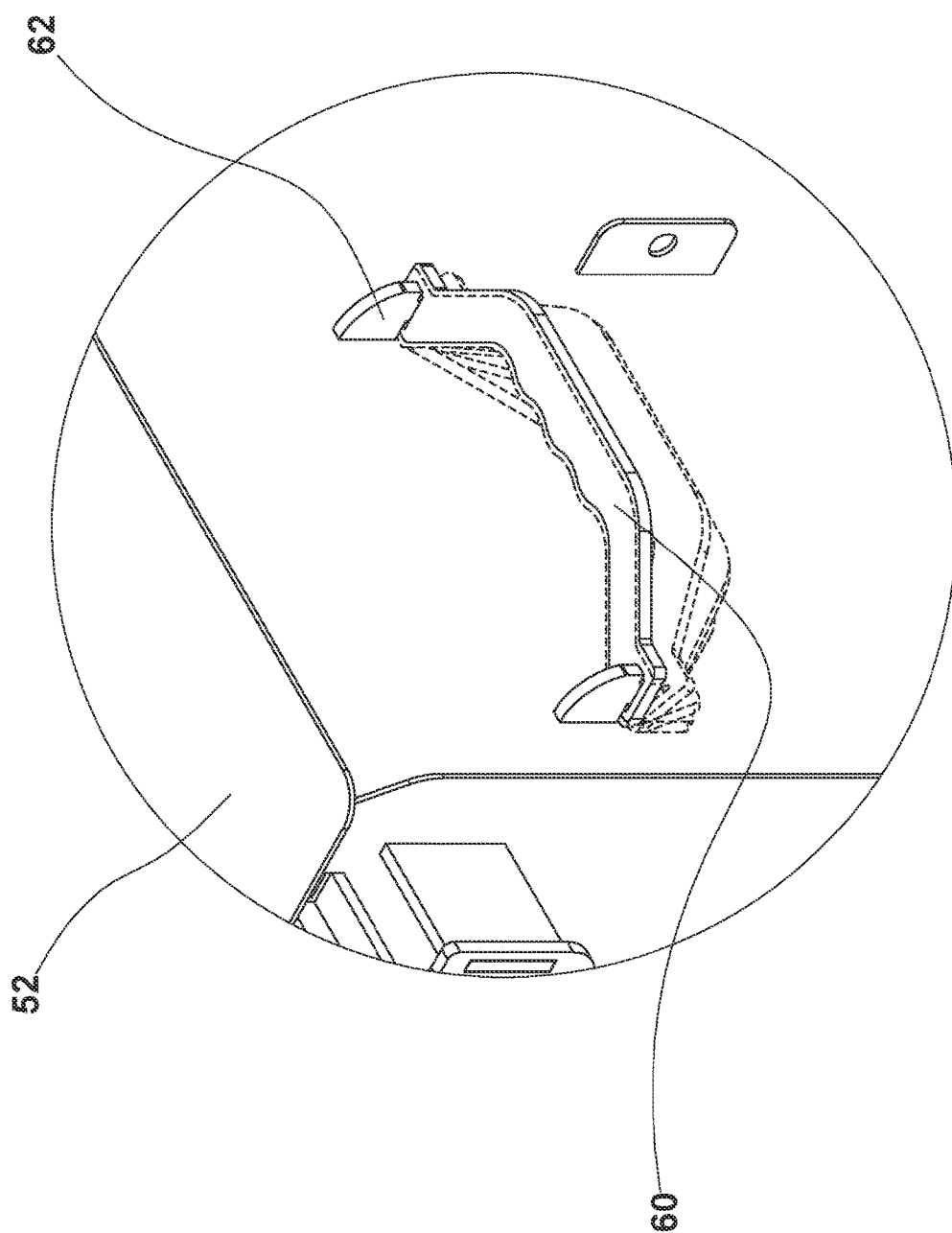
FIG. 19 is a partial front perspective view of the tank 50 in the preferred embodiment. Here, the tank handle 60 may be seen moving between a folded position and an extended position. The tank handle 60 may be extended so that a user can more easily pull the tank 50.
Figure 20:
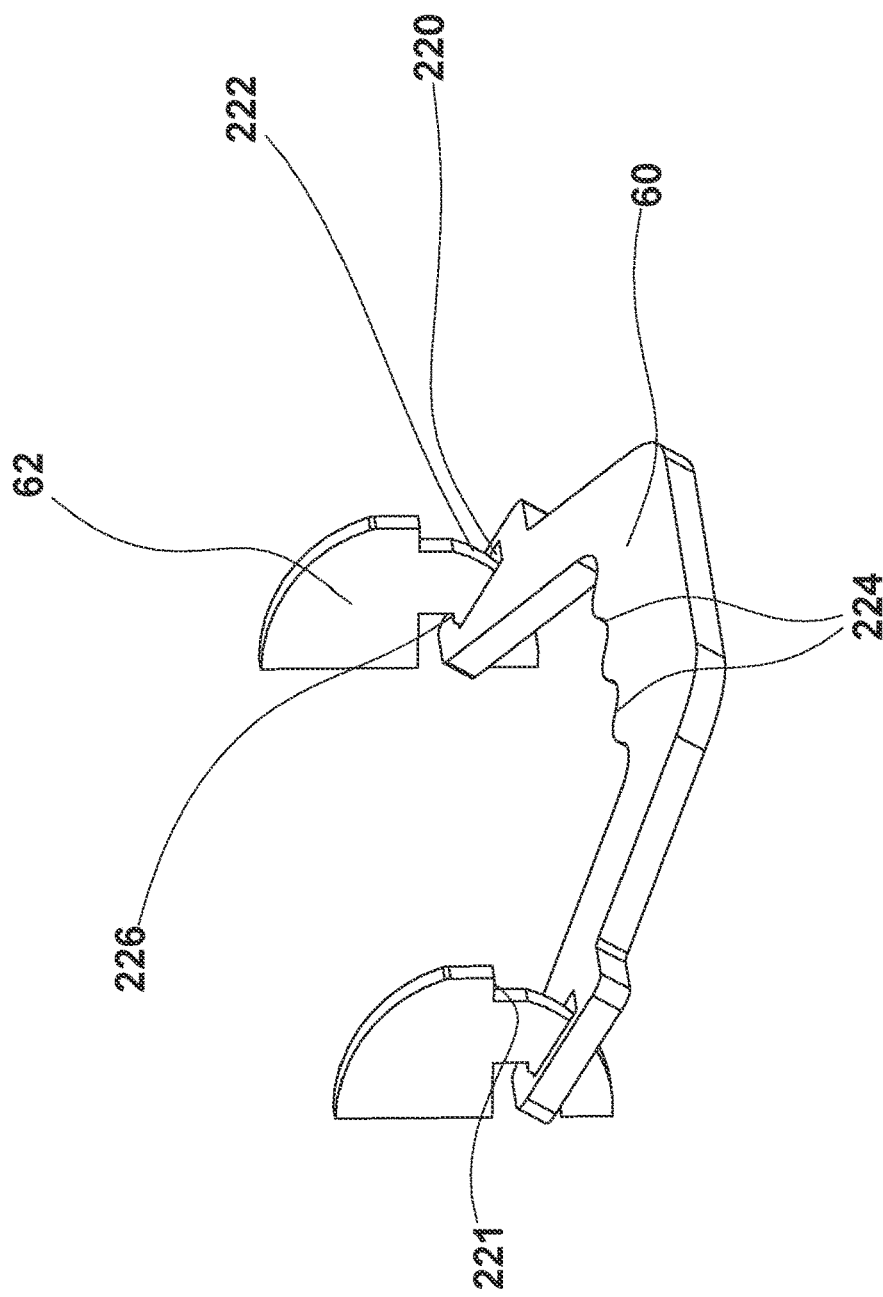
FIG. 20 is a front perspective view of the tank handle 60. Here, more details of the tank handle 60 may be seen. The tank handle 60 may comprise a tank handle slot 220 configured to engage with a tank handle track 222 on the tank handle connector 62. The tank handle 60 may have a hand-hold portion 224 to accommodate the hand of a user engaging with the tank handle 60. The tank handle connector 62 may also have a tank handle support portion 226 so that the tank handle 60 can lock into place in the extended position and help to prevent slippage of the handle 60.

Referring now generally to FIGS. 18-20, the tank handle 60 may be seen in greater detail. The tank handle 60 may be in an extended position when a user may desire to pull or move the tank 50. The tank handle 60 may be in a folded position when the tank 50 may be shipped or when a slimmer profile of the tank 50 may be desired. The tank handles 60 may be located on any sidewall 53, 54, 55, 56 without departing from the scope of the present invention.

Referring specifically to FIG. 19, the tank handle 60 can be seen rotating through from the extended position to the folded position and vice versa.

Referring specifically to FIG. 20, the tank handle 60 may comprise a tank handle slot 220 therethrough. The tank handle connector 62 may comprise a tank handle track 222 partially contained within the tank handle slot 220. The tank handle connector 62 may also comprise a tank handle support portion 226 configured to receive part of the tank handle 60 and help to lock the tank handle 60 into the extended position. The tank handle 60 may also comprise a hand-hold portion 224 configured to allow a user to more easily grip the tank handle 60.

Figure 21:
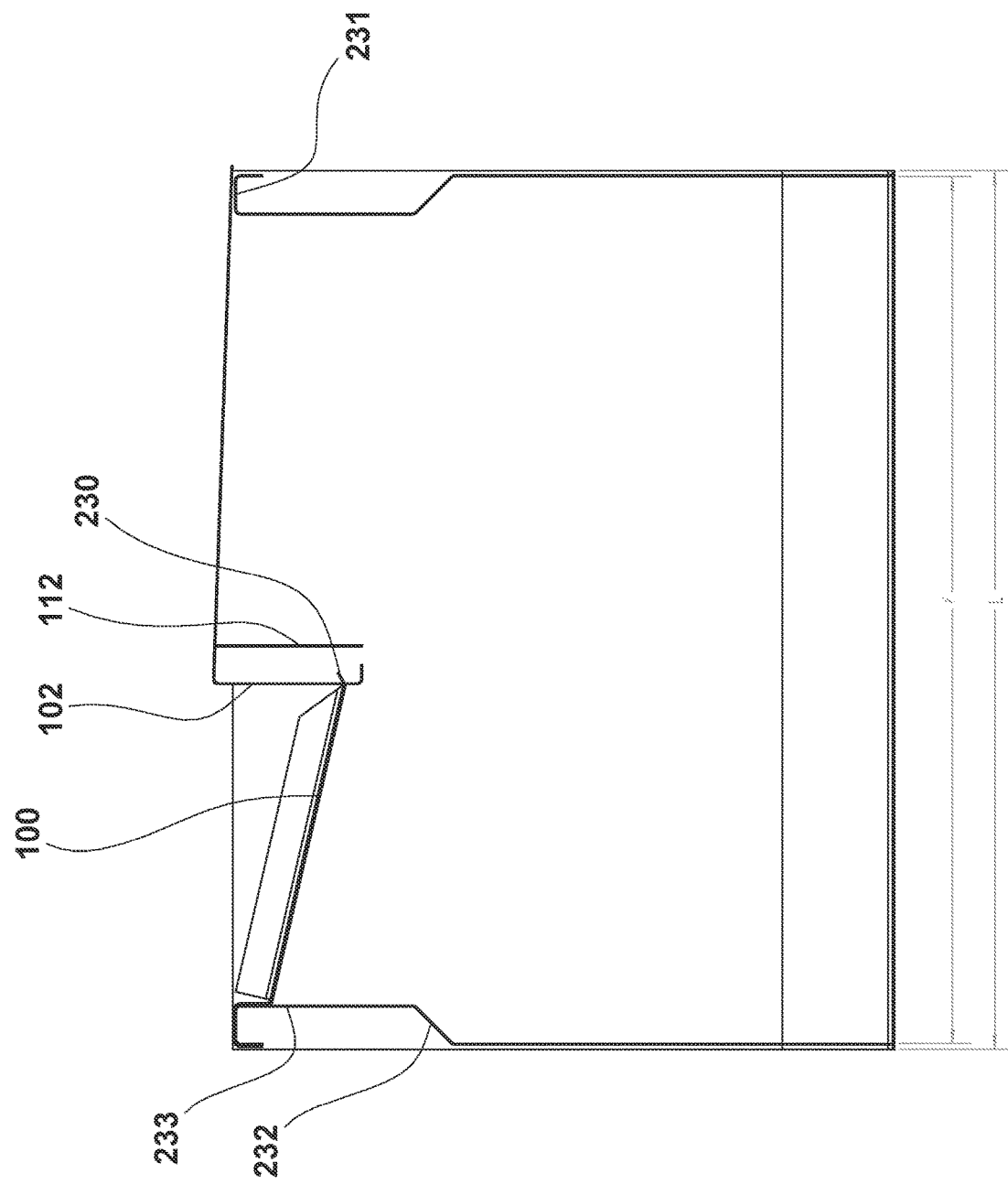
FIG. 21 is a side, cross-sectional view of the tank 50 in an alternative preferred embodiment. Here, the profile of the tank 50 can be more seen more easily. Toward the top 52 of the tank 50, the front 56 and the back 53 may comprise a beveled portion 232 that slopes inward. The front 56 and back 53 may also comprise a tapered portion 233 connecting the beveled portion 232 to a curled inner rim 231. The curled inner rim 231 may help support the top 52 and the lid 58 of the tank 50. Due to the beveled portion 232, the tank length L is longer from the front 56 to the back 53 than the tapered length 1 between the tapered portions 233 of the front 56 and the back 53.
Figure 22:
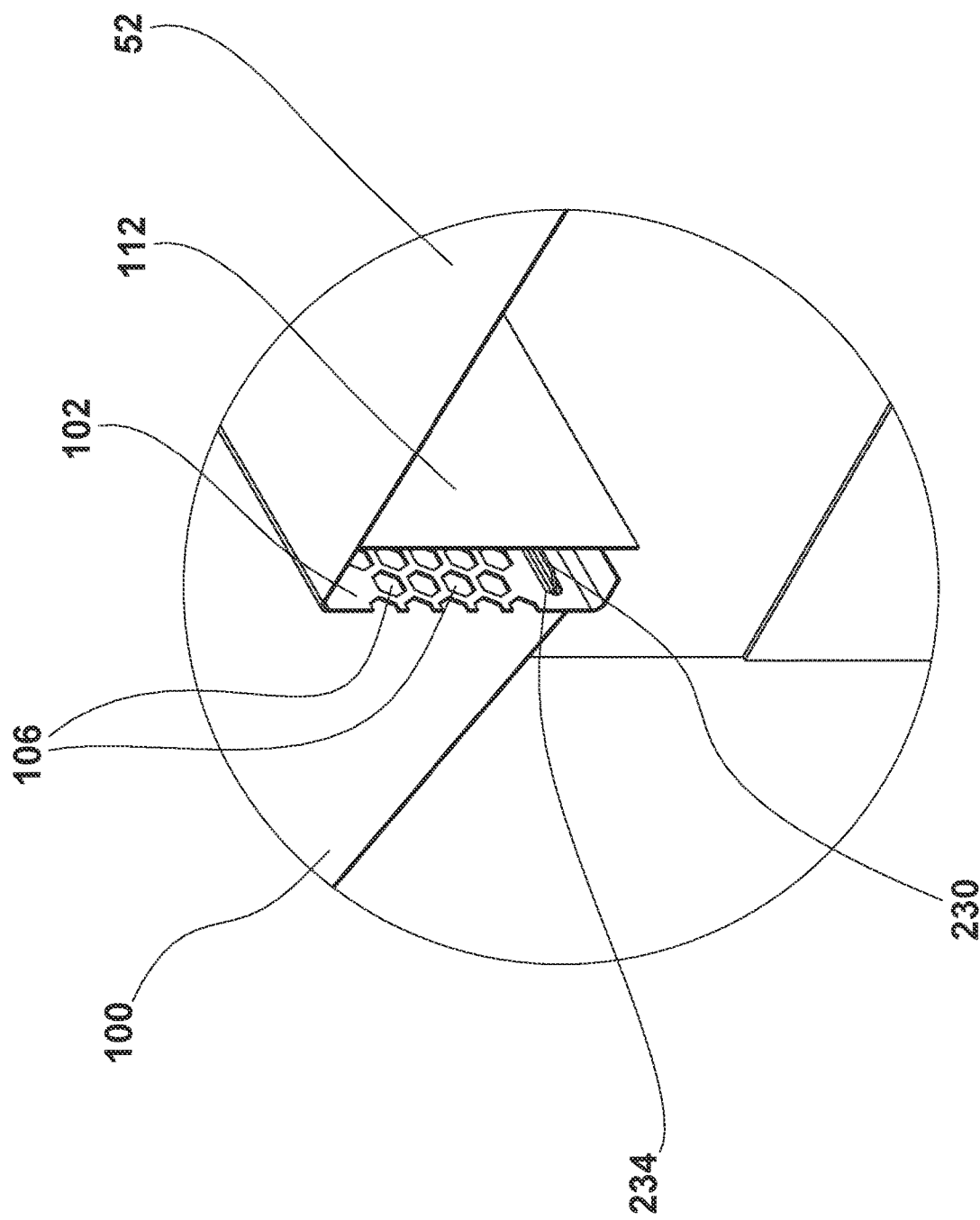
FIG. 22 is a partial perspective view of the tank 50 in an alternative preferred embodiment. Here, the removable plate 100 may be engaged with the porous plate 102 by way of a removable plate mounting tab 230 of the removable plate 100 being engaged in a removable plate mounting slot 234 located in the porous plate 102. This engagement of the removable plate 100 to the porous plate 102 may be advantageous in particular configurations.
Figure 23:
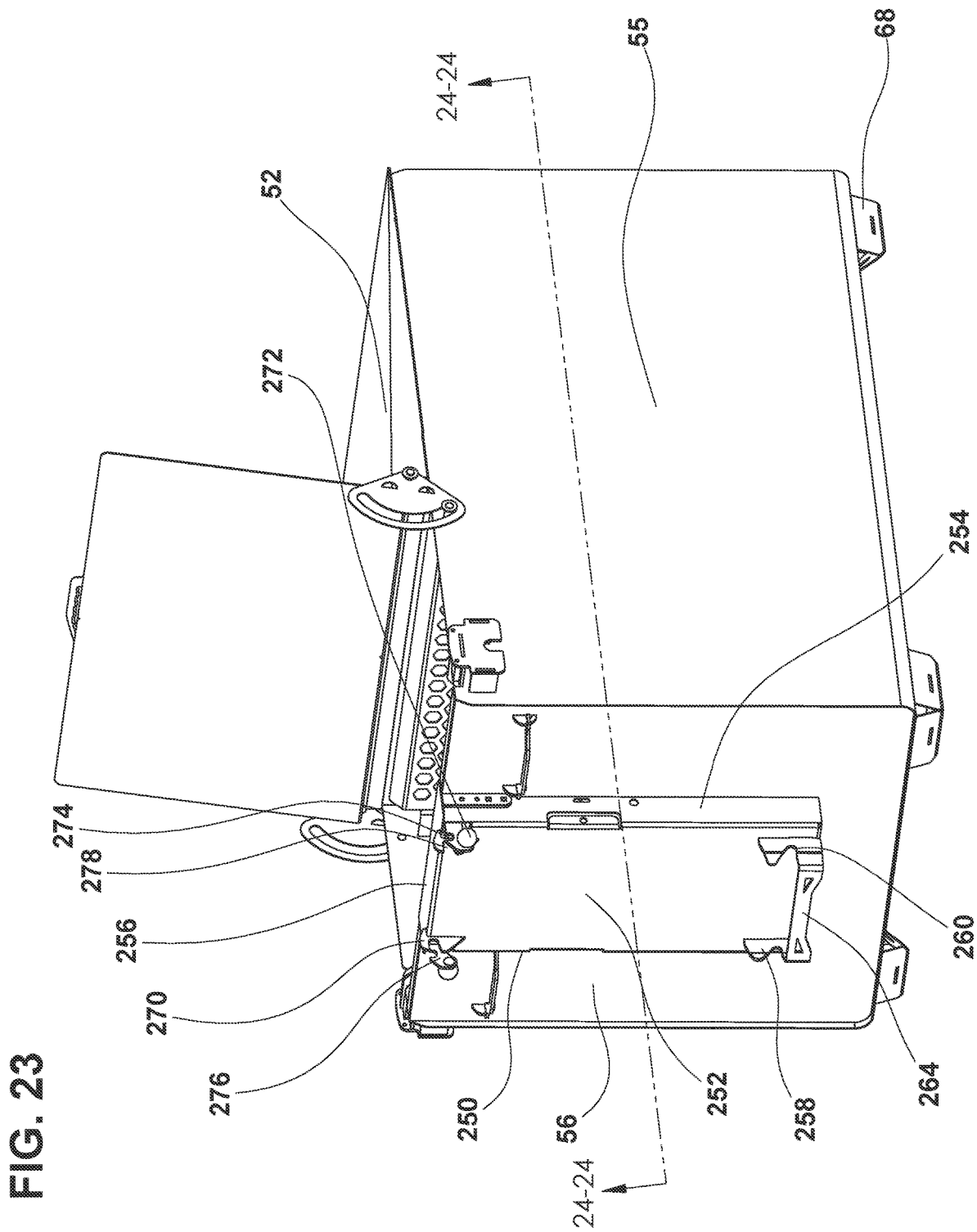
FIG. 23 is a front, perspective view of the tank 50 in the preferred embodiment. Here, a transit mount 250 may be seen connected to the front 56 of the tank 50. The transit mount 250 may be detachably affixed to the transit mount brackets 64 (seen in FIG. 1). The transit mount 250 may comprise transit mount front 252 that faces outwardly and away from the tank 50. Located on the transit mount front 252 there may be a transit lower mount 258. The transit lower mount 258 may have a transit lower slot 260 running therethrough configured to accommodate a transit cart (not shown). A lower mount support 264 forming part of the transit lower mount 258 may help support a transit cart engaged in the transit lower slot 260.
Figure 24:
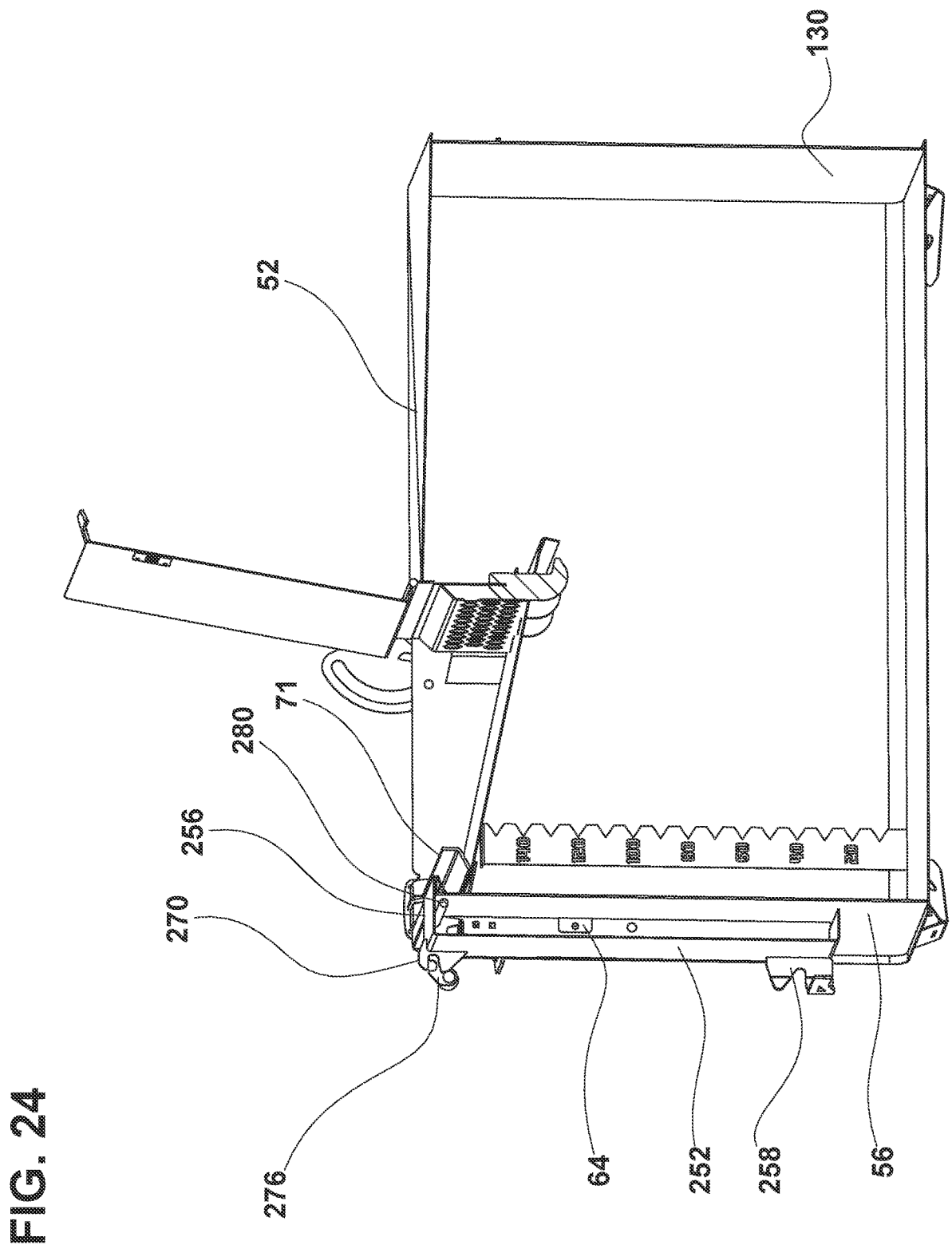
FIG. 24 is a side, perspective, cross-sectional view of the tank 50 in the preferred embodiment taken along the line 24-24 of FIG. 23 with the transit mount 250 attached thereon. Here, the upper portion of the transit mount 250 can be seen in more detail. The transit mount 250 may have a transit top 256 coplanar with the top 52 of the tank 50. Located proximate the transit top 256 is a transit upper mount 270. The transit upper mount 270 may allow a transit cart (not shown) to connect to the tank 50 and assist in the dumping of waste oil from the transit cart into the tank 50. The transit upper mount 270 may have a locking arm 276 for grabbing onto a transit cart and a tension bar 280 for allowing rotational movement of the locking arm 276.
Figure 38:
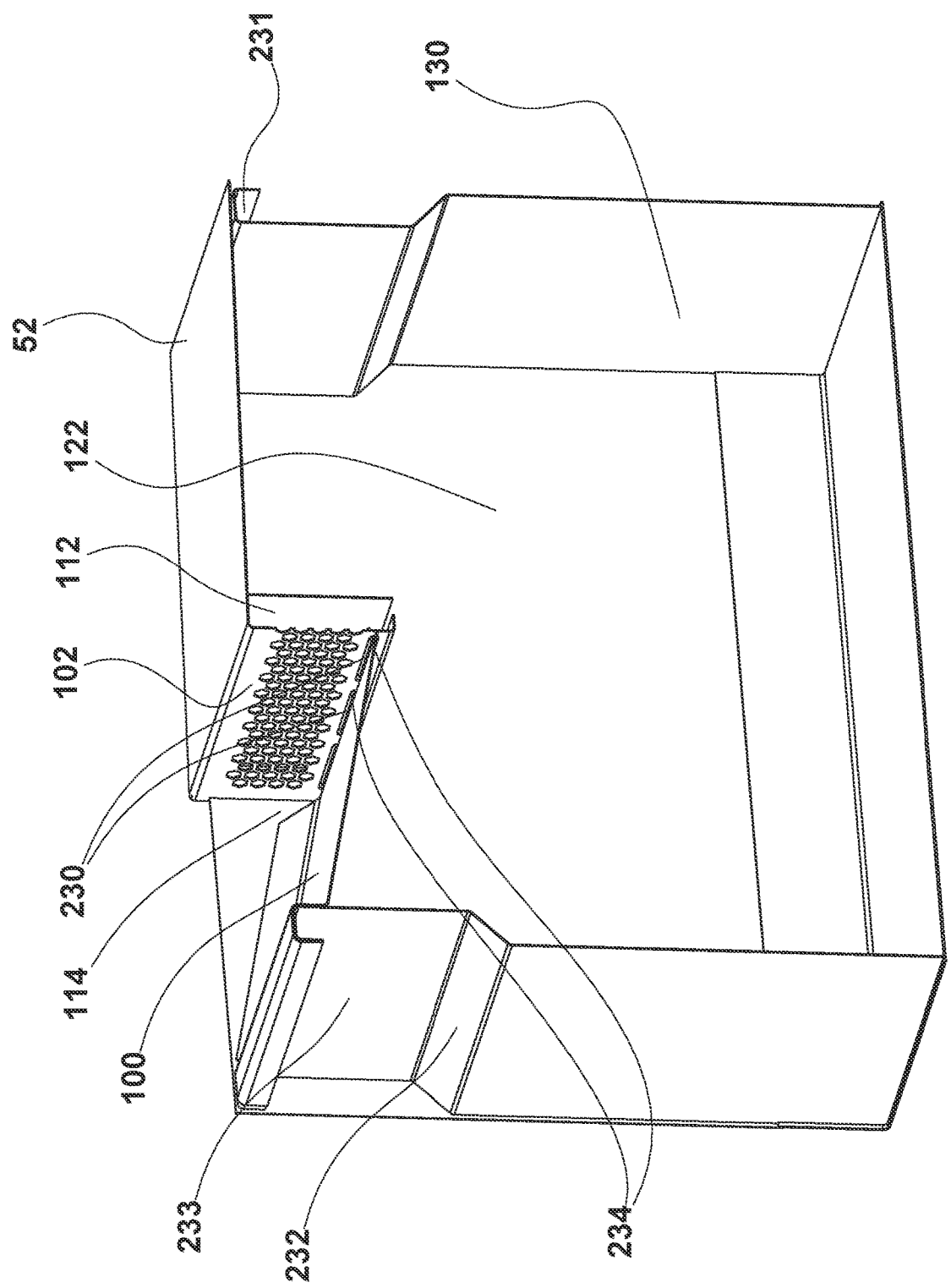
FIG. 38 is a side, perspective, cross-sectional view of the tank 50 in the alternative preferred embodiment. The removable plate mounting tab 230 can be more easily seen engaged with the removable plate mounting slot 234. The porous plate 102 may also be formed as a solid piece with the top 52 of the tank 50.

Referring now generally to FIGS. 21, 22, and 38, an alternative preferred embodiment of the tank 50 may be seen. Specifically, the removable plate 100 may comprise removable plate mounting tabs 230 located toward a bottom end of the removable plate 100. The removable plate mounting tabs may be substituted for the plurality of slots 101. Since there may be no plurality of slots 101 for a plurality of fangs 113 to engage with, the porous plate 102 may comprise removable plate mounting slots 234 corresponding to the removable plate mounting tabs 230. The removable plate mounting tabs 230 may be engaged with the removable plate mounting slots 234 when the removable plate 100 is inserted into the tank 50.

Referring still to FIGS. 21, 22, and 38, the alternative preferred embodiment of the tank 50 may comprise a beveled portion 232 connecting the front 56 and the back 53 each to a tapered inner wall 233, respectively. The tapered inner wall 233 may decrease the overall profile and volume of the tank 50 toward the top 52. The tank length L may be measured from the front 56 to the back 53. A tapered length l may be measured between the tapered inner walls to 233 of the front 56 and the back 53. The tank length L may be greater than the tapered length l. The tapered nature of the tank 50 in this alternative preferred embodiment may be advantageous to prevent or reduce spillage of waste liquid from the tank 50. In this alternative preferred embodiment of the tank 50, there may be no lid 58 attached to the tank 50. The top edge 72 of the tank 50 may also comprise a curled inner rim 231 to further strengthen the tank 50 in this embodiment.

Referring now generally to FIGS. 23-27 and 43, the tank 50 may comprise a transit mount 250 mounted thereon. The transit mount 250 may be connected to the front 56 of the tank 50 via the transit mount brackets 64. The transit mount 250 may have a transit mount front 252, a transit mount side 254, and transit mount top 256. The transit mount 250 may comprise a transit lower mount 258 located on the lower portion of the transit mount front 252. The transit lower amount 258 may comprise a transit lower slot 260 and a lower amount support 264. The transit lower slot 260 may be configured to engage with a transit cart (not shown) containing a waste liquid to be dumped into the tank 50. The transit mount 250 may further comprise a transit upper mount 270. The transit mount 250 may also comprise a transit mount wrapping edge 286 which connects to a wrapping edge connecting portion 288. The wrapping edge connecting portion 288 may help to further secure the transit mount 250 to the tank 50 by effectively grabbing the top edge 72 of the tank 50.

Figure 25:
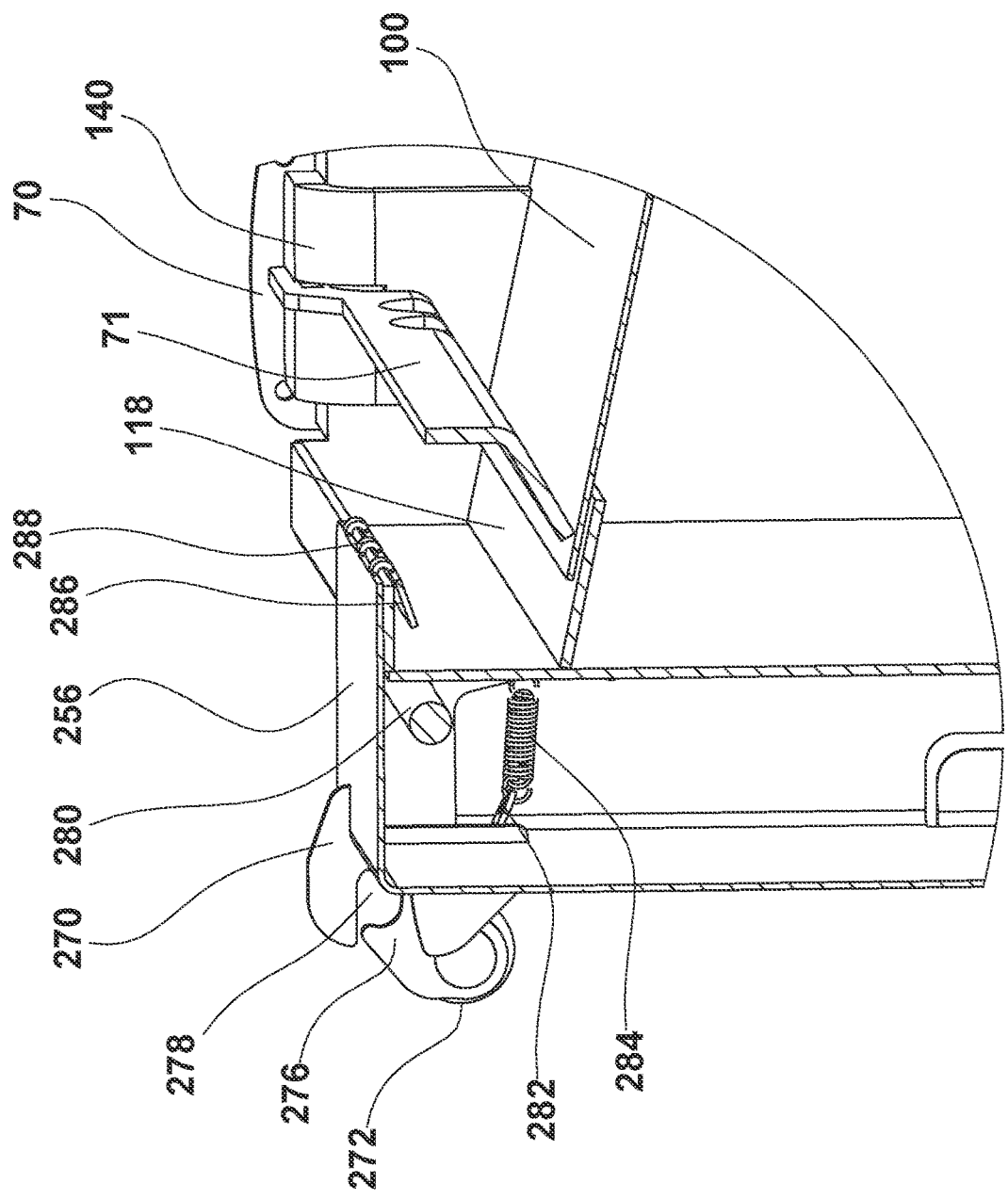
FIG. 25 is a side, partial-perspective, cross-sectional view of the tank 50 in the preferred embodiment with the transit mount 250 attached thereon. This figure shows elements of the transit mount 250 in further detail. A tension spring 284 may be connected on one end to the locking arm 276 to and on the other end to a spring connector 282 located an inside of the transit front 252. A knob 272 may be positioned on the locking arm 276 to allow a user to pull down the locking arm 276 against the tension of the spring 284 so that a transit cart can be connected into the static slot 278 of the transit upper mount 270. The transit mount top 256 may also be directly connected to the tank 50 by a transit mount wrapping edge 286 connected to the transit mount 250 by a wrapping edge connecting portion 288. The wrapping edge connecting portion 288 may be curled to allow the transit mount wrapping edge 286 to grab under a lip in the top 52 of the tank 50 and further secure the transit mount 250 to the tank 50.
Figure 26:
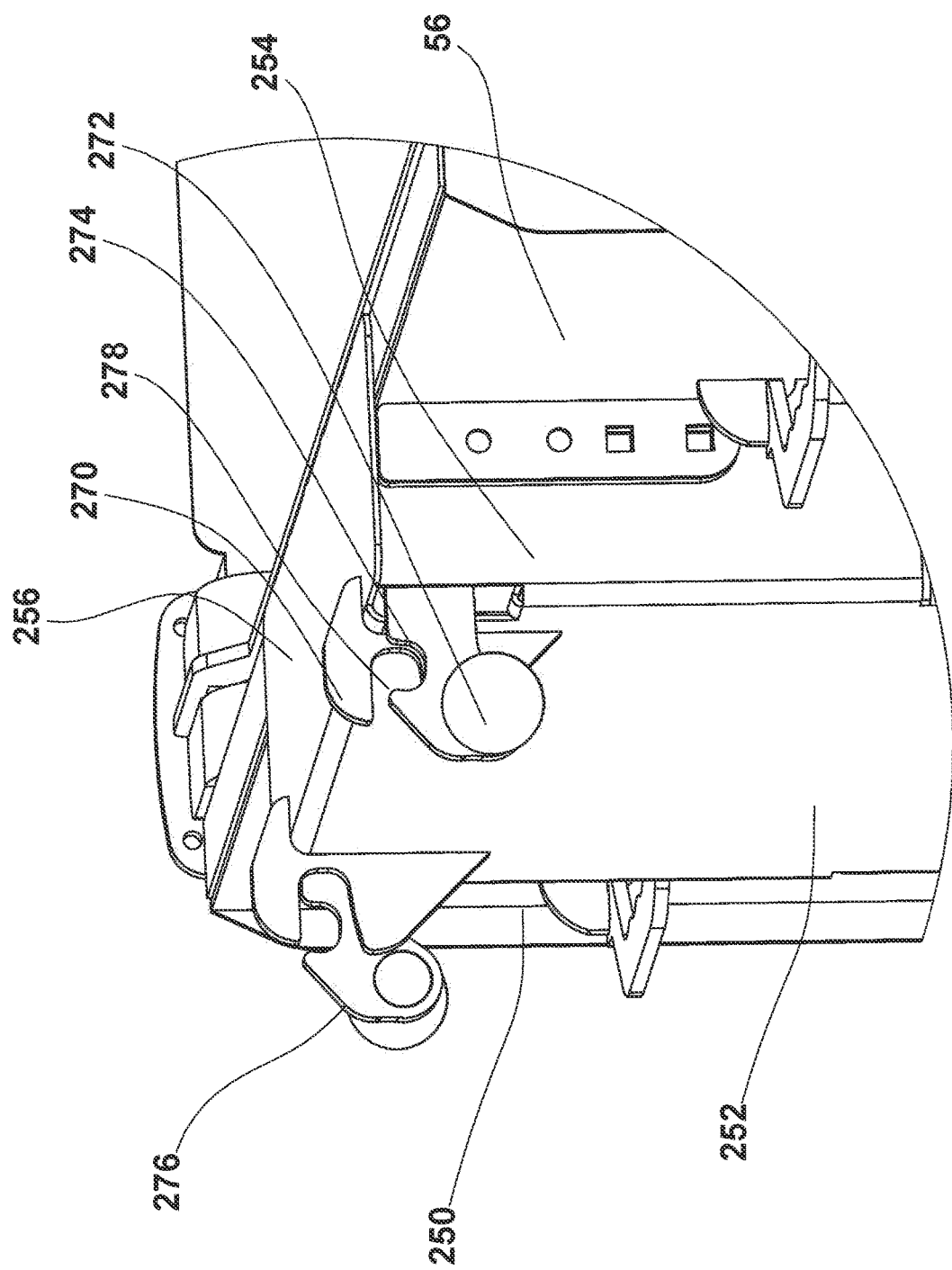
FIG. 26 is a front, partial-perspective view of the tank 50 in the preferred embodiment with the transit mount 250 attached thereon. Here, it may be seen that the static slot 278 of the transit mount 250 is aligned with a locking slot 274 of the locking arm 276 when the locking arm 276 is in a resting position. The alignment of the locking slot 274 with the static slot 278 may effectively lock a transit cart into place with the transit mount 250.
Figure 27:
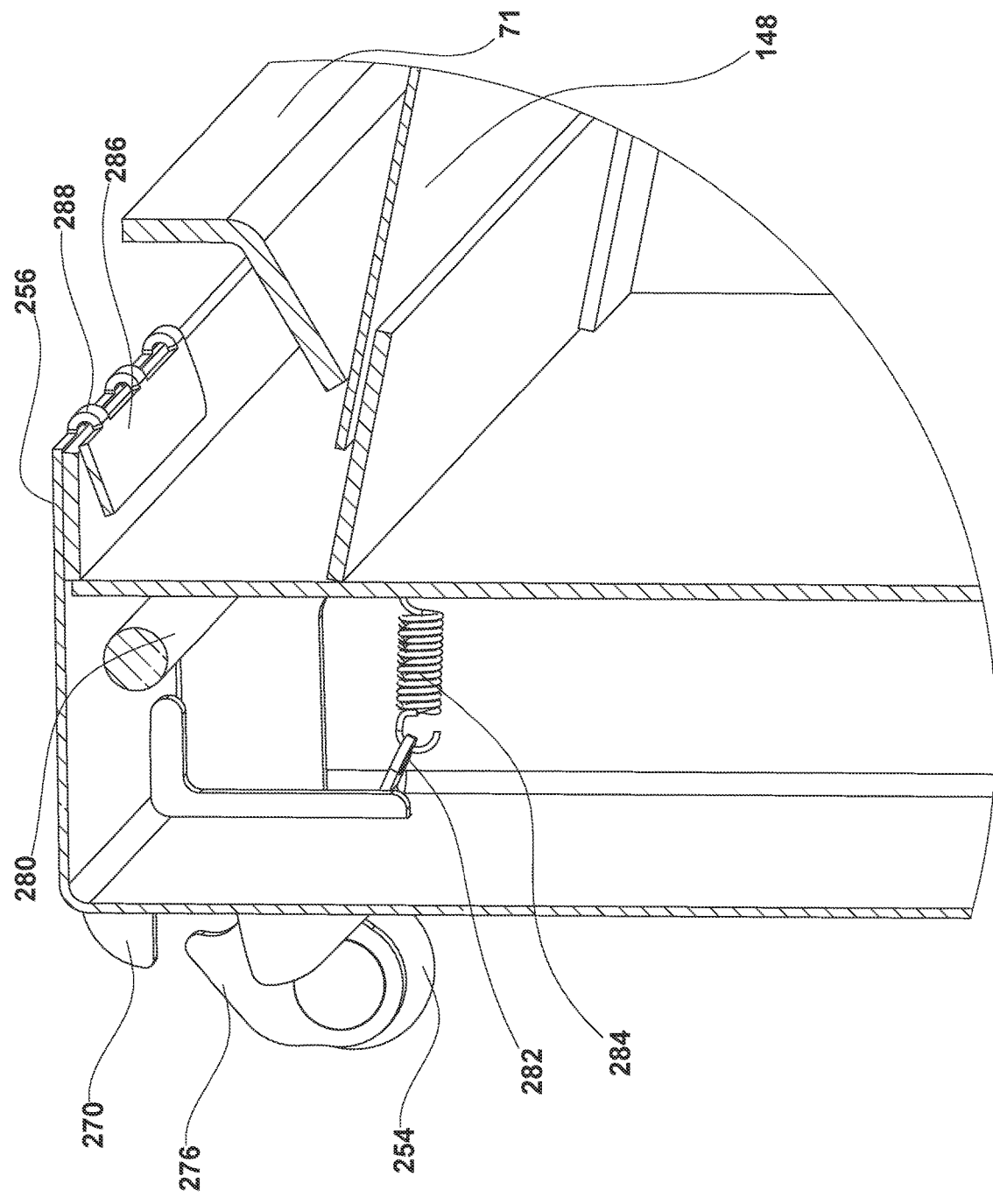
FIG. 27 is a close-up, side, partial-perspective, cross-sectional view of the tank 50 in the preferred embodiment with the transit mount 250 attached thereon. Here, the tension spring 284 engaged with the spring connector 282 located on the transit front 252 may be seen in more detail.
Figure 43:
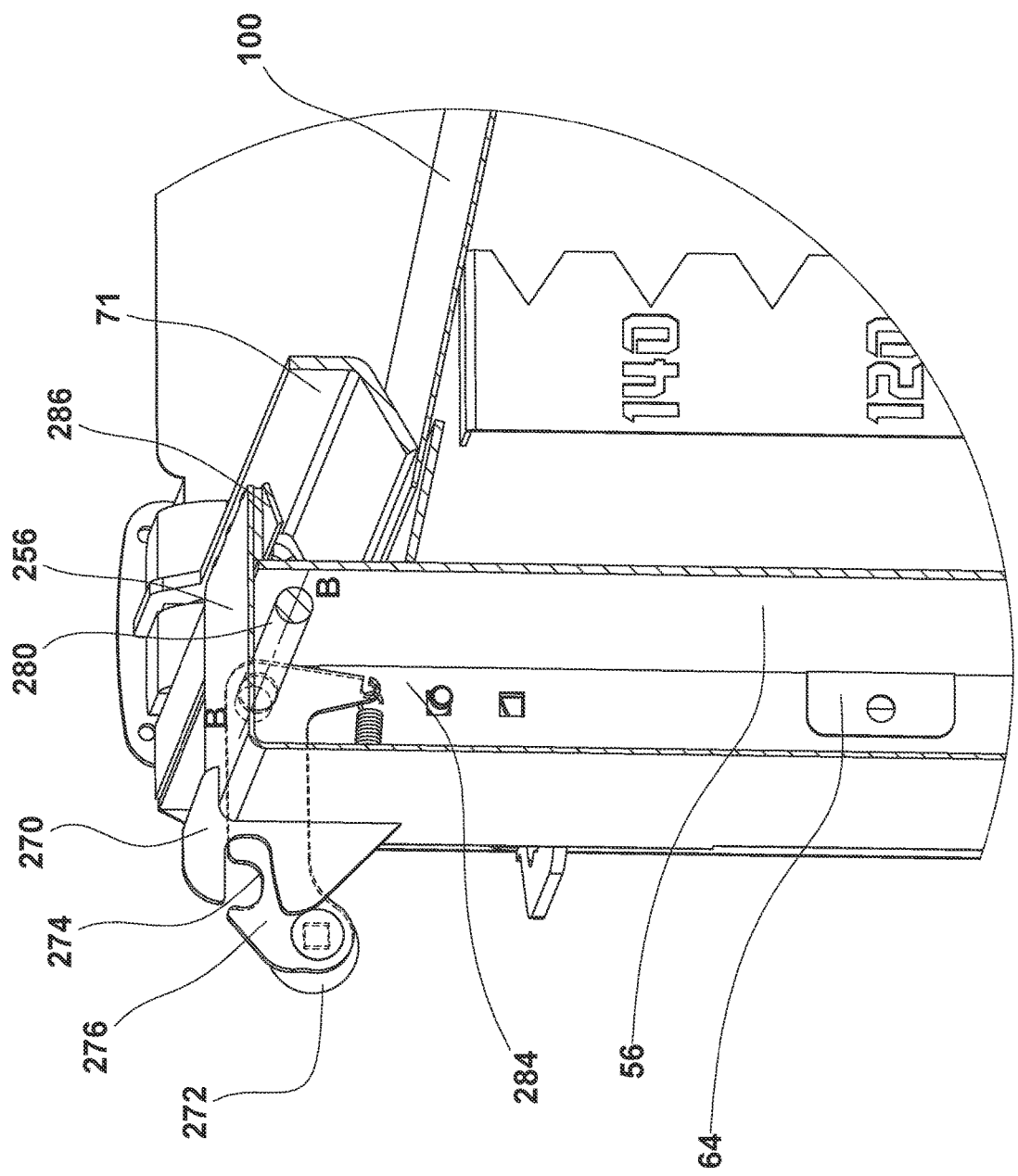
FIG. 43 is a side, perspective, cross-sectional view of the tank 50 in the preferred embodiment with the transit mount 250 attached. This figure illustrates how the locking arm 276 may be connected to the tension bar 280 and the tension spring 284. The locking arm 276 may also stick through the transit front 252 so that it may be partially contained within the transit mount 250. An axis of rotation B may be seen running through the tension bar 280 to provide reference for the rotational motion of the locking arm 276.

Referring now specifically to FIGS. 25, 27, and 43, The inside of the transit mount 250 may be more clearly seen. The upper transit mount 270 may comprise locking arms 276. The locking arms 276 may further comprise a knob 272 located outside the transit mount 250. The locking arms 276 may be connected inside the transit mount 250 to a tension bar 280. The tension bar 280 may allow the downward motion and rotation of the locking arms 276 about an axis B when a user may pull downwardly on the knob 272. By moving the locking arms 276 down, a locking slot 274 in the locking arm 276 and a static slot 278 in the upper transit mount 270 may be revealed. An upper portion of a transit cart may be inserted into the locking slot 274 and static slot 278 in order to detachably affix the transit cart to the tank 50. The transit upper mount 270 may further comprise a tension spring 284 contained therein. The tension spring 284 may be connected at one end to the transit upper mount 270 by a spring connector 282 and at the other end to a portion of the locking arm 276 contained within the transit mount 250. When the knob 272 may be released, a returning force of the now tensioned tension spring 284 may automatically pull on the portion of the locking arm 276 and raise the locking arm 276 such that the locking slot 274 and the static slot 278 become aligned. When the locking slot 274 and the static slot 278 may be aligned, a transit cart may be locked into place with the transit mount 250. The transit mount 250 may allow a user to easily tip, lift, and dump the contents, namely liquid waste, of a transit cart into the tank 50.

Figure 28:
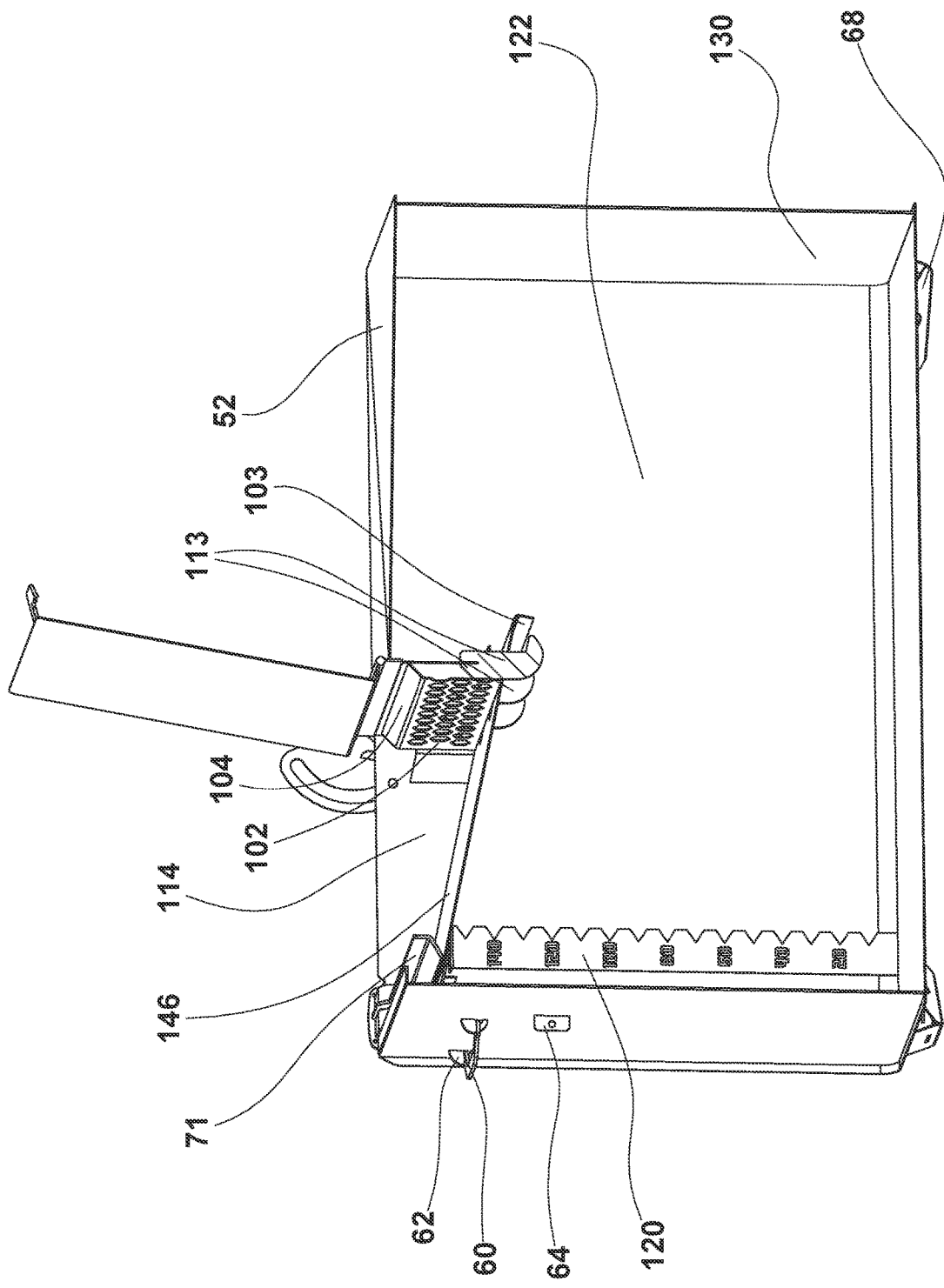
FIG. 28 is a side, perspective, cross-sectional view of the tank 50 in the preferred embodiment. This figure illustrates how the removable plate 100 is engaged within the opening 88 of the tank and separates the second chamber 114 from the first chamber 122.

Referring now to FIG. 28, the tank 50 may be seen with the removable plate 100 inserted into the tank 50 and the transit mount 250 not engaged with the tank 50. The removable plate 100 and the porous plate 102 may delineate the boundary between the second chamber 114 and the first chamber 122.

Referring now generally to FIGS. 29-33, the tank 50 may comprise an extended mouth 300. The extended mouth 300 may raise the surface of the opening 88 above a plane formed with the top 52 of the tank 50. The extended mouth 300 may comprise an extended tank mouth front 302 and extended tank mouth sides 304 extending upwardly from the top 52 of the tank 50. The extended tank mouth front 302 and the extended tank mouth sides 304 may form a seal with the lid 58 when the lid 58 may be in a first, closed position 90. A tank width W may be defined as being a distance between the first side 54 and the second side 55. A mouth width w may be defined as being the distance between the extended tank mouth sides 304. The tank width W may be greater than the mouth width w. In this embodiment, the lid 58 may only be as wide as the mouth width w and not as wide as the tank width W.

Figure 29:
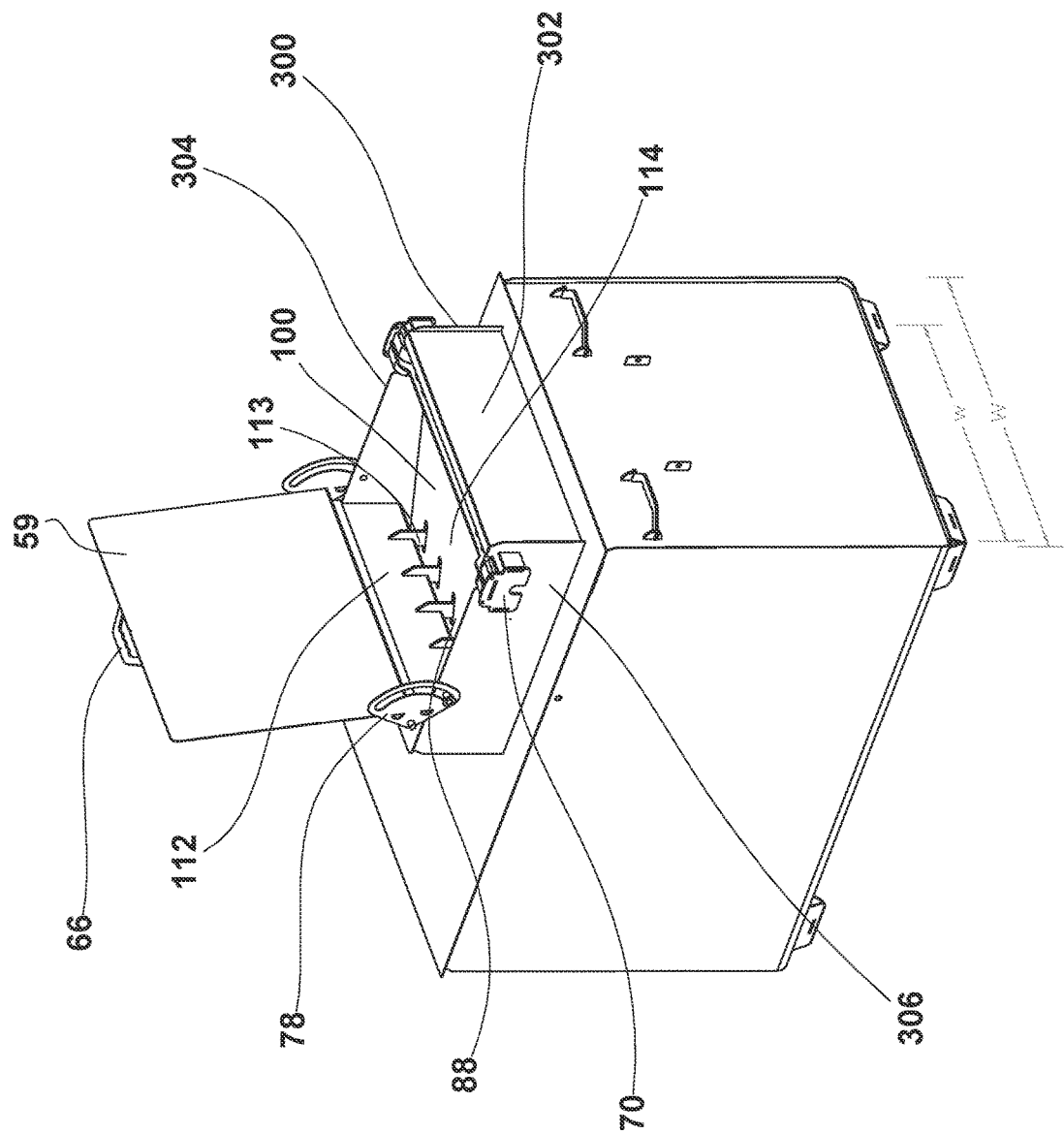
FIG. 29 is front perspective view of the tank 50 in the alternative preferred embodiment. Here, the opening of the tank 88 may be configured to be vertically above the top 52 of the tank 50 instead of being coplanar with the top 52. The tank 50 may comprise an extended tank mouth 300 having an extended tank mouth front 302 and extended tank mouth sides 306. The extended tank mouth sides 306 may have an extended tank mouth edge 304 delineating the opening 88. In this configuration, the second chamber 114 may be located above the top 52 of the tank 50.
Figure 30:
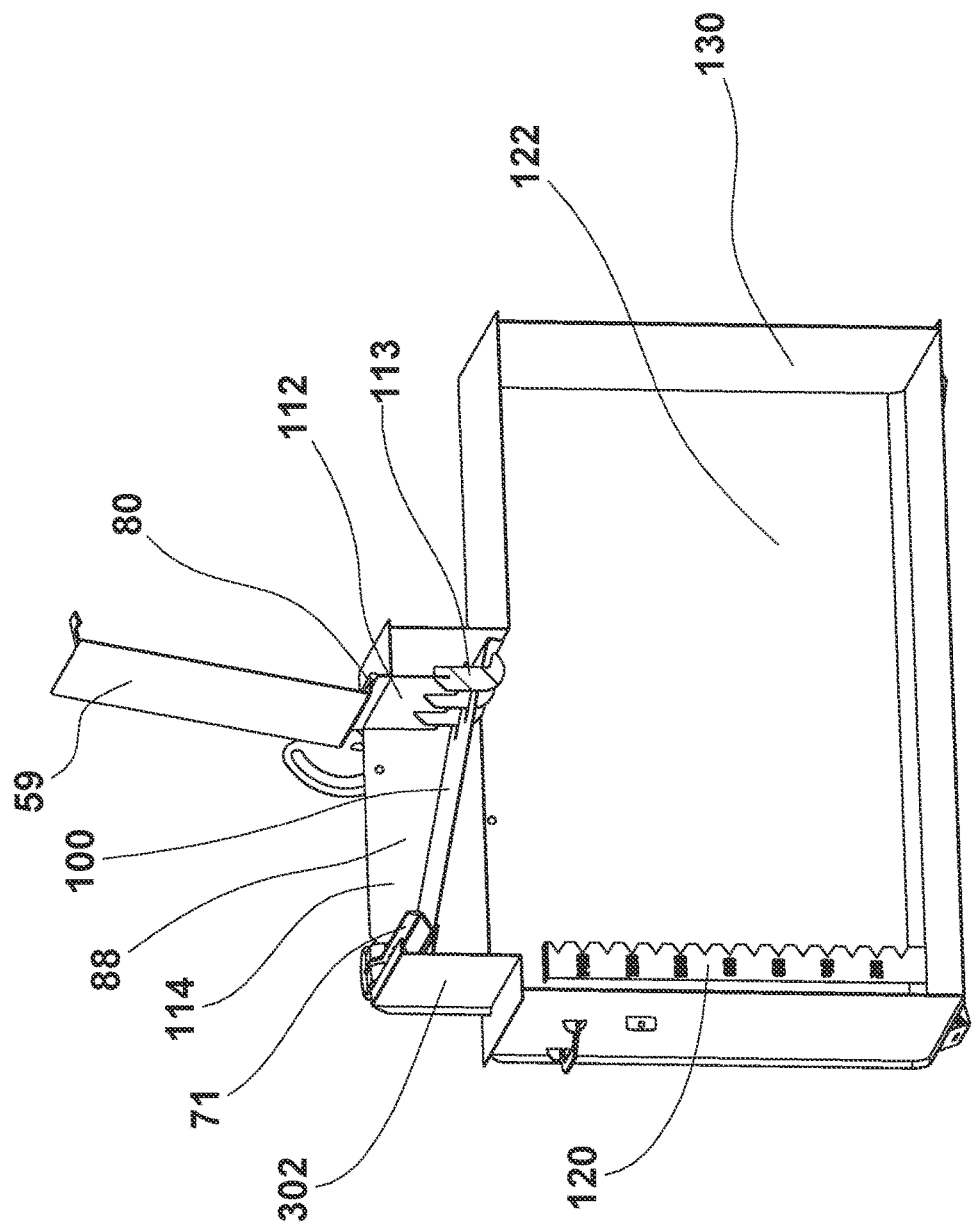
FIG. 30 is a side, perspective, cross-sectional view of the tank 50 in the alternative preferred embodiment. This figure illustrates how the internal volume of the first chamber 122 may be effectively increased by having a tank 50 with an extended mouth 300.
Figure 31:
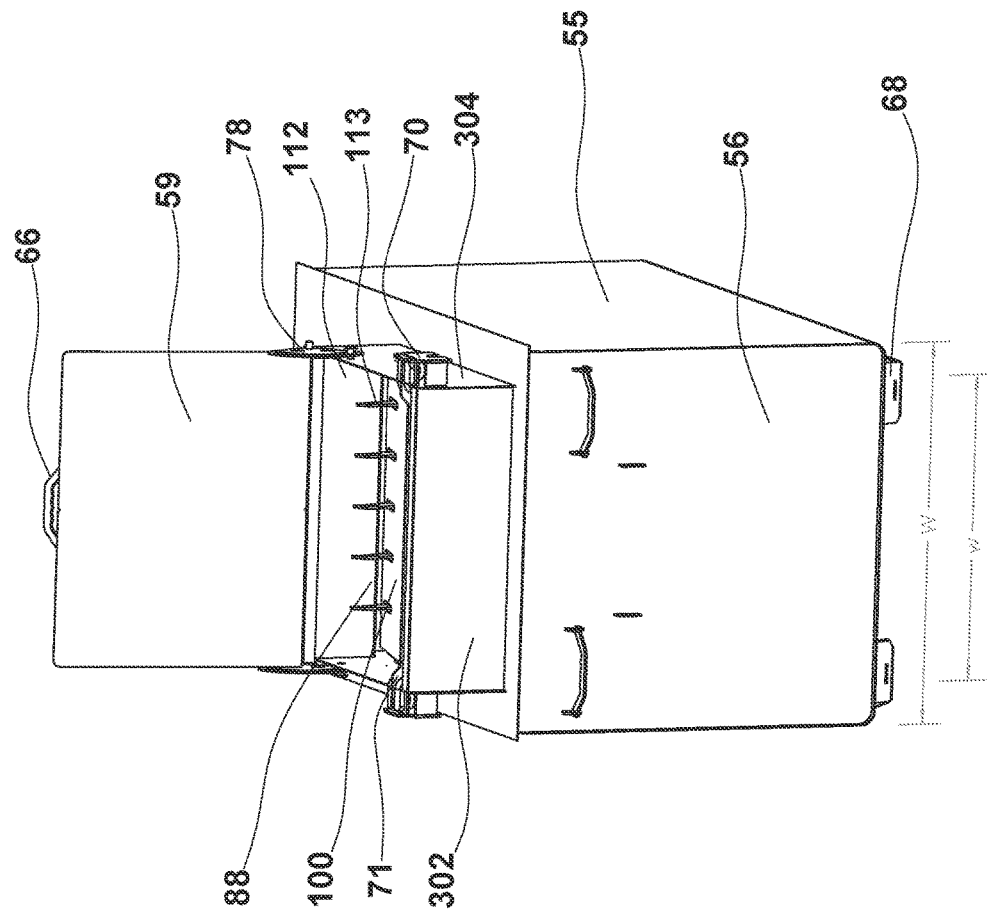
FIG. 31 is a front, perspective view of the tank 50 in the alternative preferred embodiment with an extended mouth 300. Here, the tank width W may be wider the mouth width w. By having an extended mouth 300, embodiments of the tank 50 where the opening 88 does not span the distance between the first side 54 and the second side 55 of tank 50 may be possible. \

Referring now specifically to FIGS. 29-31, the removable plate 100 and the second chamber 114 may be entirely above the plane formed with the top 52 of the tank 50. This configuration may be advantageous by increasing the effective volume of the first chamber 122 by raising the second chamber 114. This configuration may also be advantageous by narrowing the opening 88 in the tank 50.

Figure 32:
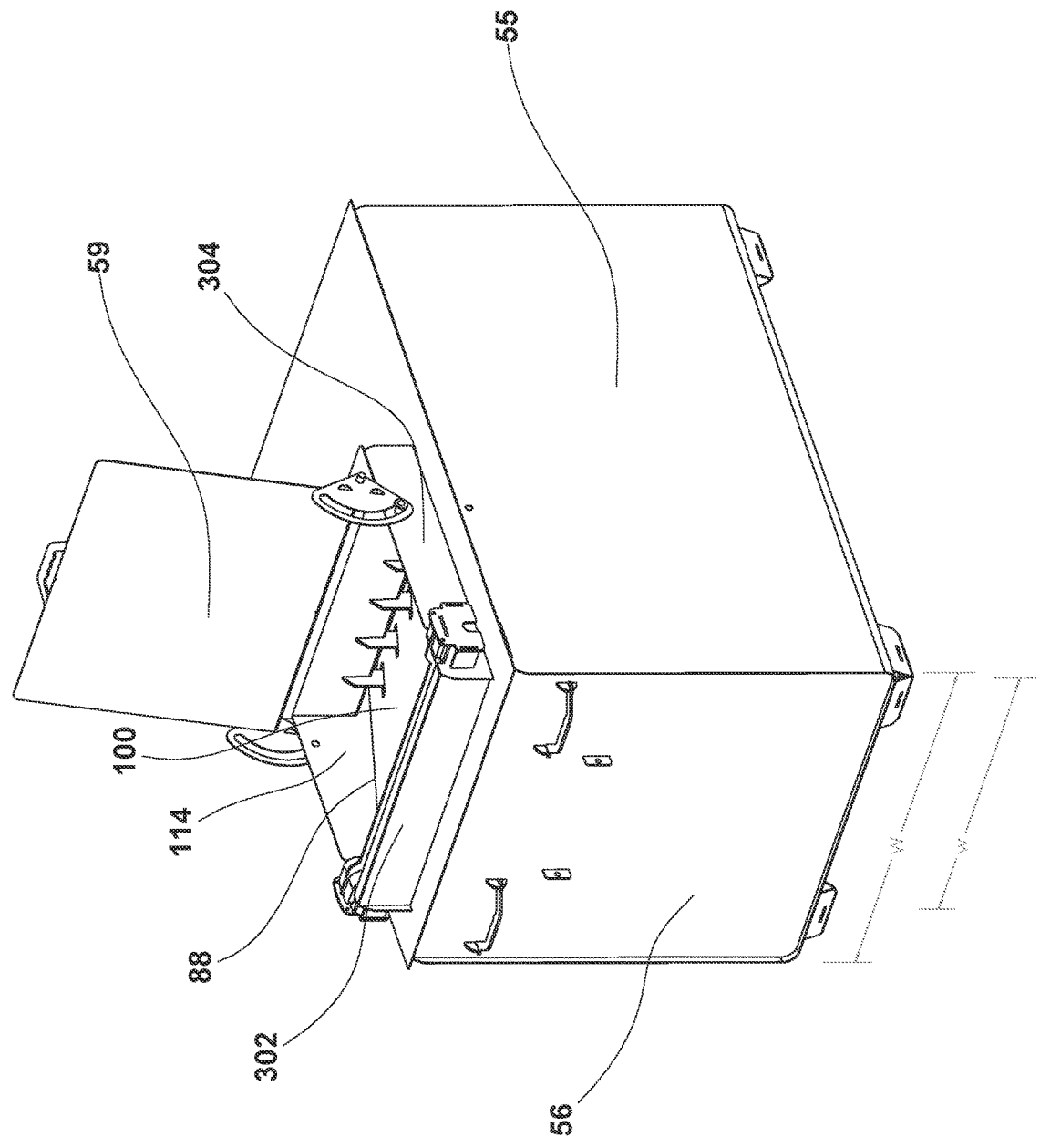
FIG. 32 is a front perspective view of the tank 50 in the alternative preferred embodiment with an extended mouth 300. Here, the front 302 and sides 306 of the extended tank mouth 300 may extend upwards above the top 52 of the tank 50 only far enough such that the second chamber 114 is only partially above the plane formed with the top 52 of the tank.
Figure 33:
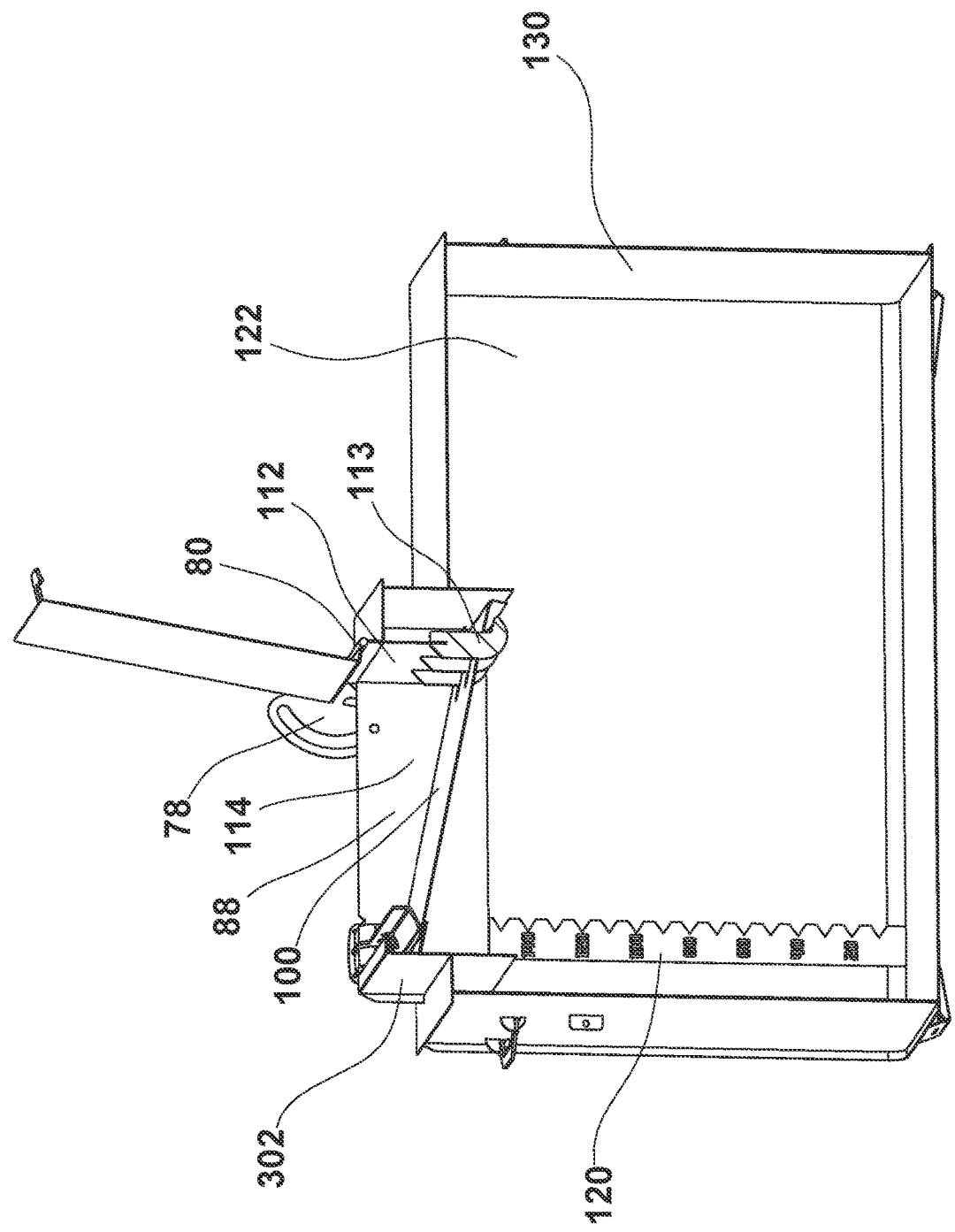
FIG. 33 is a side, perspective, cross-sectional view of the tank 50 in the alternative preferred embodiment. This figure illustrates how the internal volume of the first chamber 122 may be effectively increased by having a tank 50 with an extended mouth 300. However, the second chamber 114 does partially extend below the plane formed with the top 52 of the tank so that although the second chamber size is increased, the overall profile of the tank 50 may not be as high as it otherwise would be with a second chamber 114 located entirely the top 52 of the tank (as shown in FIGS. 29-31).

Referring now specifically to FIGS. 32 and 33, an alternative preferred embodiment of the extended mouth 300 on the tank 50 may be seen. Here, the removable plate 100 and the second chamber 114 are coplanar with the plane formed with the top 52 of the tank 50. This configuration may be advantageous by increasing the effective volume of the first chamber 122 without increasing the vertical profile of the tank 50 more than may be desired.

Figure 34:
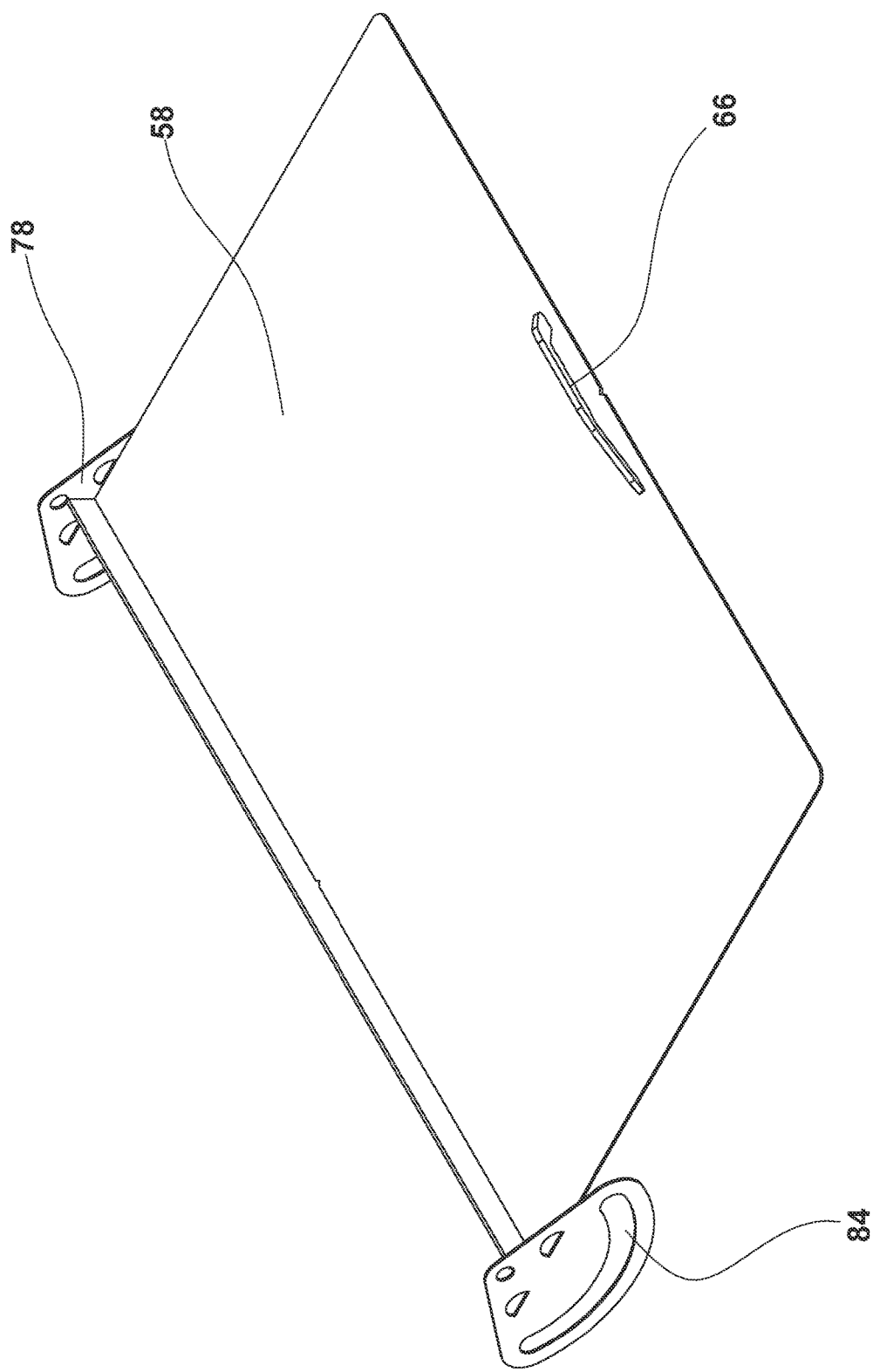
FIG. 34 is a top perspective view of the lid 58 in the preferred embodiment. The lid 58 may comprise a handle 66 for allowing a user to easily open the tank 50. The lid 58 may also comprise a hinge mechanism 78 to allow the lid 58 to rotate from a first, closed position 90 to a second, open position 92.

Referring now FIG. 34, the lid 58 may be seen disconnected from the tank 50. The lid 58 may be formed integrally with the hinge mechanism 78. The lid 58 may be connected to the tank 50 by the hinge mechanism 78. The side profile of the hinge mechanism 78 may be the shape of a "smiley face."

Figure 35:
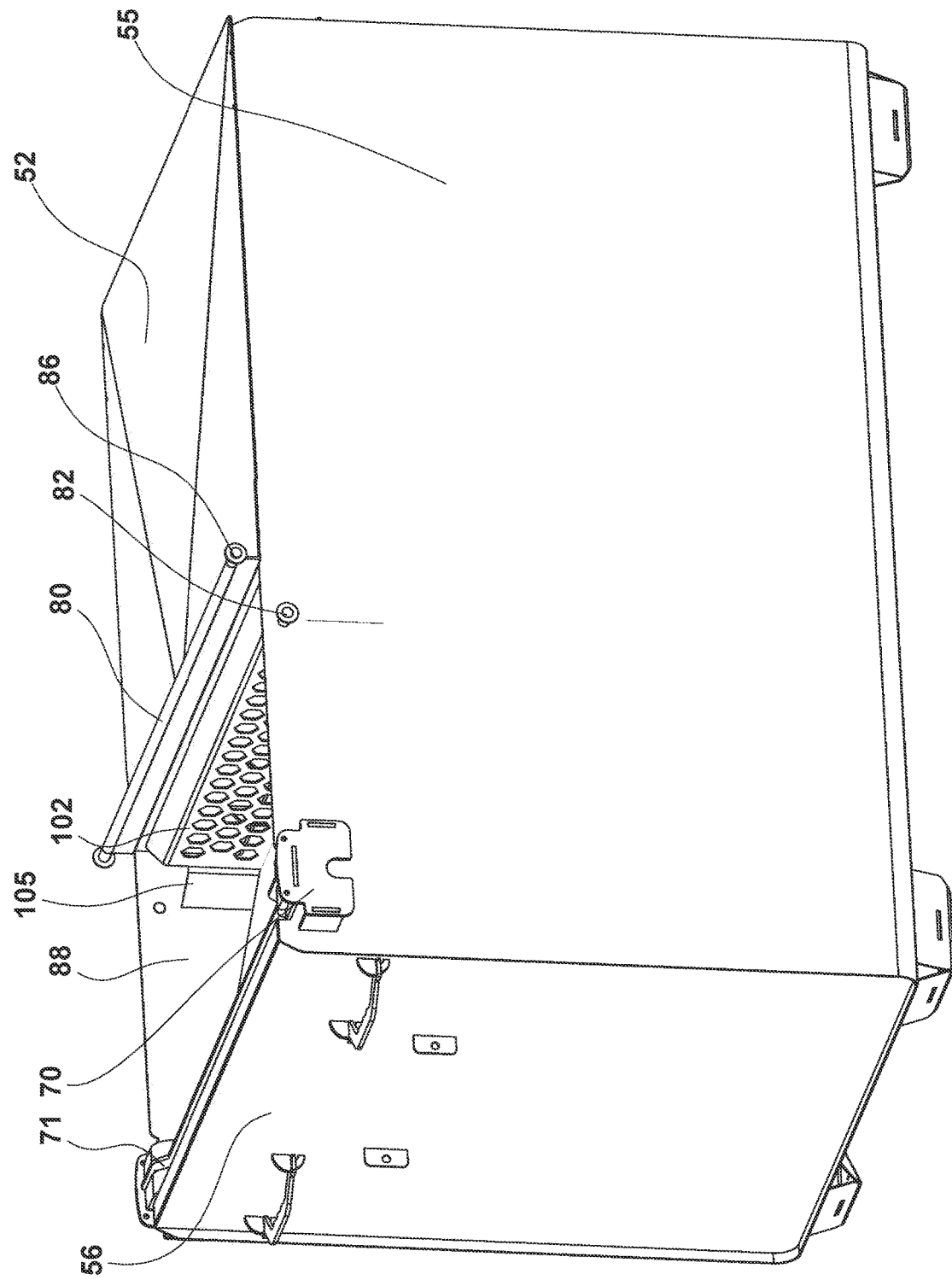
FIG. 35 is a side perspective view of the tank 50 in preferred embodiment. Here, the tank 50 can be seen with the lid 58 detached. The hinge rotation bar 80 and the hinge pins 82 may be seen more clearly without the hinge mechanism 78 already engaged.
Figure 36:
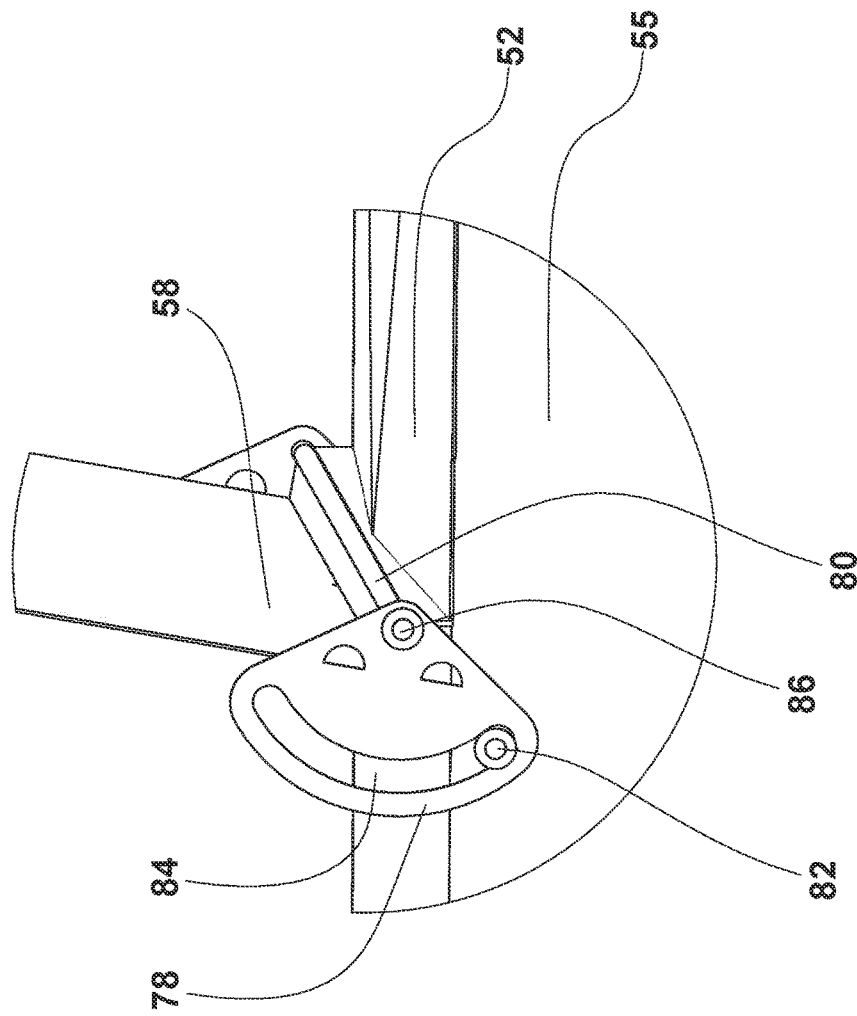
FIG. 36 is a close-up, side, partial perspective view of the tank 50 in the preferred embodiment. This figure depicts the engagement of the lid 58 with the tank 50 in greater detail. Here, it may be seen that both the hinge rotation bar 80 and the hinge pin 82 may be engaged with the hinge mechanism 78.
Figure 37:
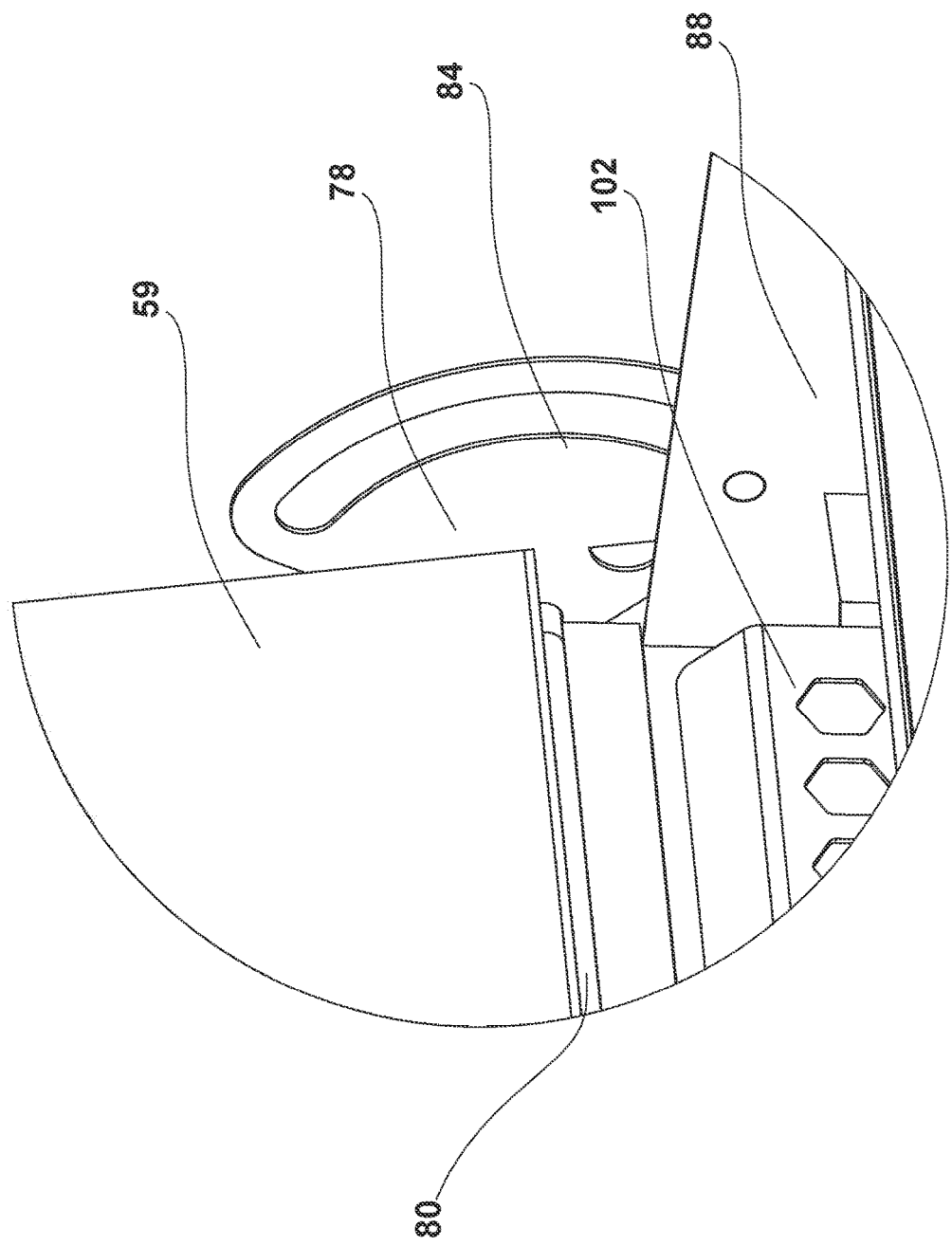
FIG. 37 is a close-up, partial perspective view of the hinge mechanism 78 in the preferred embodiment. This figure illustrates the position of the hinge mechanism 78 when the lid 58 is in the second, open position 92.

Referring now to FIG. 35, the tank 50 may be seen without the lid 58. It may be advantageous to remove the lid 58 from the tank 50 entirely to allow a user to dump multiple loads of waste liquid into the tank 50 without having to open and close the lid 58 multiple times. Referring now to FIGS. 36 and 37, the engagement of the hinge mechanism 78 of the lid 58 with the rotation bar 80 of the tank 50 may be more clearly seen. The rotation bar 80 passes through a portion of, and may be secured within, the hinge mechanism 78 by the hinge rotation bar ends 86. The hinge pin 82 located on the second side 55 of the tank 50 may be seen more clearly engaging with the track 84 of the hinge mechanism 78.

Figure 40:
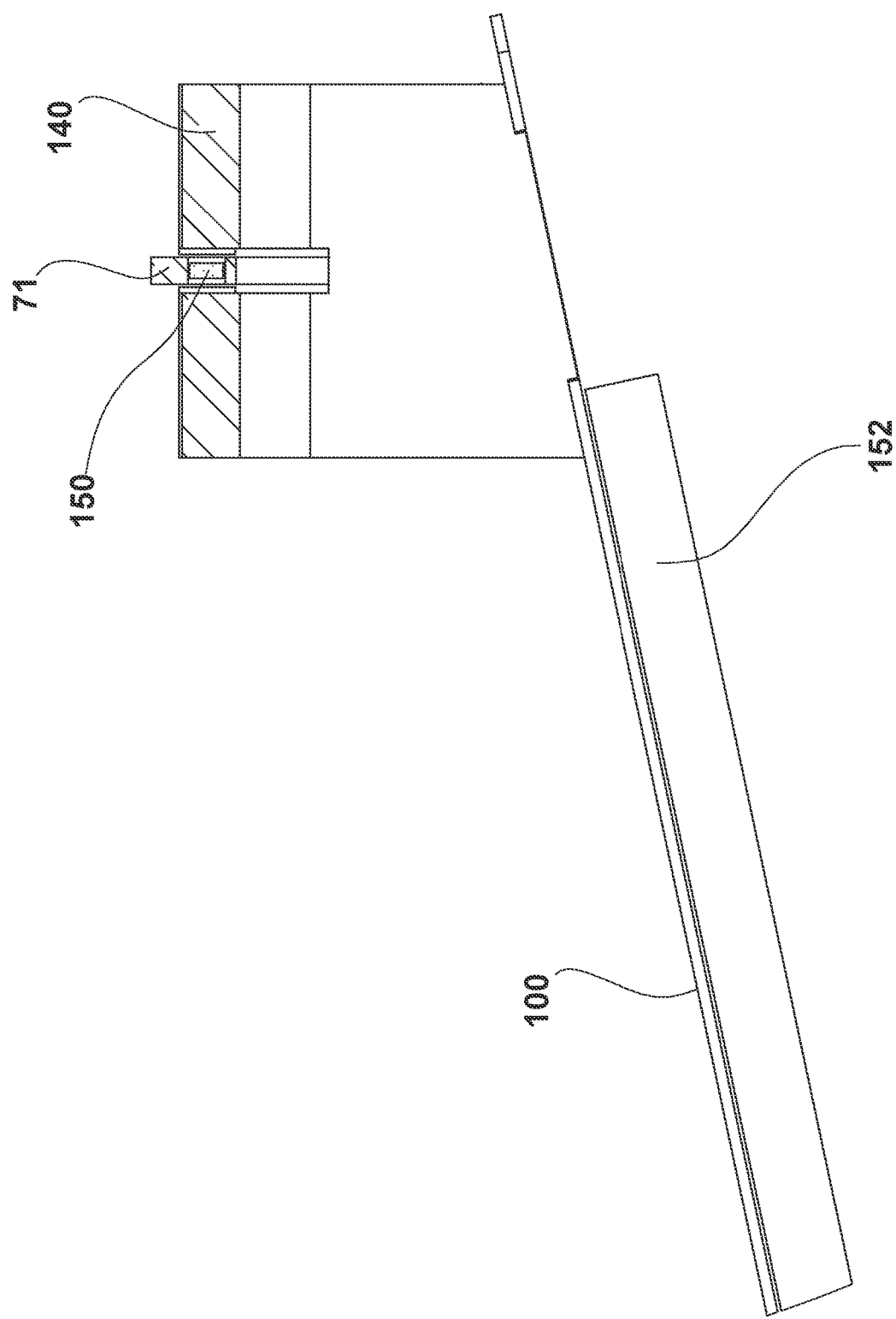
FIG. 40 is a side cross-sectional view of the removable plate 100 in the preferred embodiment. Here, the carbide layer 150 of the locking bar 71 may be seen more easily as comprising an internal layer formed within the locking bar 71.

Referring now to FIG. 40, The removable plate 100 with the locking bar 71 may be seen in more detail. The locking bar reinforcement 140 may be located on either side of the locking bar 71 to reinforce the locking bar 71 against any tampering. This figure also demonstrates how the reinforcement bars 152 help to further strengthen and support the removable plate 100.

Figure 41:
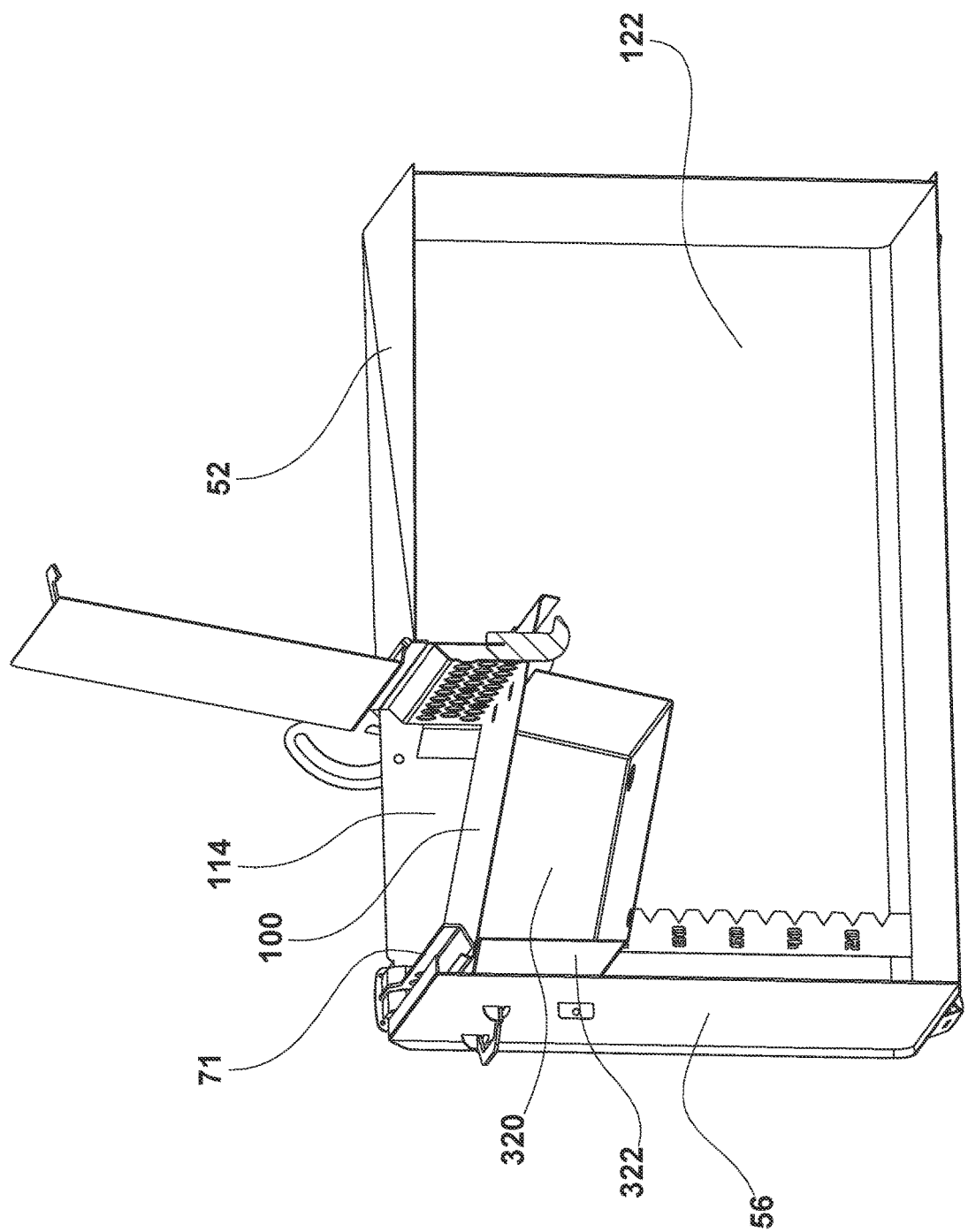
FIG. 41 is a side, perspective, cross-sectional view of the tank 50 in the alternative preferred embodiment. This figure illustrates how an intermediary tank 322 may be positioned within the first chamber 122 and is located under the removable plate 100. The intermediary tank 322 may define an intermediary chamber 320 separating the first chamber 122 from the second chamber 114.
Figure 42:
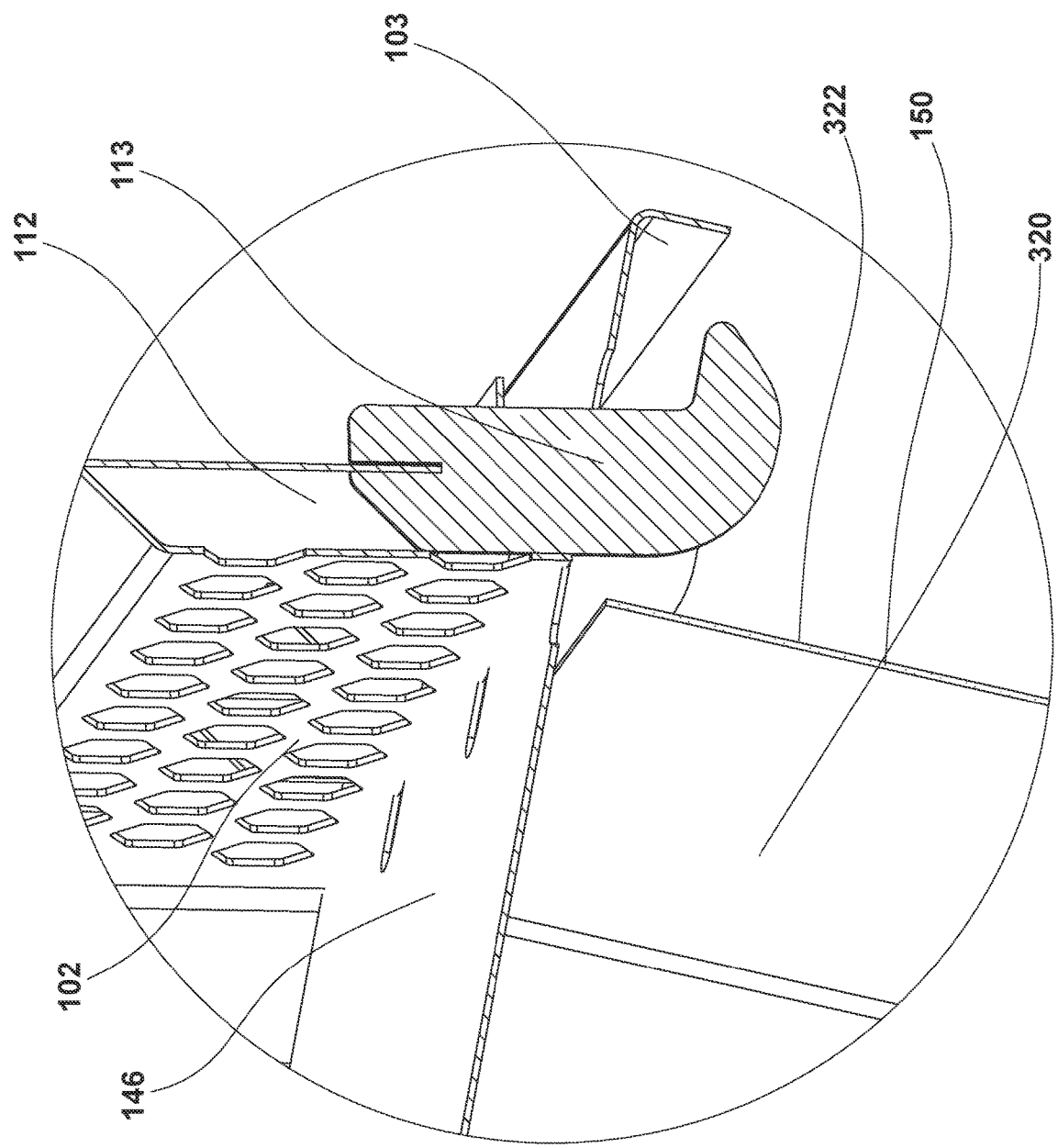
FIG. 42 is a close-up, side, cross-sectional view of the tank 50 in the alternative preferred embodiment. Here, it can be seen that the removable plate 100 and the porous plate 102 may be formed from one solid piece in the embodiment comprising the intermediary tank 322. This figure also illustrates how the intermediary chamber 322 may be formed of a different, harder material than the removable plate 100.

Referring now to FIGS. 41 and 42, the tank 50 may comprise an intermediary tank 322 located below the removable plate 100. The intermediary tank 322 may define an intermediary chamber 320. The intermediary chamber 320 may separate the second chamber 114 from the first chamber 122. The intermediary chamber 320 may be advantageous by providing an additional layer for solid particulates and matter to be trapped before entering the first chamber 122 where only waste liquid, such as waste cooking oil, may be desired. The intermediary tank 322 may be removable when the removable plate 100 may be removed from the tank 50. In this alternative preferred embodiment, the porous plate 102 may be formed integrally with the removable plate 100.

One of ordinary skill in the art would appreciate from this disclosure that the liquid tank 50 may be entirely manually powered or spring powered, and free of all motors and electrical components, may be operated by a powered device, may include a motor, or may be operated manually with a powered assist without departing from the scope of the present invention.

One of ordinary skill in the art will appreciate from this disclosure that the various components and elements of the present invention may be constructed of any suitably strong, wear-resistant, flexible (where desired), and inexpensive metals, polymers, alloys, plastics, fabrics, and other materials without departing from the scope of the present invention.

One of ordinary skill in the art will appreciate from this disclosure that device elements, as well as materials, shapes and dimensions of device elements, as well as methods other than those specifically exemplified can be employed in the practice of the invention without resort to undue experimentation. All art-known functional equivalents, of any such materials and methods are intended to be included in this invention. The terms and expressions which have been employed are used as terms of description and not of limitation, and there is no intention that in the use of such terms and expressions of excluding any equivalents of the features shown and described or portions thereof, but it is recognized that various modifications are possible within the scope of the invention claimed, described in the specification, and/or shown in the figures. Thus, it should be understood that although the present invention has been specifically disclosed by preferred embodiments and optional features, modification and variation of the concepts herein disclosed may be resorted to by those skilled in the art, and that such modifications and variations are considered to be within the scope of this invention.

What is claimed is:

1. A tank configured to receive and store used cooking oil, comprising:
    a tank body defining a chamber therein configured to receive used cooking oil, the tank body comprising a base, a top, and a sidewall extending between the base panel and the top panel, portions of the sidewall forming a front tank surface, a first lateral tank surface, and a second lateral tank surface;
    the top panel defining an opening therein proximate to the front tank surface,
    the tank body defining a second chamber located between the opening and the first chamber;
    the second chamber comprising:
        a second chamber base panel formed by a removeable plate;
        a transverse member extending between the first lateral tank surface and the second lateral tank surface;
        wherein the removeable plate extends between the front tank surface, the first lateral tank surface, the second lateral tank surface, and the transverse member to provide a surface onto which used cooking oil flows during transport to the first chamber; and wherein the removeable plate is detachably removeable from the tank; and a lid being pivotally attached to the top panel such that the lid is moveable between a first, closed position in which the lid, in combination with the top panel block the opening to prevent the flow of used cooking oil into the tank and a second, open position in which used cooking oil can flow into the tank.

2. The tank of claim 1, further comprising a porous plate extending positioned generally vertically in the second chamber and located proximate to a back side of the opening opposite the front tank surface, the porous plate having a plurality of hexagonal holes therein, wherein the removeable plate is positioned on a sloped angle such that used cooking oil poured into the bin flows over the removable plate, through the plurality of holes in the porous plate, and into the chamber of the tank, and wherein the removable plate may removed from covering the opening such that the liquid contained within the chamber may be accessed.

3. The tank of claim 1, wherein the tank body and the lid is metallic, and wherein the tank body is welded to form a one piece body.

4. The tank of claim 2, wherein the removeable plate is interlockable with the transverse member, a lockable bar being positioned on the removeable plate and configured to receive a lock therein to secures the removeable plate to the tank body such that removeable plate can be secured in position by both the lockable bar and the interlocking of the removeable plate with the transverse member such that the removeable plates underlies the porous plate.

5. The tank of claim 4, wherein the opening in the top of the bin extends entirely from the first lateral surface to the second lateral surface of the tank body.

6. The tank of claim 4, wherein the transverse member further comprises a plurality of fangs extending downwardly therefrom to form a shoulder configured to engage the removeable plate, the removeable plate defining a plurality of slots therein such that the fangs can be positioned therethrough and then the removable plate positioned so as to abut and be supported on the shoulder.

7. The tank of claim 4, wherein the tank body further comprises:

a first engagement lip and a second engagement lip located on the first lateral surface and the second lateral surface, respectively, wherein when the removable plate is positioned inside the tank body, a first end of the lockable bar can be secured to the first engagement lip and a second end of the lockable bar can be secured to the second engagement lip to lock the removable plate in position.

8. The tank of 7, further comprising a first lock configured to secure the first engagement lip to the first end of the lockable bar and a second lock configured to secure the second engagement lip to the second end of the lockable bar.

9. The tank of claim 8, wherein the first lateral tank surface and the second lateral tank surface each have a shield thereon which is configured to prevent cutting of a hasp of the first lock and cutting of a hasp of the second lock.

10. The tank of claim 4, wherein a portion of the lockable bar has an internal carbide layer.

11. The tank of claim 2, wherein the porous plate is positioned within the tank body at least equal to and between forty-five degrees (45°) and ninety degrees (90°) from horizontal.

12. The tank of claim 1, further comprising:

four first connecting brackets located along a top perimeter edge of the tank body, four feet positioned on the base of the tank body, each of the four feet having a second connecting bracket thereon, wherein each one of the first connecting brackets on the tank is configured to engage with and lock into one of the second connecting brackets on a second tank configured identically to the tank thereby allowing the second tank to stack onto the tank.

13. The tank of claim 1, further comprising handles located the front tank surface, the handles being movable between a first, extended position and a second, folded position.

14. The tank of claim 1, wherein the lid is connected to the tank body by a pair of hinges, each of the pair of hinges having a curved track configured to accommodate a pin located on each of the first lateral tank surface and the second lateral tank surface.

15. The tank of claim 1, further comprising a mounting module located on the front tank surface, the mounting module being configured to connect to a liquid carrier such that a person dumping liquid into the tank via the liquid carrier is assisted.

16. The tank of claim 1, further comprising an interior gauge located on an inside of at least one of the first lateral tank surface and the second lateral tank surface, the interior gauge indicating an amount of the liquid stored inside the chamber.

17. A tank configured to receive and store used cooking oil, comprising:

a tank body defining a chamber therein configured to receive used cooking oil, the tank body comprising a base panel, a top panel, and a sidewall extending between the base panel and the top panel, portions of the sidewall forming a front tank surface, a first lateral tank surface, and a second lateral tank surface;

the top panel defining an opening therein proximate to the front tank surface, the opening extending between the first lateral tank surface and the second lateral tank surface;

a lid being pivotally attached to the top panel such that the lid is moveable between a first, closed position in which the lid, in combination with the top panel block the opening to prevent the flow of used cooking oil into the tank and a second, open position in which used cooking oil can flow into the tank, wherein the tank body and the lid is metallic formed by a first material, the tank body being welded to form a one piece body, and wherein at least a portion of the tank body includes a second layer formed by a second material, the second layer having an increased hardness such that the at least a portion of the tank body is more difficult to cut through.

* * * * *